(12) United States Patent
Folsom et al.

(10) Patent No.: US 6,530,855 B1
(45) Date of Patent: Mar. 11, 2003

(54) PARALLEL HYDROMECHANICAL UNDERDRIVE TRANSMISSION

(75) Inventors: Lawrence R. Folsom, Pittsfield, MA (US); Clive Tucker, Pittsfield, MA (US)

(73) Assignee: Folsom Technologies, Inc., Castleton, NY (US)

( * ) Notice: Subject to any disclaimer, the term of this patent is extended or adjusted under 35 U.S.C. 154(b) by 0 days.

(21) Appl. No.: 09/856,742

(22) PCT Filed: Nov. 24, 1999

(86) PCT No.: PCT/US99/28083

§ 371 (c)(1),
(2), (4) Date: May 23, 2001

(87) PCT Pub. No.: WO00/32955

PCT Pub. Date: Jun. 8, 2000

Related U.S. Application Data

(60) Provisional application No. 60/110,045, filed on Nov. 24, 1998.

(51) Int. Cl.$^7$ ................................................ F16H 47/04
(52) U.S. Cl. ............................. 475/72; 475/76; 475/80
(58) Field of Search ............................. 475/72, 74, 76, 475/80, 82

(56) References Cited

U.S. PATENT DOCUMENTS

| | | | | | |
|---|---|---|---|---|---|
| 2,962,915 | A | * | 12/1960 | Wiggermann | 475/82 |
| 3,709,060 | A | * | 1/1973 | Orshansky, Jr. | 475/82 |
| 4,286,477 | A | * | 9/1981 | Meyerle et al. | 475/82 |
| 5,785,623 | A | * | 7/1998 | Iino et al. | 475/72 |
| 5,803,856 | A | * | 9/1998 | Iino et al. | 475/72 |
| 6,039,666 | A | * | 3/2000 | Okuda et al. | 475/72 |
| 6,086,501 | A | * | 7/2000 | Takatori et al. | 475/72 |

FOREIGN PATENT DOCUMENTS

| | | | | |
|---|---|---|---|---|
| DE | 1755161 | * | 4/1970 | 475/72 |

* cited by examiner

*Primary Examiner*—Charles A Marmor
*Assistant Examiner*—Ha Ho
(74) *Attorney, Agent, or Firm*—J. Michael Neary

(57) ABSTRACT

A parallel hydromechanical continuously variable transmission has a housing (107) that holds a make-up pump (52), and has internal cavities for holding operating assemblies of the transmission, including an axial piston pump (50) and an axial piston motor (60). The pump (50) and motor (60) each has a rotating element (206) and a non-rotating element (258). Each non-rotating pump element is mounted for tilting movement on trunnions (258P) in its own respective pair of mounting journals in the housing (107). The tilting axes of the non-rotating elements (258) lie transverse to the axes of rotation of the rotating elements (206). The pump (50) and the motor (60) are disposed side-by-side in the housing (107) with the axes of rotation approximately parallel to each other. A stationary manifold (70), fixed to the housing (107), has one surface in contact with the rotating pump element (206P) and a second surface in contact with the rotating motor element (206M). Fluid passages (149, 208) open in the two surfaces in fluid communication with the pump and motor cylinders (206) through a pump/manifold interface. Internal fluid passages (149, 208) in the stationary manifold (70) convey fluid pressurized in the pump (50) directly to the motor (60), and convey spent fluid displaced from the motor back to the pump. The transmission ratio is controlled by the tilt angle of the non-rotating pump and motor elements (258). A tilt angle control apparatus (100) attached to the housing (107) and to the non-rotating pump and motor elements (258) governs that tilt angle.

3 Claims, 56 Drawing Sheets

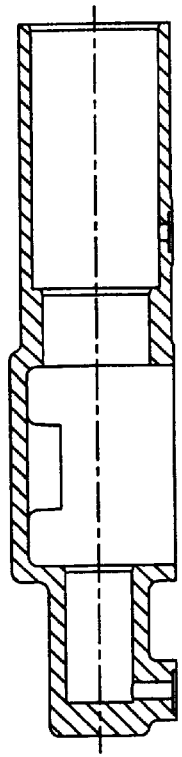
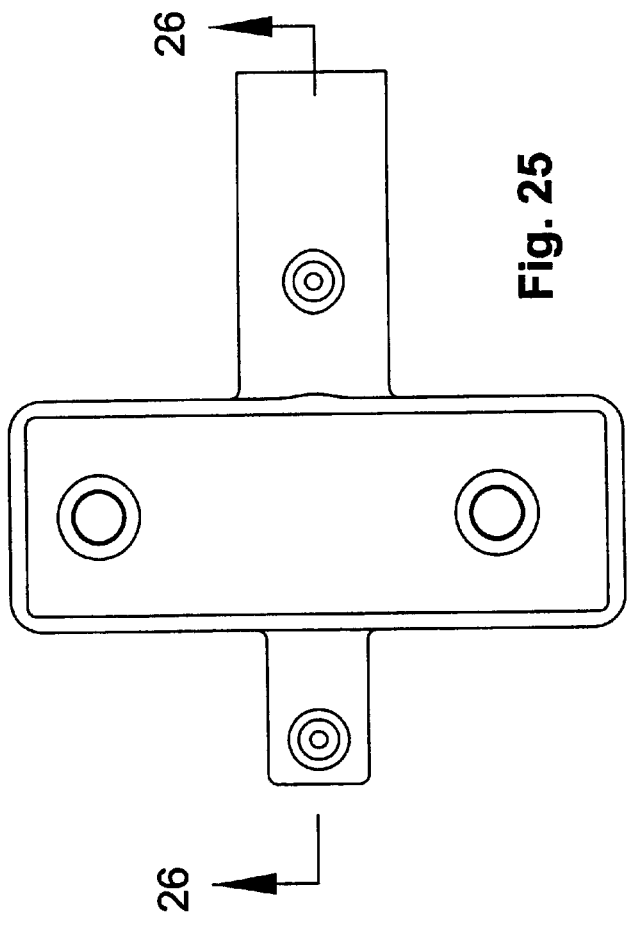
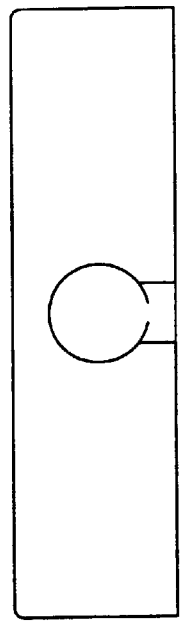
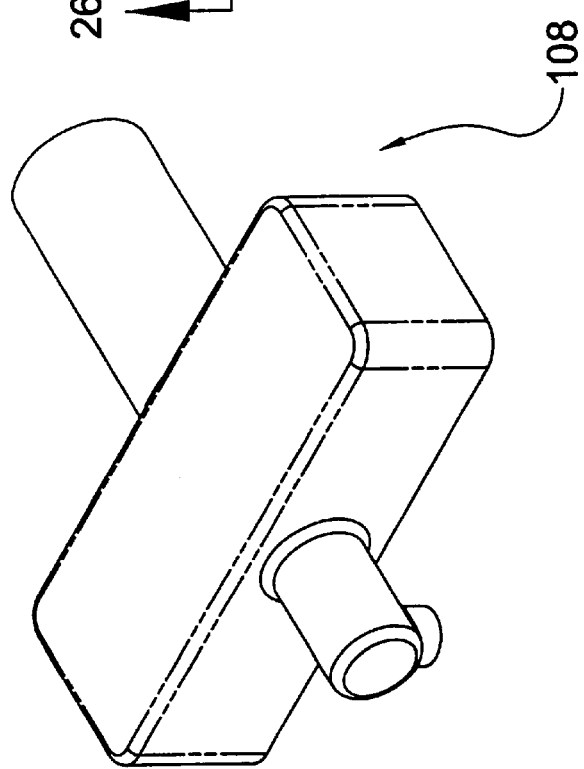

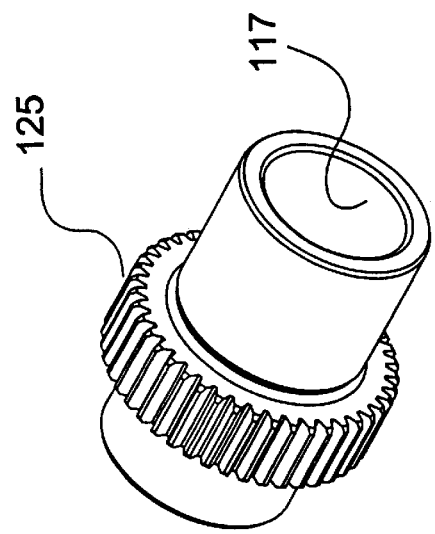
Fig. 34
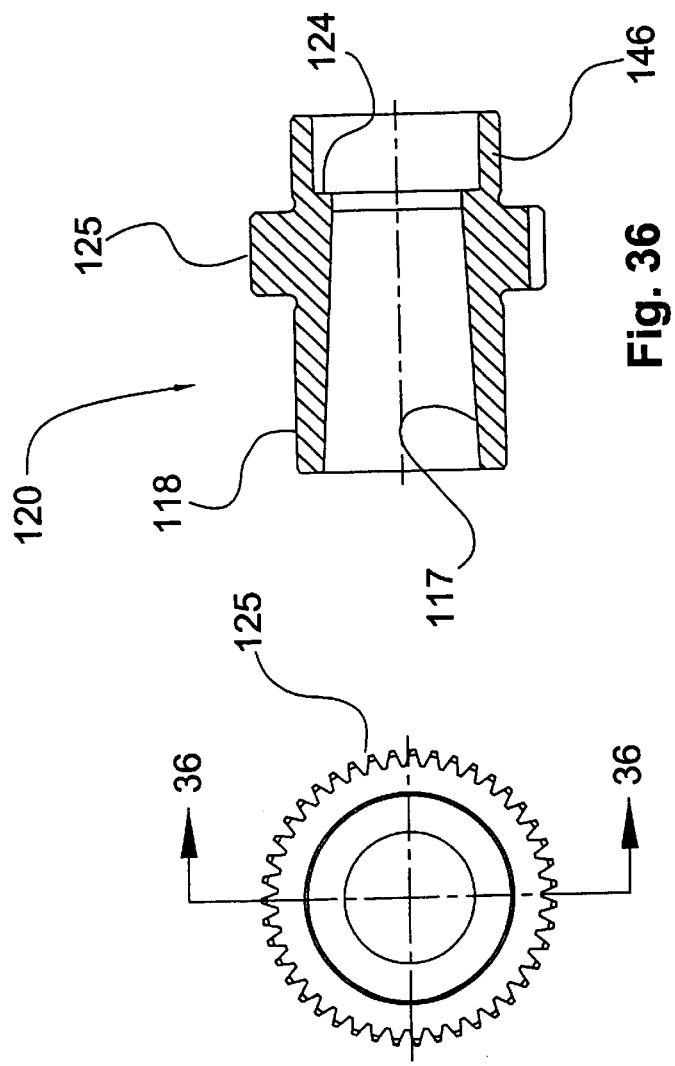
Fig. 36
Fig. 35

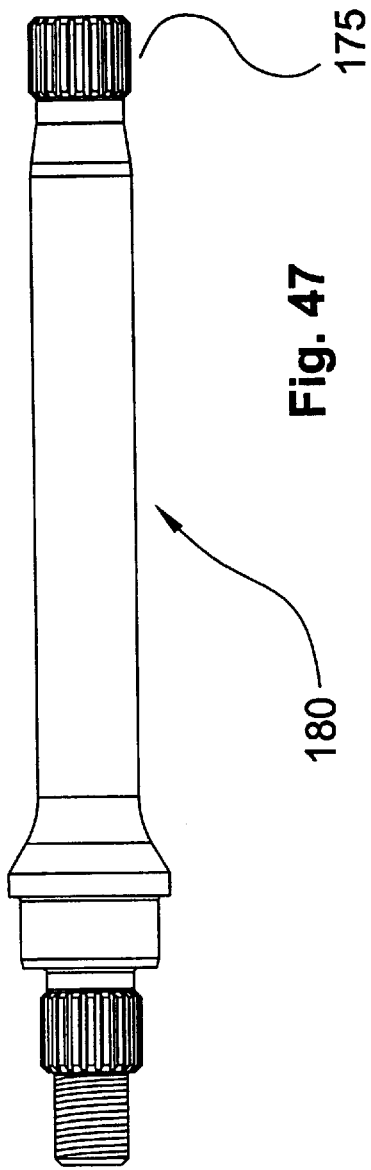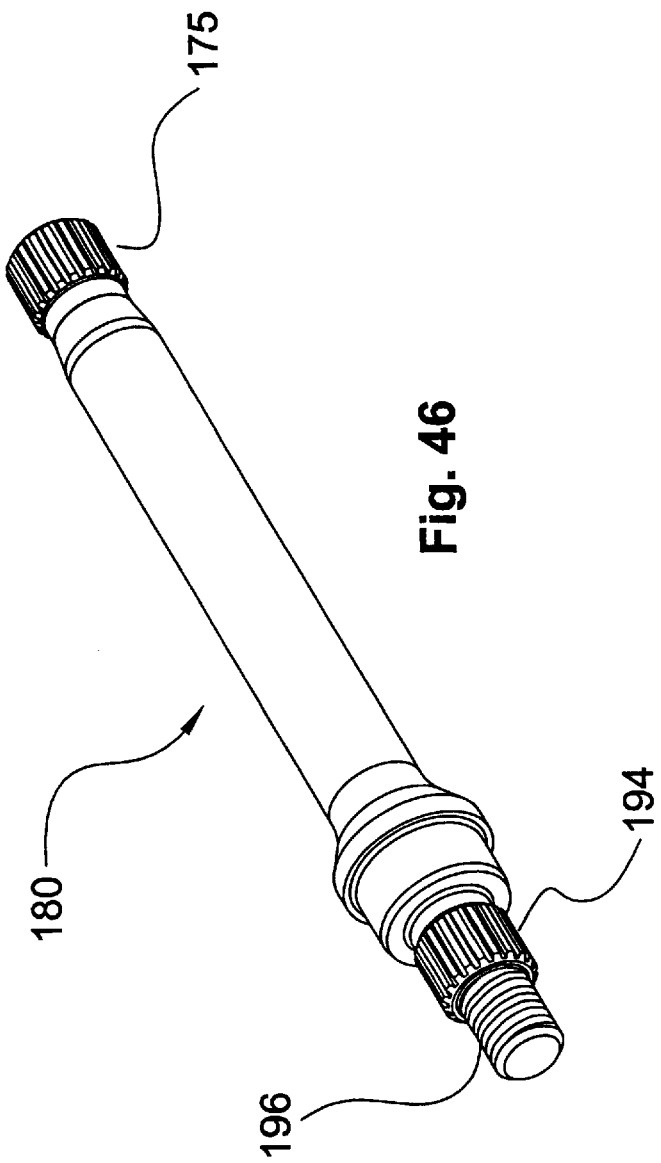

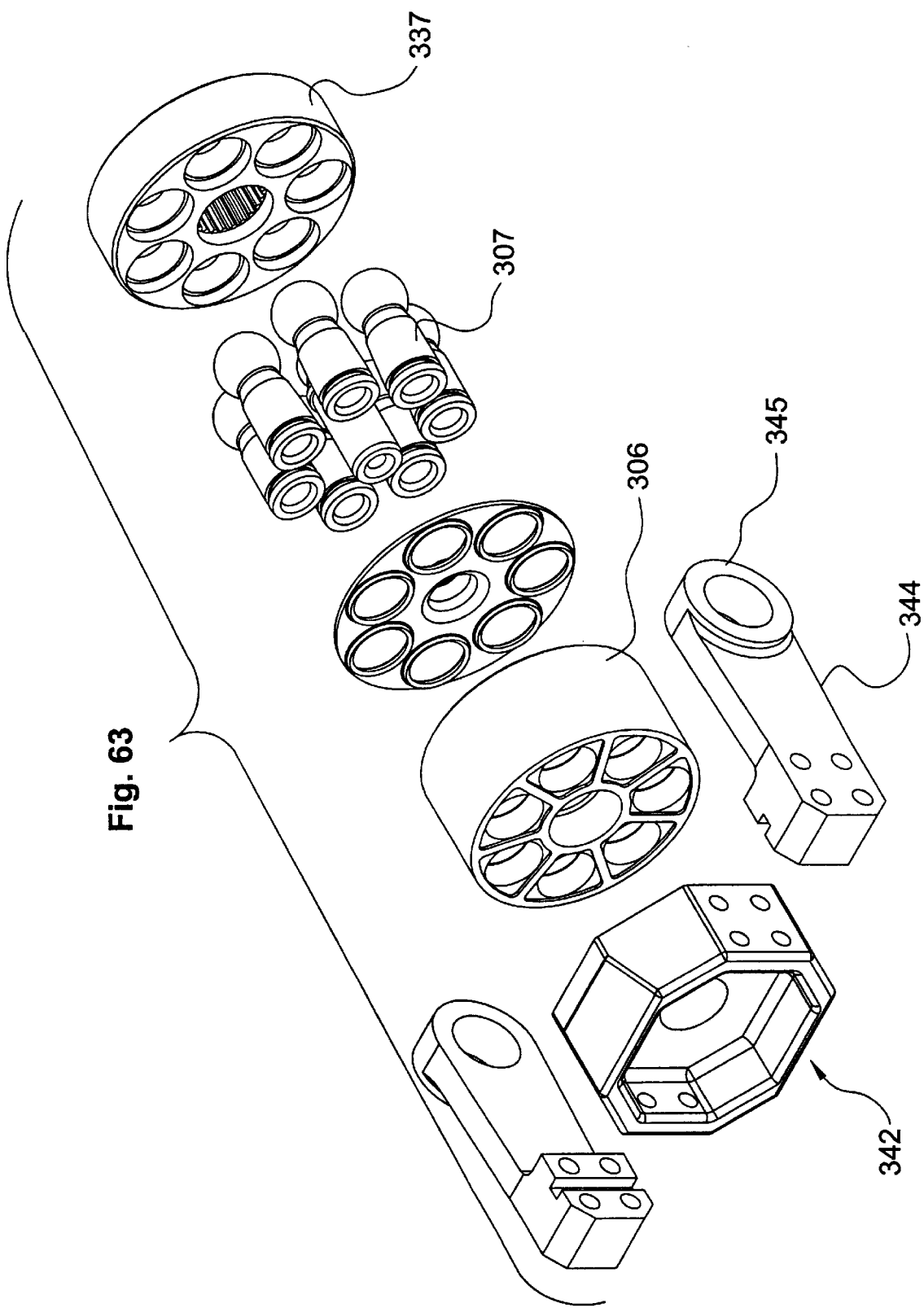

340

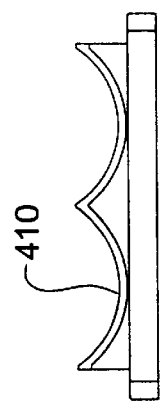
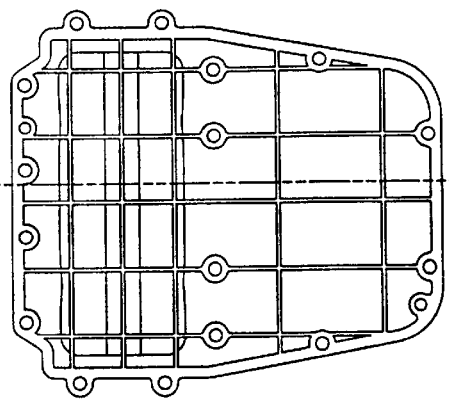
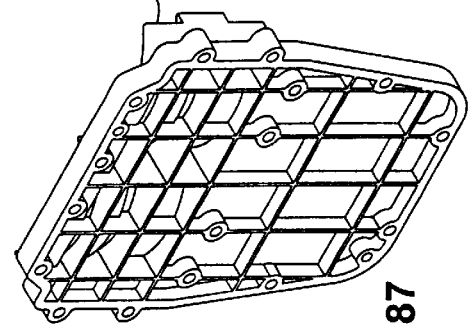
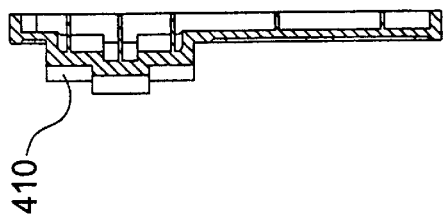
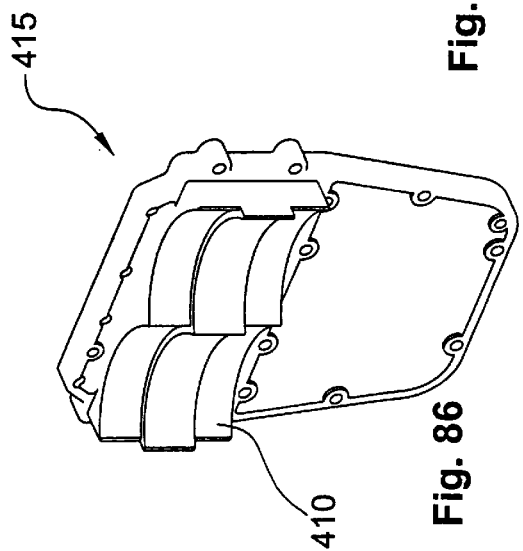
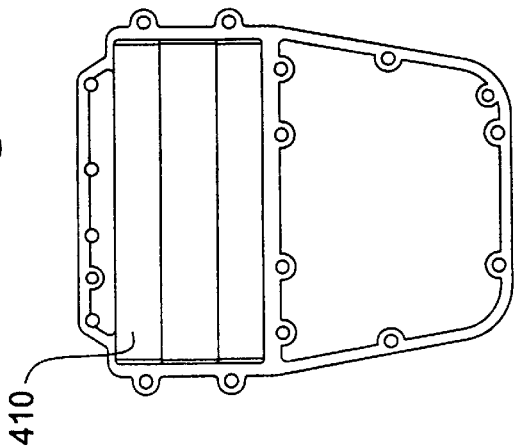

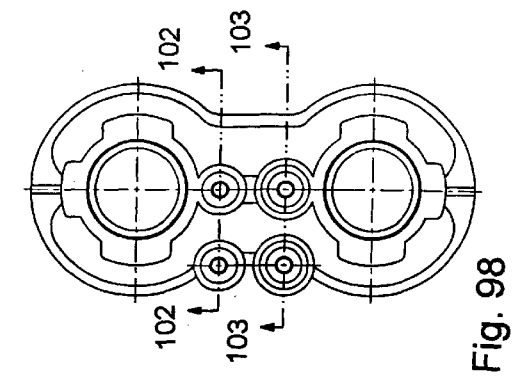
Fig. 98
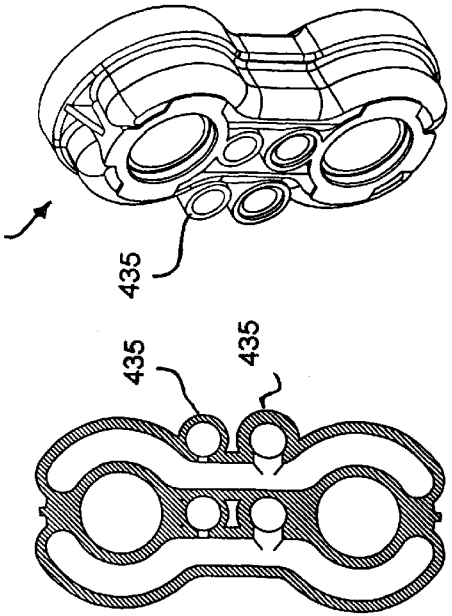
Fig. 97
Fig. 101
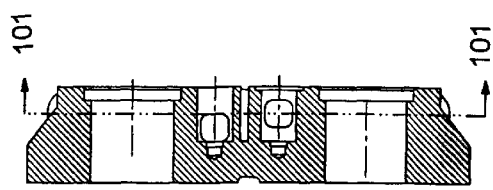
Fig. 100
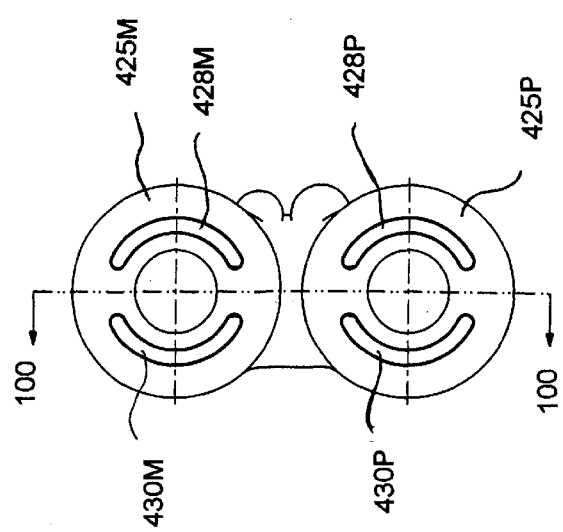
Fig. 99
Fig. 102
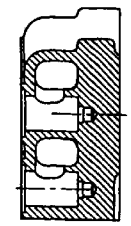
Fig. 103

PARALLEL HYDROMECHANICAL UNDERDRIVE TRANSMISSION

This relates to U.S. Provisional Application No. 60/110,045, filed on Nov. 24, 1998 and to international application No. PCT/US99/28,083 filed on Nov. 24, 1999, both of which are entitled "Parallel Hydromechanical Underdrive Transmission".

This invention pertains to a continuously variable hydromechanical transmission for a vehicle, and more particularly to a transmission having parallel axial piston pump and motor hydraulically linked through a stationary manifold and mechanically linked through a variable ratio gear set to provide an output torque with a constant mechanical portion and a variable hydraulic portion which diminishes to zero at hydraulic lock-up.

BACKGROUND OF THE INVENTION

Interest in continuously variable hydromechanical transmissions has been increasing in recent years because of the potential operational efficiencies and economies that are increasingly becoming possible in vehicles and other powered systems wherein rotary input power is to be converted to output power at the desired output torque and speed. Continuously variable transmissions provide operational efficiencies and economies in the vehicle that are potentially superior to any known transmission, and theoretically can do so in packages that are smaller and lighter weight than other available transmissions.

However, conventional prior art hydrostatic transmissions are known by experts in the art to be noisy and inefficient. Convincing those experts and vehicle manufacturers that these new generation hydrostatic transmissions have overcome the intractable problems of the prior art is difficult. Therefore, additional improvements would facilitate acceptance of the new generation hydrostatic transmissions.

One such improvement would be in the area of leakage from rotating interfaces, particularly those where working fluid is commutated between the differentially rotating pump and motor.

Another improvement would be in the area of dynamic balancing. The difficulty of balancing rotating equipment to preclude vibration induced by rotating eccentric masses becomes worse exponentially with increasing speed of rotation. Yet another improvement would be in reducing the losses caused by "windage" and fluid drag associated with the rotating elements inside the transmission housing. In applications having a prime mover with a high rotating speed, such as an electric motor, turbine engine or high performance spark ignition gasoline engine, the input elements would rotate at the prime mover output speed unless a gear reduction unit were interposed between the prime mover and the transmission. Gear reduction units add undesirable cost and weight. The windage and fluid drag losses can be greatly reduced by reducing the speed of rotation of those rotating elements. Still another desirable improvement would be in the area of manufacturability, simplicity, and cost. Prior art continuously variable hydromechanical transmissions have tended to be excessively complicated and costly to build. It would be a welcome development to original equipment manufacturers to have a continuously variable hydromechanical transmission available that is efficient, small and light weight, and is easily and economically manufactured and maintained.

One approach for achieving these improvements is shown in an international patent application No. PCT/US98/24053 filed on Nov. 12, 1998 by Folsom and Tucker entitled "Hydraulic Machine". A variation of this approach in a tandem hydromechanical transmission using low cost conventional components would make this technology available for smaller vehicles requiring more compactness and lower cost, such as outboard motors for boats, motor scooters, motor cycles, RV's and snowmobiles.

SUMMARY OF THE INVENTION

Accordingly, it is an object of this invention to provide an improved hydromechanical continuously variable transmission for vehicles. Another object of this invention is to provide an improved method of transmitting power from a prime mover of a vehicle to the drive members of the vehicle (wheels, tracks, propeller, belt, etc) at output power in a continuously variable combination output torque and speed selected by the driver.

These and other objects are attained in a parallel hydromechanical continuously variable transmission having a housing holding a make-up pump and internal cavities for holding operating assemblies of the transmission, including an axial piston pump and an axial piston motor. The pump and motor each have a rotating element and a non-rotating element. Each non-rotating pump element is mounted for tilting movement in its own respective pair of mounting journals in the housing. The tilting axes of the non-rotating elements lie transverse to the axes of rotation of the rotating element. The pump and the motor are disposed side-by-side in the housing with the axes of rotation approximately parallel to each other. A variable ratio gear set couples the pump, motor, and output shaft so that the reaction torque from the pump is delivered directly to the output shaft. The pump and motor are coupled hydraulically through fluid passages in a stationary manifold, fixed in the housing. Internal fluid passages in the stationary manifold convey fluid pressurized in the pump directly to the motor, and convey spent fluid displaced from the motor back to the pump. The transmission ratio is controlled by the tilt angle of the non-rotating pump and motor elements. A tilt angle control apparatus attached to the housing and to the non-rotating pump and motor elements governs that tilt angle.

DESCRIPTION OF THE DRAWINGS

The invention and its many attendant objects advantages will be better understood upon reading the following detailed description of the preferred embodiment in conjunction with the following drawings, wherein:

FIGS. 24–27 are various views of the control housing shown in FIG. 2;

FIGS. 34–36 are various views of the input element, including the sun gear of the epicyclic gear set shown in FIG. 6;

FIGS. 46 and 47 are a perspective and side elevation of the output shaft shown in FIG. 10;

FIG. 63 is an exploded perspective view of the pump shown in FIG. 61, which is identical to the motor;

FIGS. 86–91 are various views of the rear housing shown in FIG. 73 and the integral cradle bearing for the swashplates;

FIGS. 97–103 are various views of the manifold shown in FIG. 78;

DESCRIPTION OF THE PREFERRED EMBODIMENTS

Figure 1:
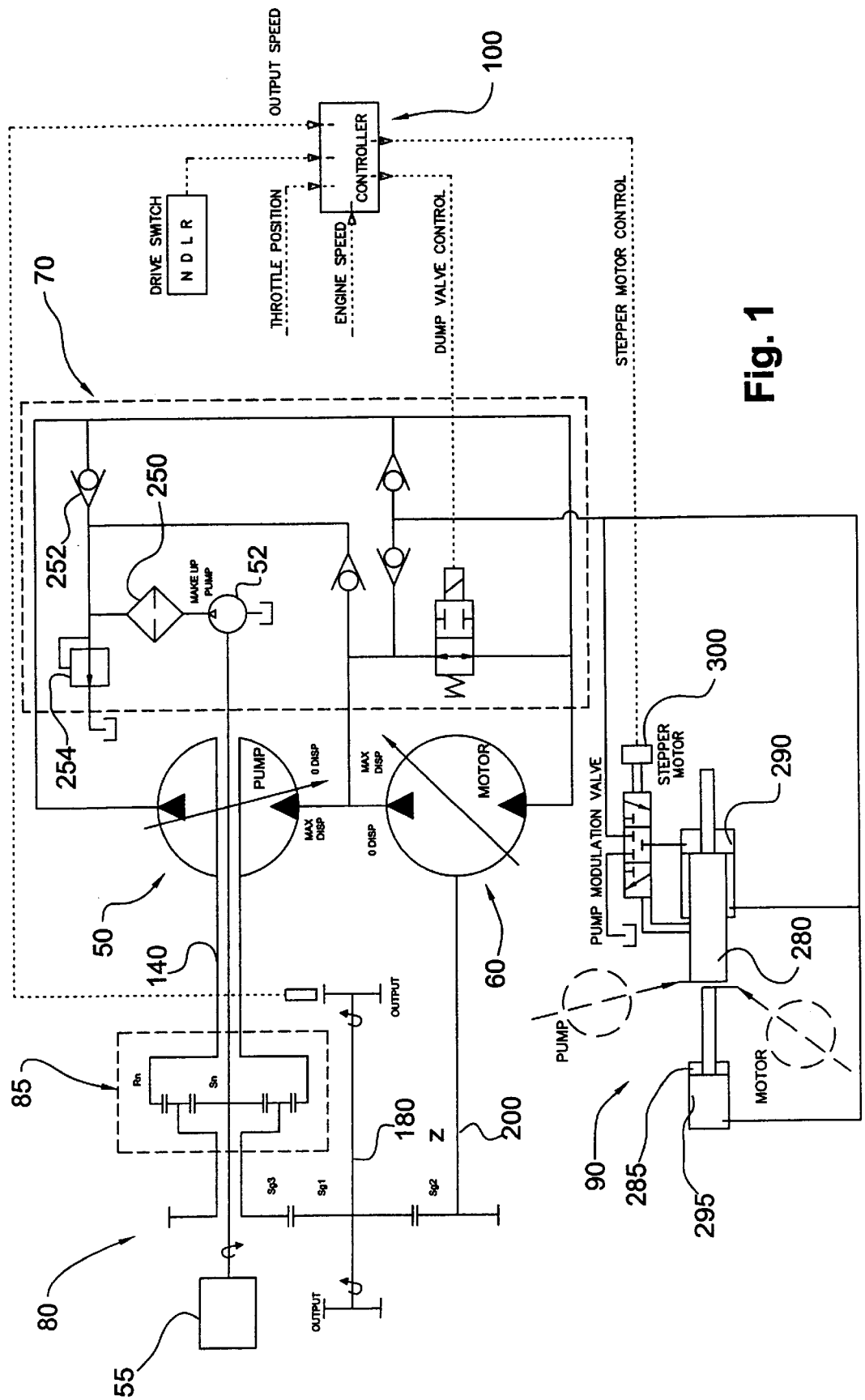
FIG. 1 is a schematic diagram of on embodiment of the invention, showing the mechanical and hydraulic power train and the controls.

Turning now to the drawings, and more particularly to FIG. 1 thereof, a parallel hydromechanical underdrive transmission, shown in schematic form, is designed to be used in vehicles where an underdrive final ratio is desired. The transmission is shown having a variable displacement pump 50 and a make-up pump 52 driven by a prime mover 55, and a variable displacement motor 60 hydraulically coupled through a manifold 70 and mechanically coupled through a gear train 80 which includes a variable ratio gearset such as a planetary gearset 85. The transmission ratio is controlled by displacement control system 90 under control of a master controller 100 for the vehicle.

The transmission is shown in FIG. 1 in neutral, with the pump 50 at zero displacement and the motor 60 at maximum displacement. The displacement of both hydrostatic units 50 and 60 are simultaneously controlled by the control system 90 in this embodiment, although they could instead be independently controlled. A specific embodiment of the invention using a swashplate version of the pump 50 and motor 60, shown in FIGS. 2–12, includes a four-piece housing 105, including a main housing 106 shown in detail in FIGS. 13–19, an input end housing 107 shown in detail in FIGS. 20–23, a control housing 108 shown in FIGS. 24–27 and a make-up pump housing 109 shown in FIGS. 28–33. The main housing 106 has three parallel cylindrical lobes 110, 112 and 114. The two top lobes 110 and 112 hold the pump assembly 50 and the motor assembly 60, respectively, and the bottom lobe 114 holds an output assembly 115 shown in FIG. 10. The input end housing 107 has a locating lip 116 concentric with the pump lobe 110 which is accurately machined to fit a corresponding annular recess in the prime mover 55 so the transmission housing 105 can be rigidly mated to the prime mover 55 with the axis of the output drive of the prime mover aligned with the input element of the transmission.

It will be noted that torque is input from the prime mover 55 to the transmission through the input end housing 107 and is output to the vehicle drive members through both ends of the housing 105. For convenience, the end through which torque is input to the transmission from the prime mover will be denominated the "input end" and the opposite end will be denominated the "output end" even though torque is output from the transmission at both the "input end" and the "output end".

Power input to the transmission from the vehicle prime mover 55 is via a smooth tapered bore 117 through an input sleeve 118 in an input element 120, shown in FIGS. 34–36. The output from the prime mover 55 ends in a smooth tapered shaft (not shown) that matches the tapered bore 117 of the element 120. The tapered shaft is drawn forcefully into the tapered bore 117 by an Allen bolt 122 threaded into a tapped hole in the end of the tapered shaft of the prime mover. The Allen bolt bears against a shouldered washer 123 seated on a shoulder 124 in the bore of the element 120. The engagement of the tapered shaft in the tapered bore 117 provides a secure torque transmission from the prime mover 55 to the transmission.

Figure 37:
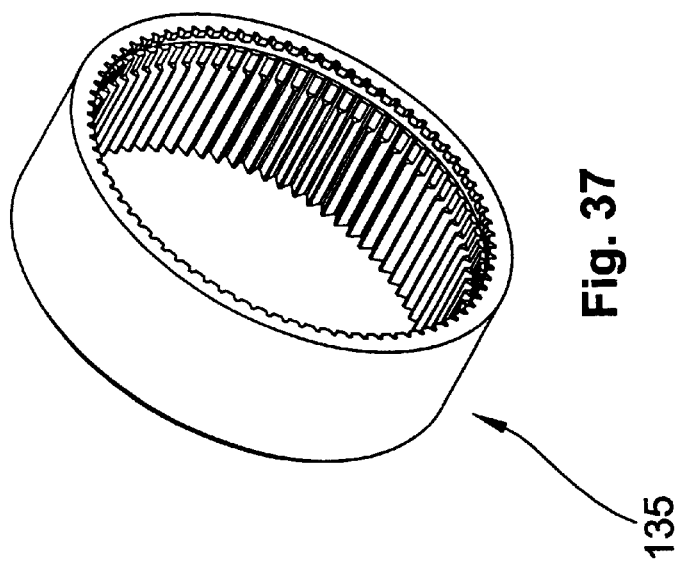
FIGS. 37–39 are various views of the ring gear of the epicyclic gear set shown in FIG. 6.
Figure 39:
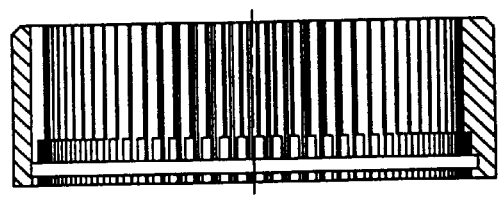
Figure 38:
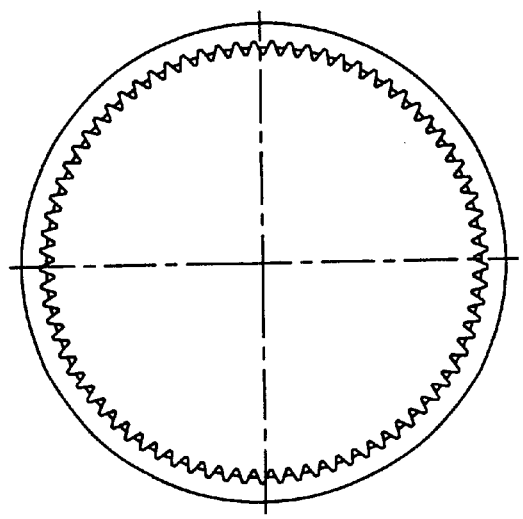
Figure 42:
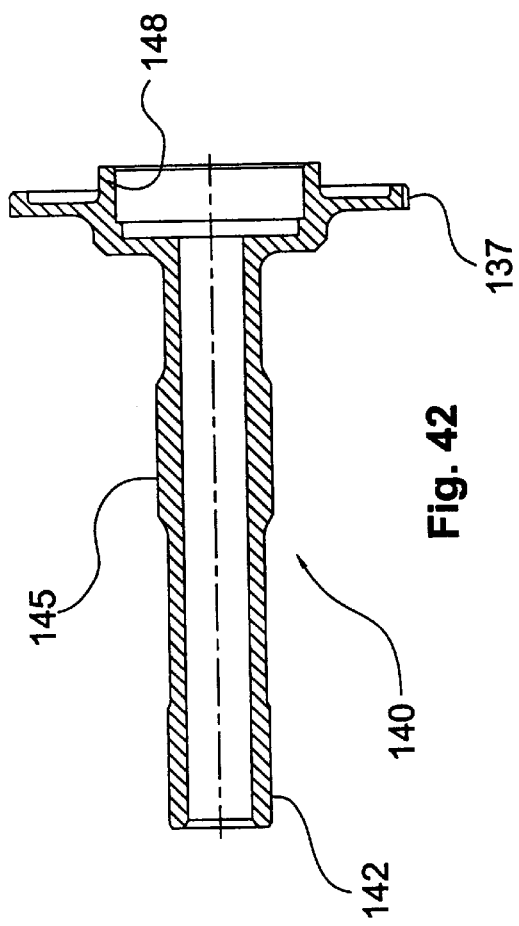
FIGS. 40–42 are various views of the pump drive shaft shown in FIG. 6.
Figure 40:
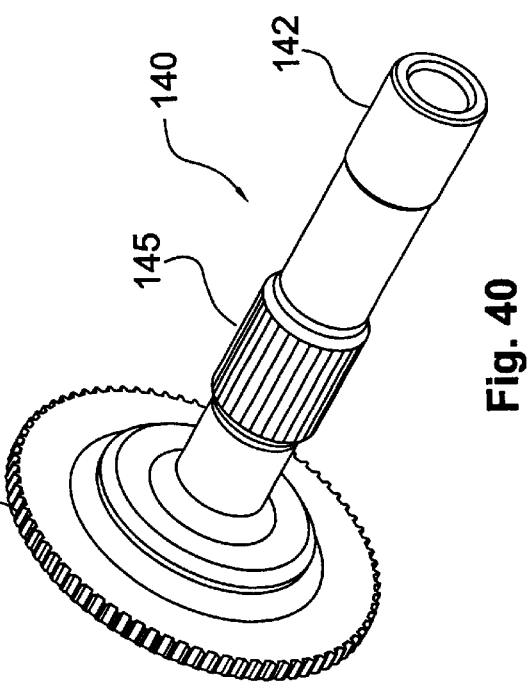
Figure 41:
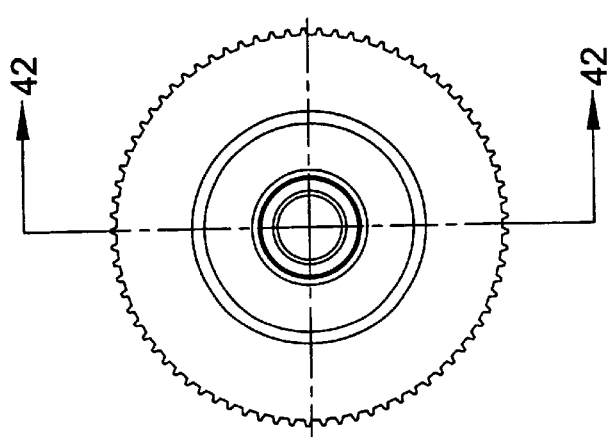

The input element 120 includes a sun gear 125 of the epicyclic gearset 85, engaged with four planet gears 130 in a planet carrier 132, as shown in FIGS. 6–9, 11 and 5A. The planet gears 130 are engaged with a ring gear 135, shown in detail in FIGS. 37–39 which is engaged with and drives a splined flange 137 on a pump drive shaft 140, shown in detail in FIGS. 40–42. The input end 142 of the pump drive shaft is supported on a bearing 144 lying between bearing flanges 146 and 148 on the input element 120 and the input end of the pump drive shaft, respectively. A splined section 145 of the pump drive shaft is engaged with a splined bore of the pump cylinder block to drive the pump cylinder block about its axis of rotation. The support for the epicyclic gearset 85 is by way of the bearings of the output shaft of the prime mover 55. The distal end 142 if the pump drive shaft 140 is supported in bearings 149 mounted in a bore 147 in the output end of the main housing 106.

Figure 4:
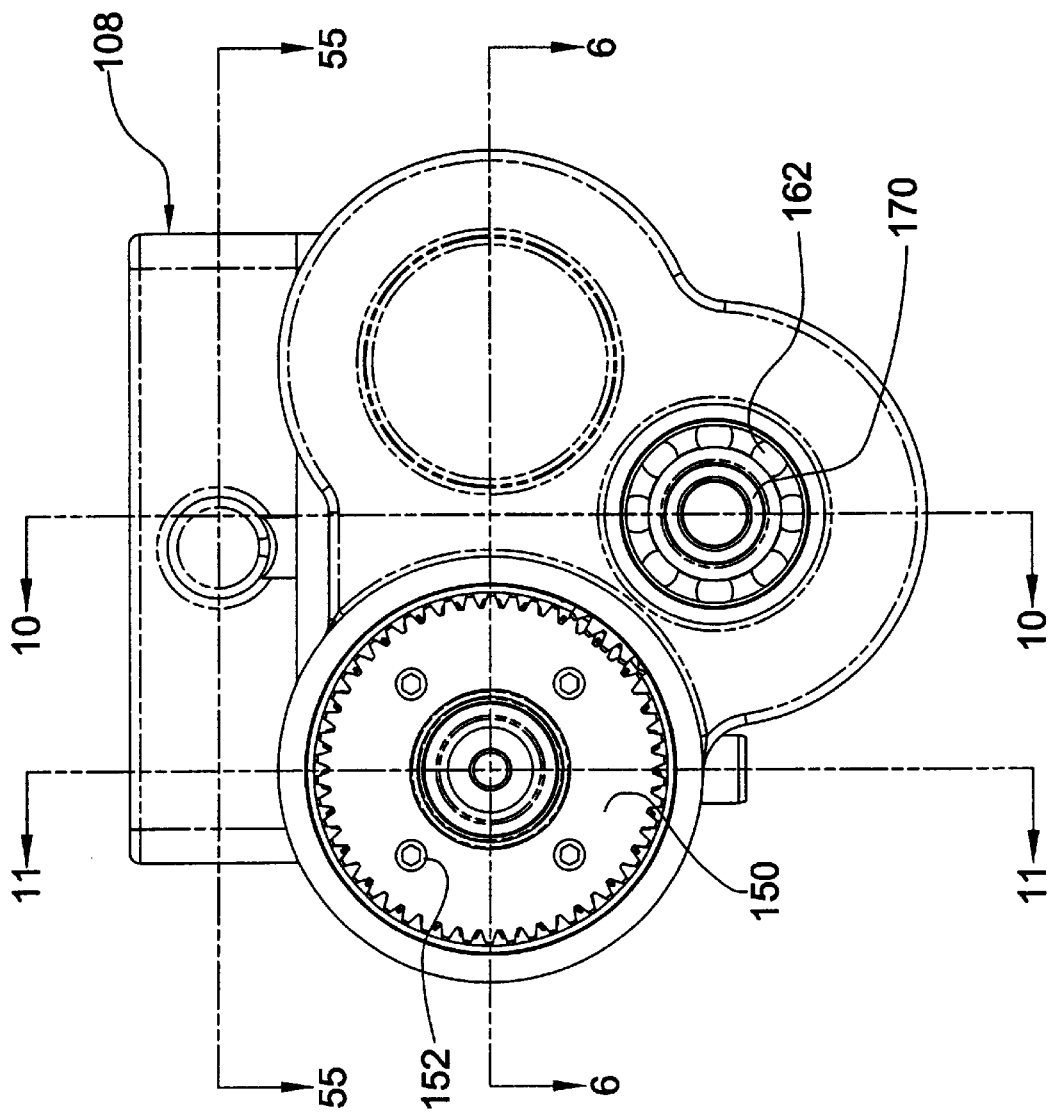
FIG. 4 is an end elevation of the transmission shown in FIG. 2 from the input end.
Figure 5:
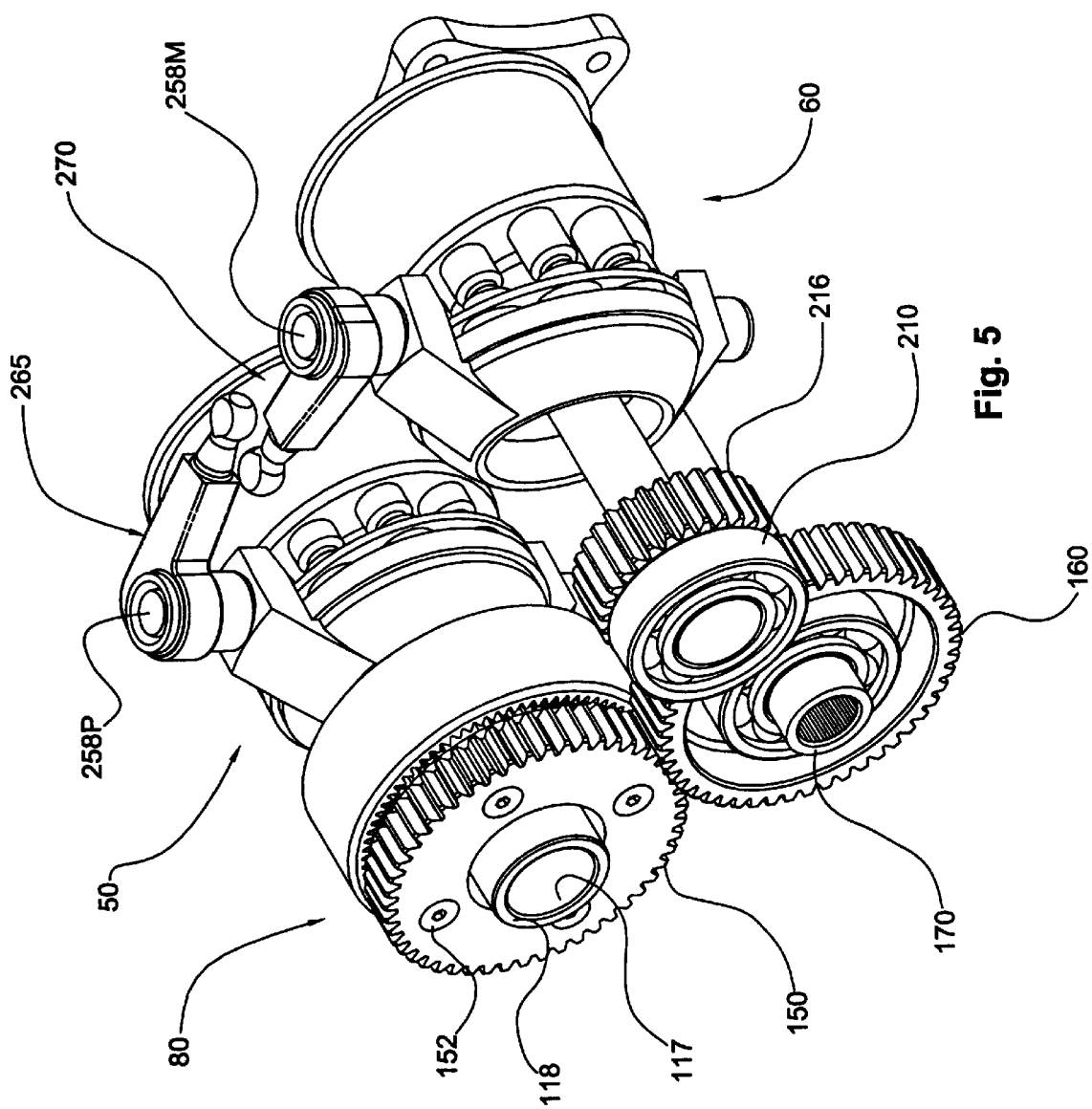
FIG. 5 is a perspective view of the internal components of the transmission shown in FIG. 2 viewed from the input end.
Figure 5A:
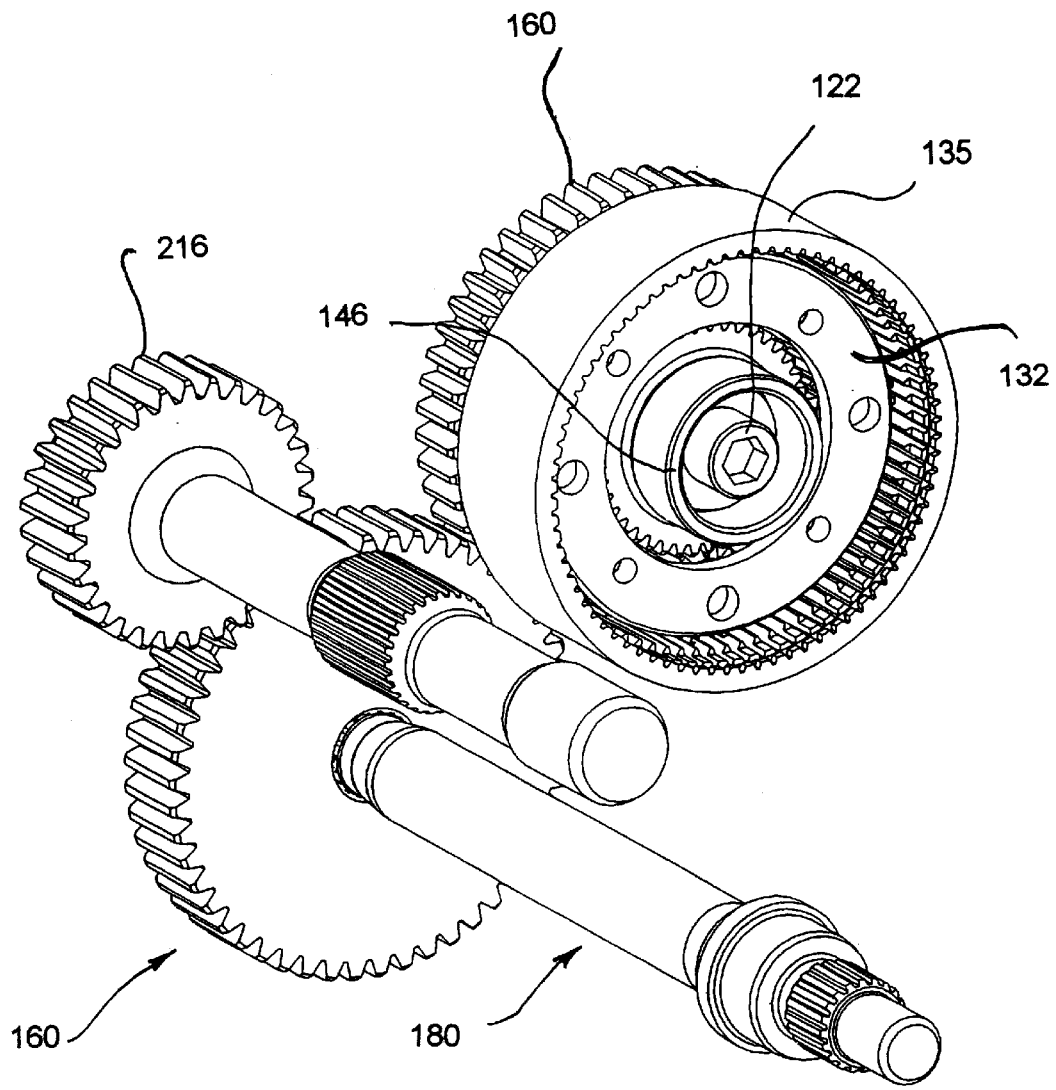
FIG. 5A is a perspective view of the gearing shown in FIG. 5, viewed from the output end.

Torque from the prime mover 55 driving the input element 120 is transmitted from the sun gear 125 through the ring gear 135 to the splined flange 137 of the pump drive shaft 140 to drive the cylinder block of the pump 50. The reaction torque from the pump 50 is reacted back through the pump drive shaft and ring gear 135 to the planet gears 130 and thence to the planet carrier 132. As shown in FIGS. 4 and 5, the planet carrier is fastened to a carrier spur gear 150 by machine screws 152. The spur gear 150 is supported on a set of needle bearings 154 on the input sleeve 118 of the input element 120.

Figure 8:
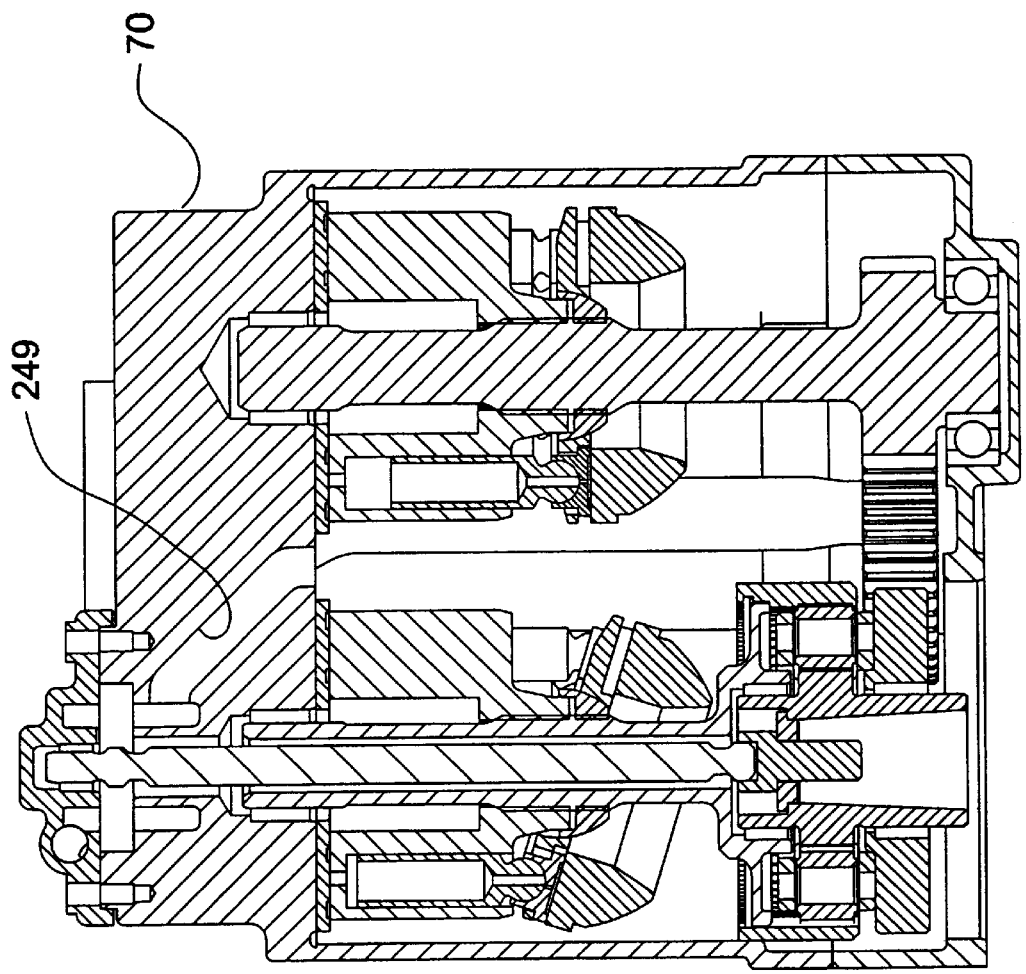
Figure 9:
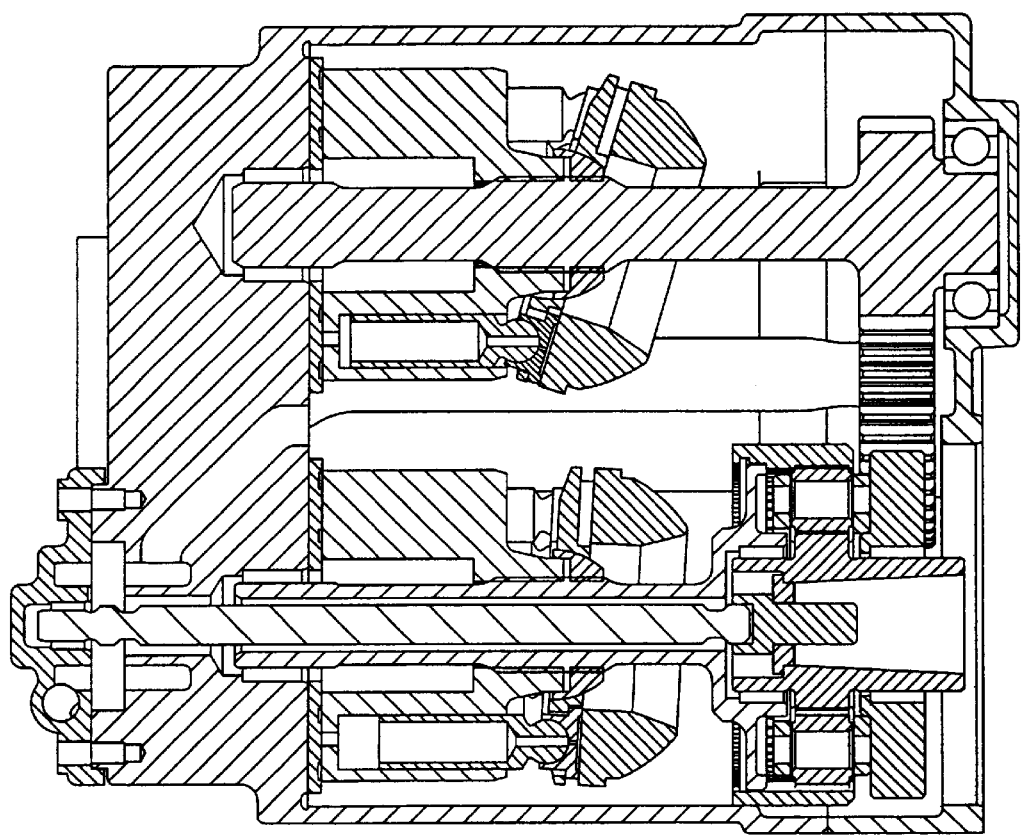
Figure 10:
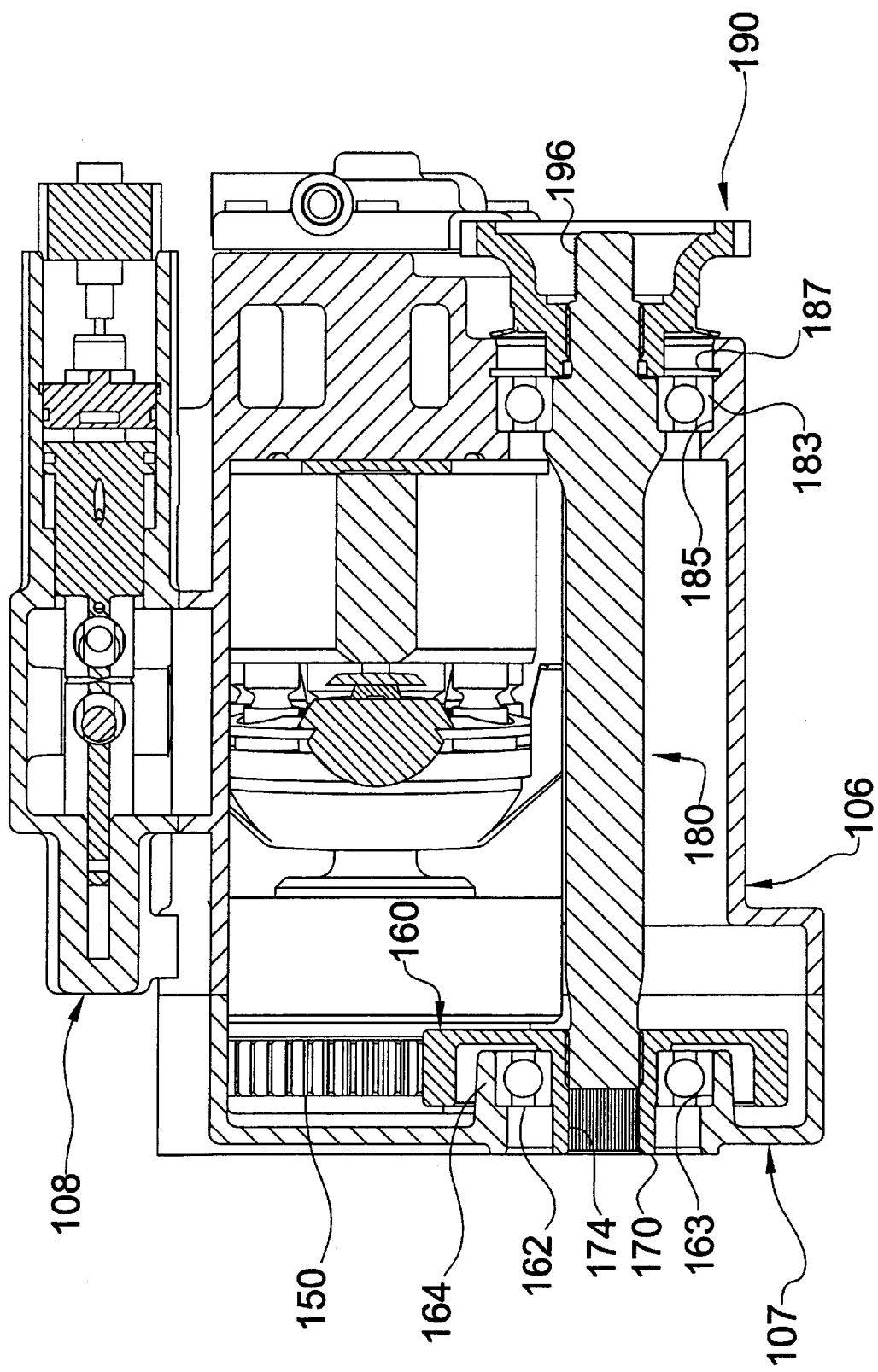
FIG. 10 is a sectional elevation along lines 10—10 in FIG. 4 on a section through the output shaft.
Figure 11:
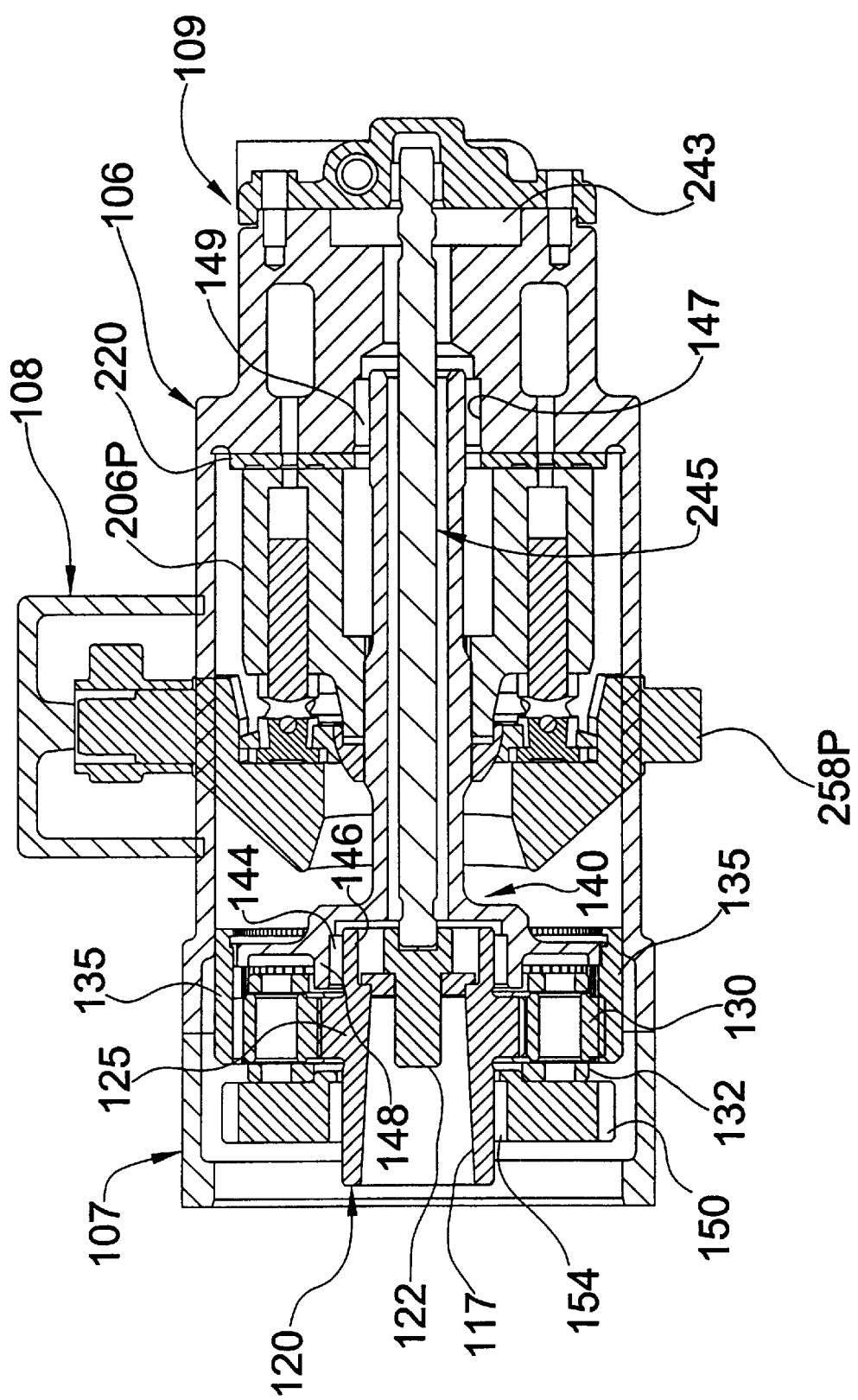
FIG. 11 is a sectional elevation along lines 11—11 in FIG. 4 on a section line through the axis of the pump.
Figure 43:
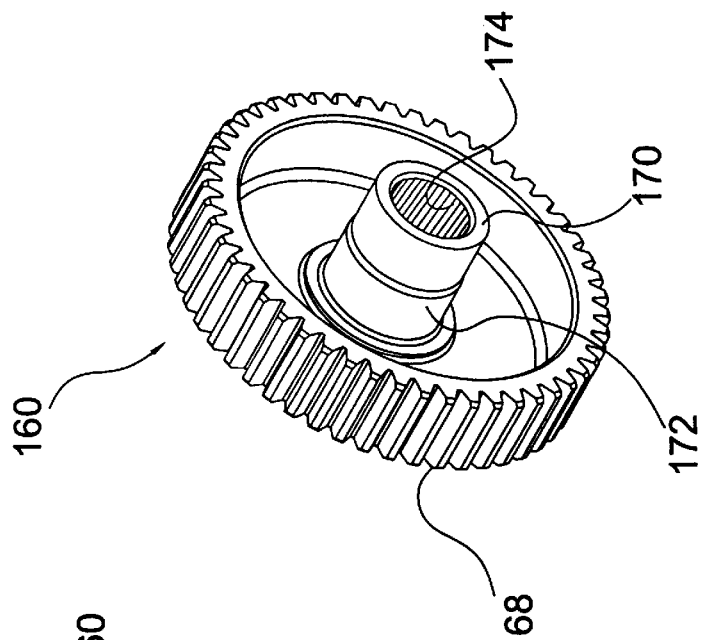
FIGS. 43–45 are various views of the output spur gear shown in FIG. 10.
Figure 44:
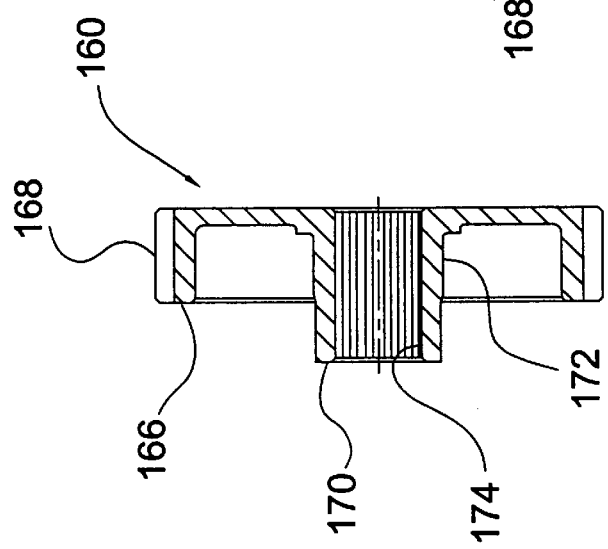
Figure 45:
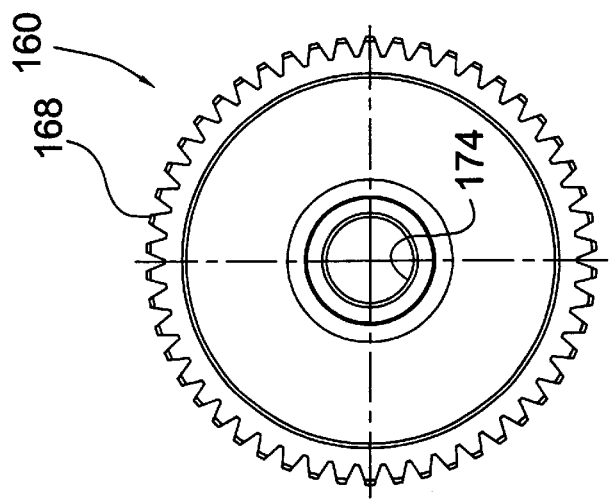

The carrier spur gear 150 is engaged with an output spur gear 160, shown in FIGS. 5, 6–9 and 10, and shown in detail in FIGS. 43–45, which is journaled on a bearing 162 mounted in a bearing seat 163 on an inwardly projecting tubular nipple 164 on the input end housing 107. The output spur gear 160 has an outer flange 166 on which the gear teeth 168 are cut, and a concentric inner stub tube 170 having a radial outside surface 172 concentric with the flange 166 for engaging the bearings 162. The bore 174 of the inner stub tube 170 is splined to receive a splined end 175 of an output shaft 180, as shown in FIGS. 10, 46 and 47. The entire bore 174 is splined so that output torque may be taken from both ends of the transmission, as indicated in FIG. 1 and in FIGS. 2 and 3, for convenience in driving a 4-wheel drive vehicle.

Figure 12:
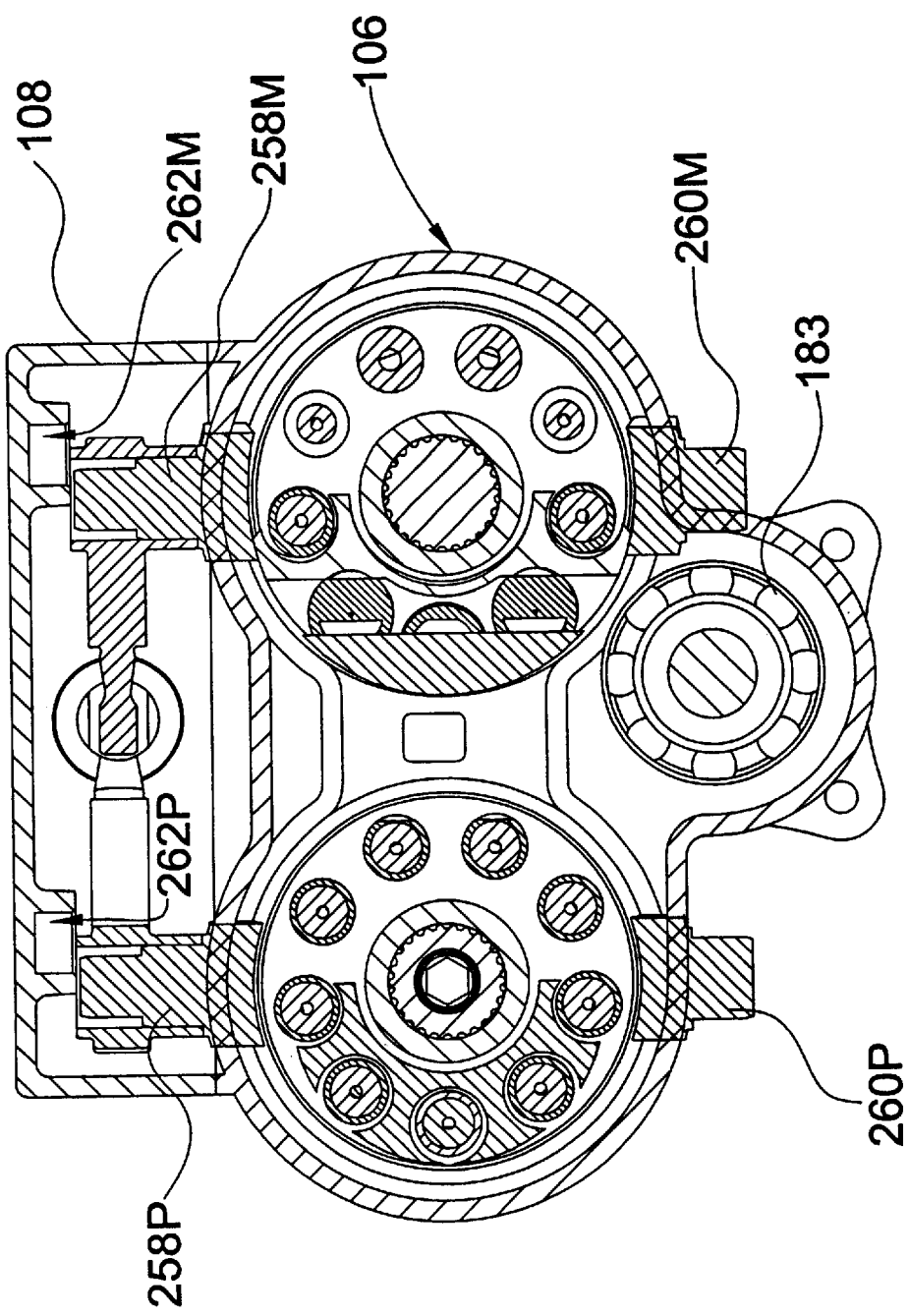
FIG. 12 is a sectional elevation on a section line normal to the parallel axes of the pump and motor and through the middle of the swashplate trunnions and the displacement control bell-cranks.
Figure 19:
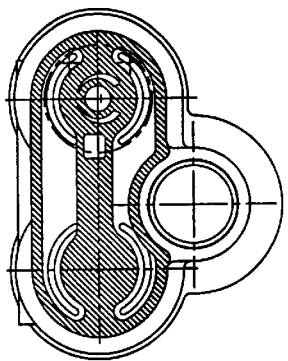
FIGS. 13–19 are various views of the main housing shown in FIG. 2.
Figure 14:
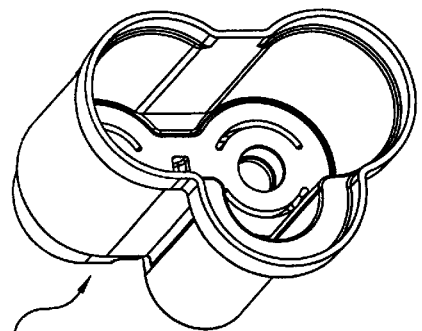
Figure 15:
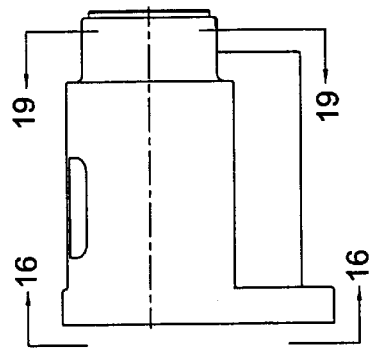
Figure 13:
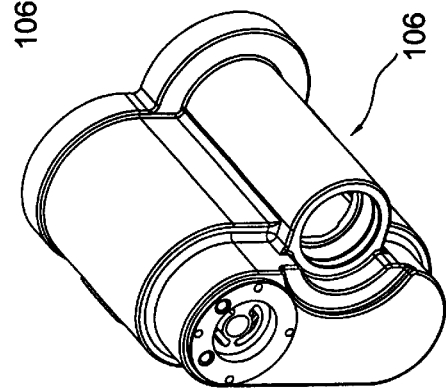
Figure 16:
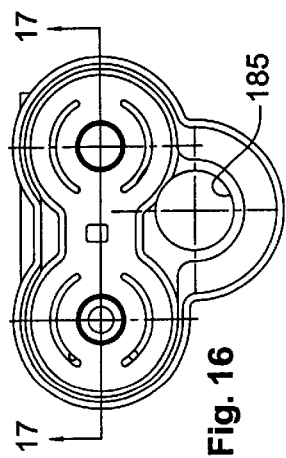
Figure 17:
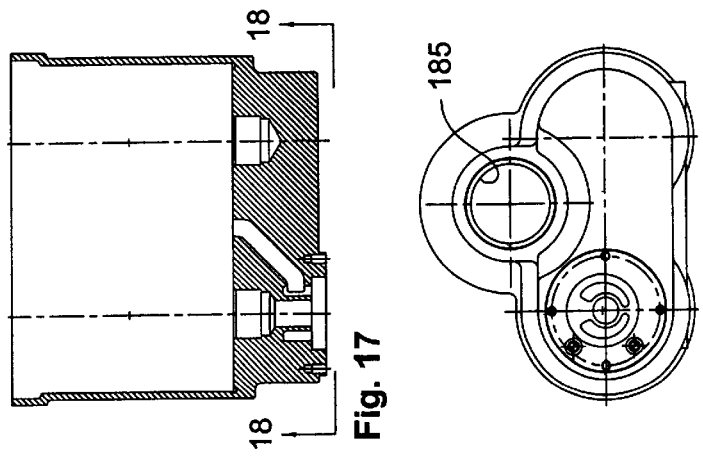
Figure 18:
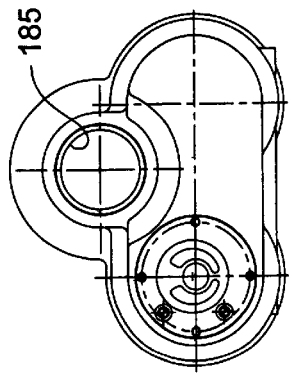
Figure 23:
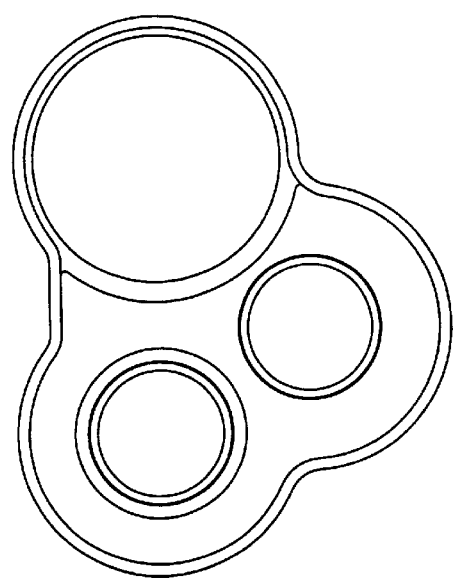
FIGS. 20–23 are various views of the input end housing shown in FIG. 2.
Figure 22:
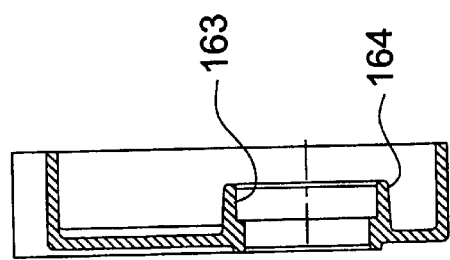
Figure 48:
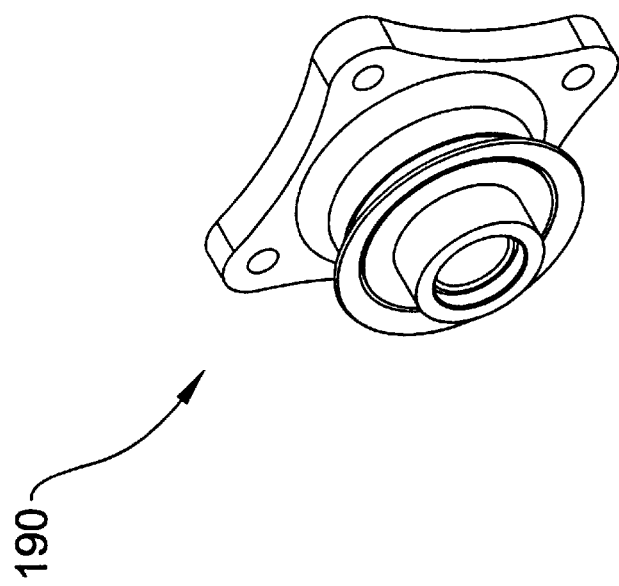
FIGS. 48–50 are various views of the output element shown in FIGS. 3 and 10.
Figure 50:
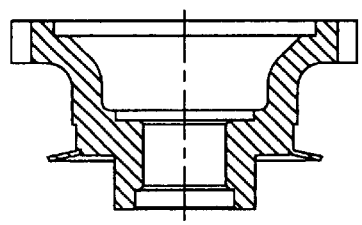
Figure 49:
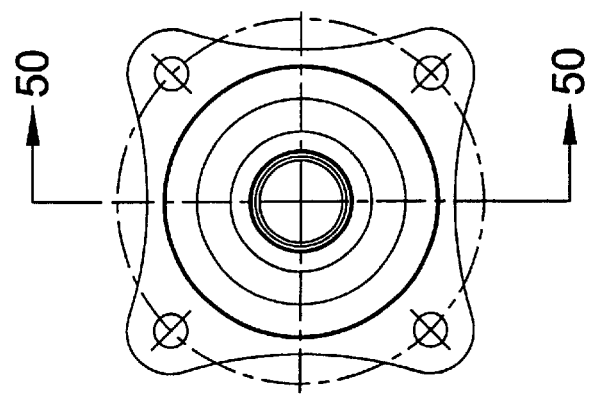
Figure 52:
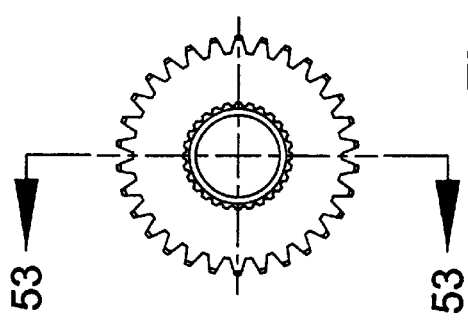
FIGS. 51–53 are various views of the motor drive shaft shown in FIG. 5A and 6.
Figure 51:
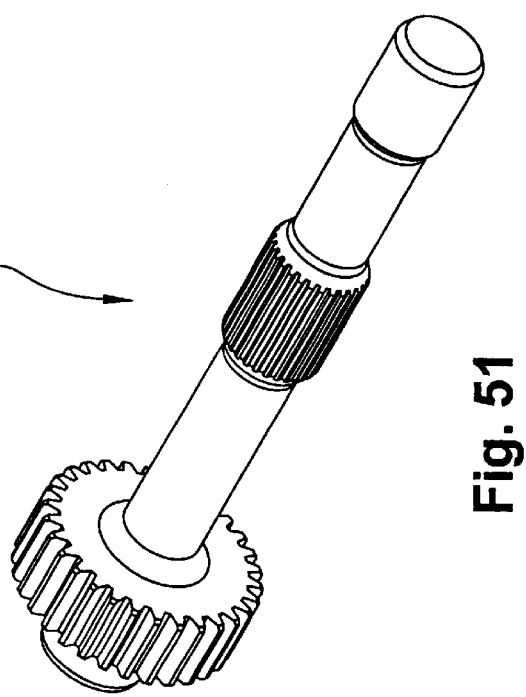
Figure 53:
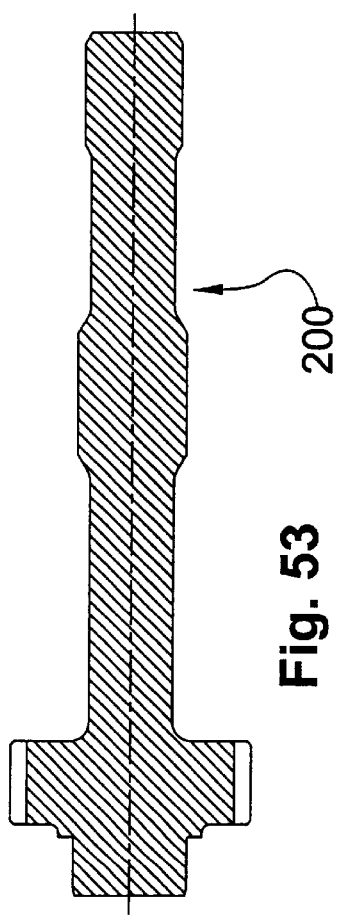

The output end of the output shaft 180 is journaled in a bearing 183, shown in FIG. 10 and 12 which is mounted in a stepped axial bore in the output end of the main housing 106 and held in place by a circlip (not shown) in an annular groove 187 in the bore 185. Torque is output from the output end of the output shaft 180 through an output fitting 190, shown in FIG. 10 and shown in detail in FIGS. 48–50, having a splined bore 192 engaged with splines 194 on the output end of the output shaft 180. The output fitting 190 is held on the end of the output shaft 180 by a nut (not shown) that is threaded onto a projecting threaded end 196 of the output shaft 180 and torqued against the output fitting 190.

Figure 2:
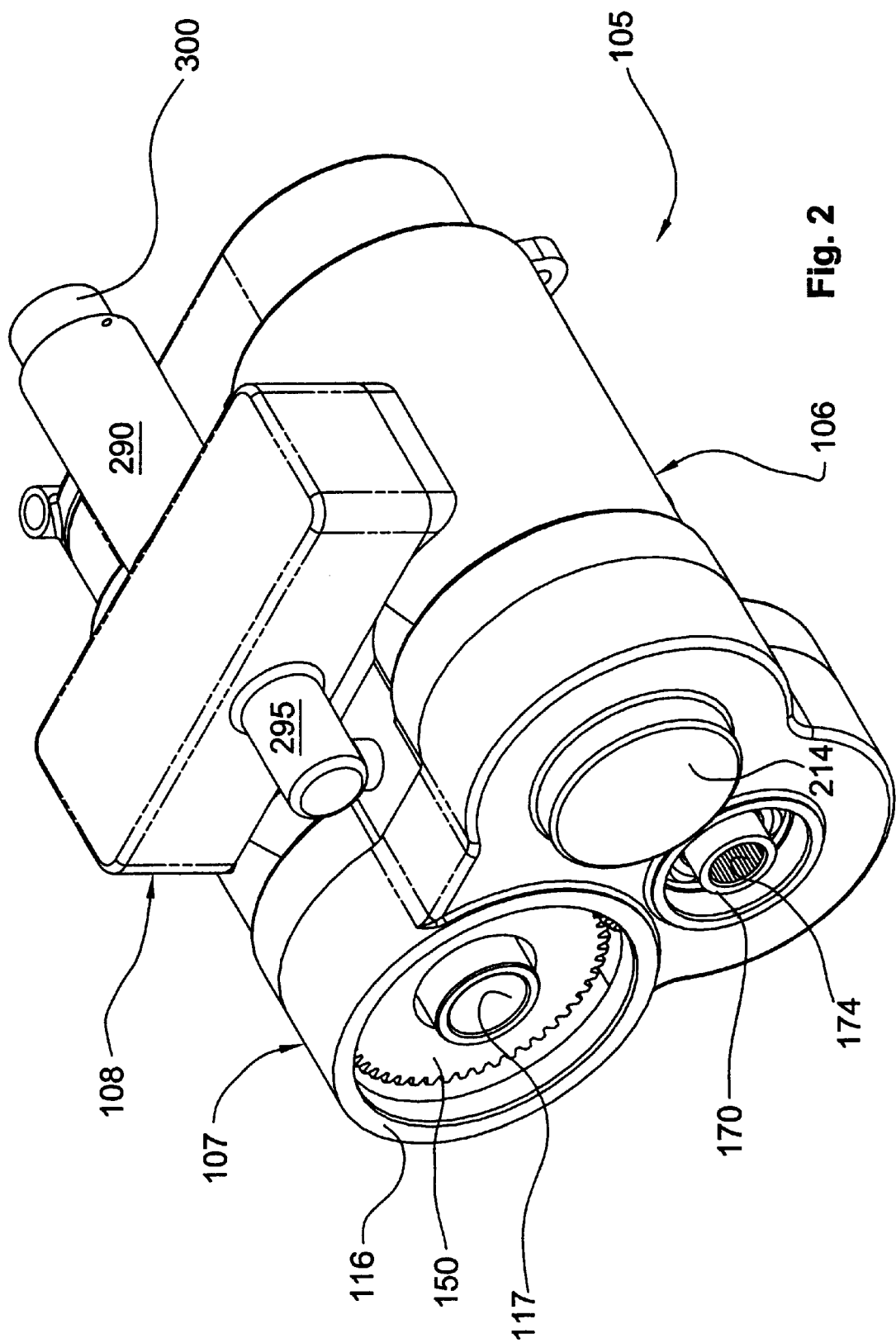
FIG. 2 is a perspective view from the input side of one version of the transmission shown in the schematic diagram of FIG. 1.
Figure 3:
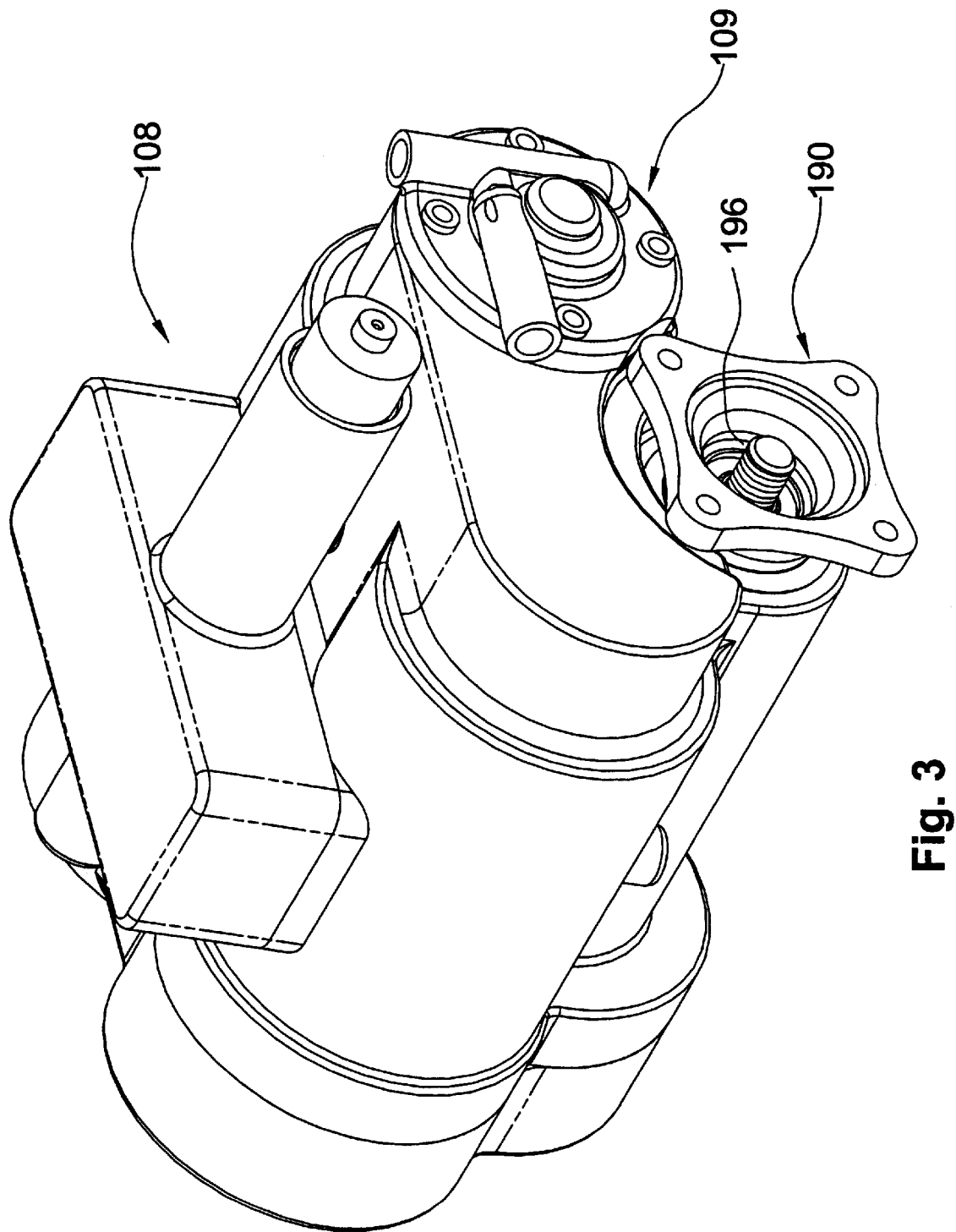
FIG. 3 is a perspective view from the output side of the transmission shown in FIG. 2.
Figure 6:
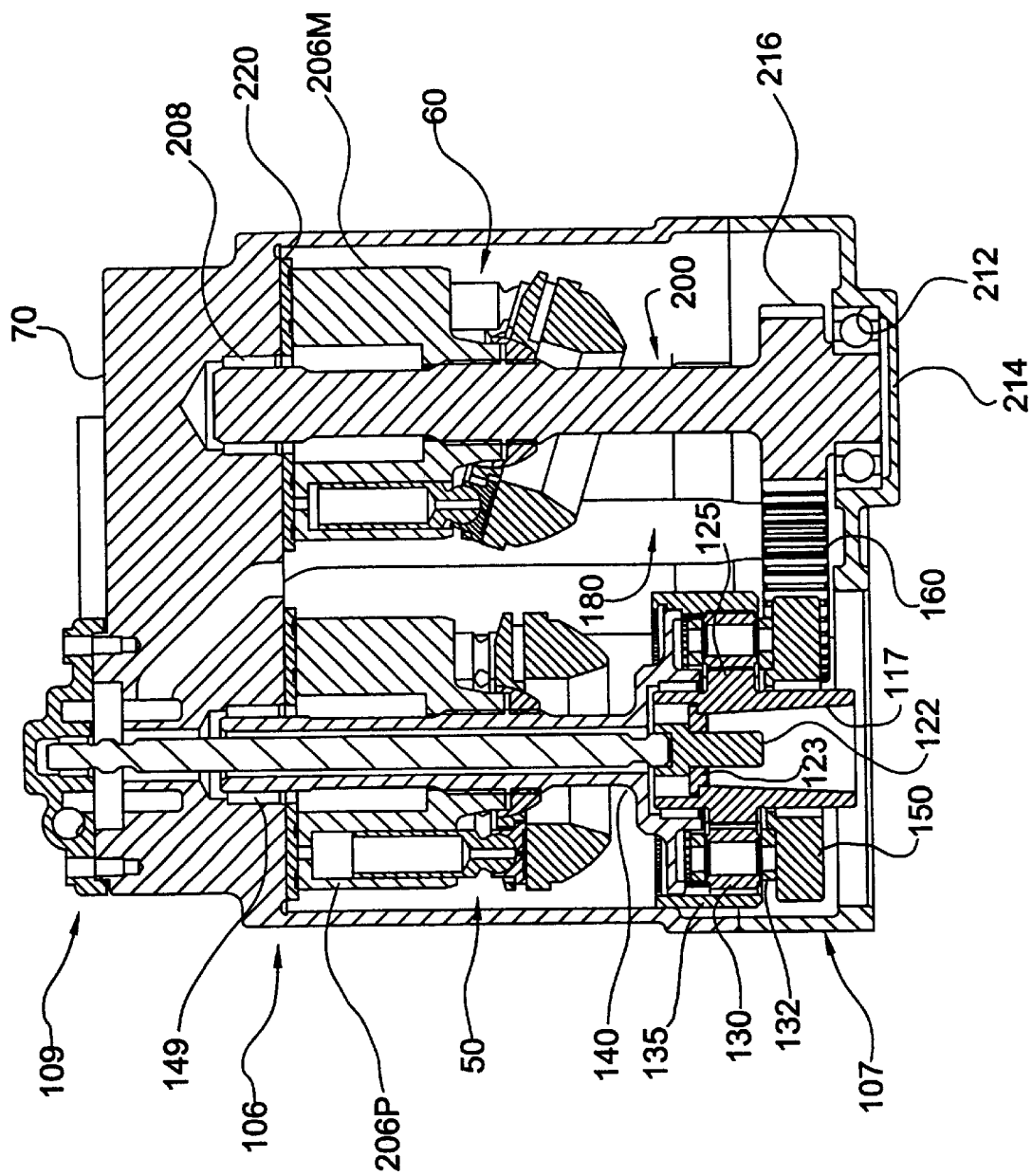
FIGS. 6–9 are sectional plan views of the pump and motor along lines 6—6 in FIG. 4 showing the transmission in neutral (FIG. 6), in reverse (FIG. 7), in maximum speed ratio (FIG. 8) and in maximum torque ratio (FIG. 9)
Figure 20:
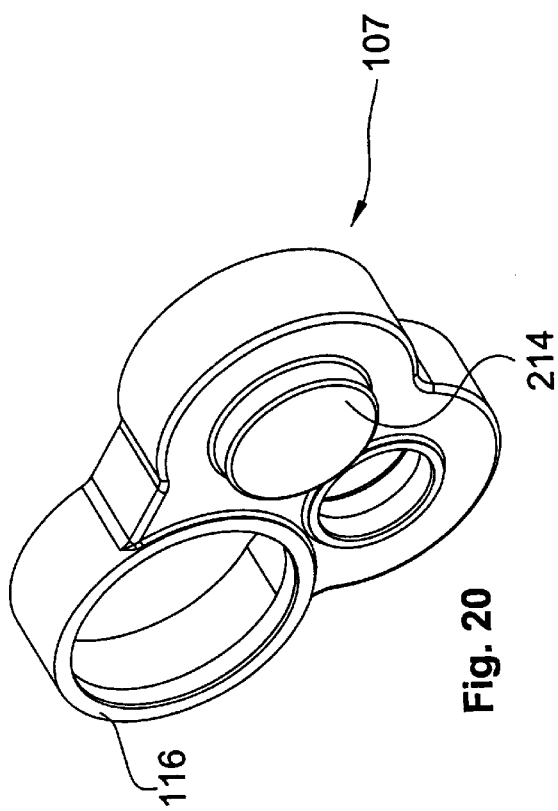
Figure 21:
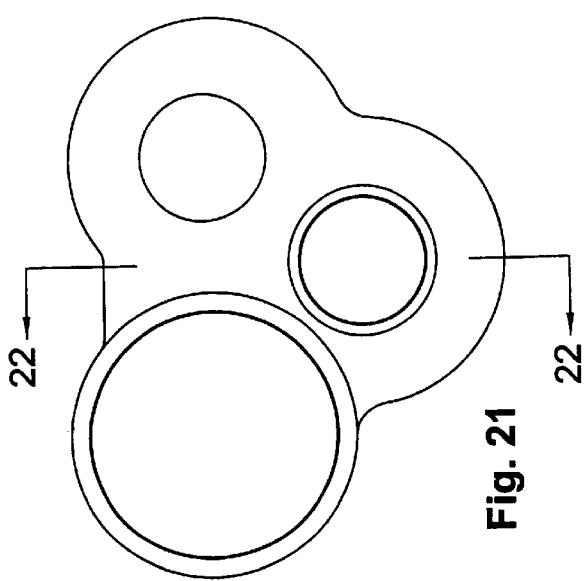
Figure 33:
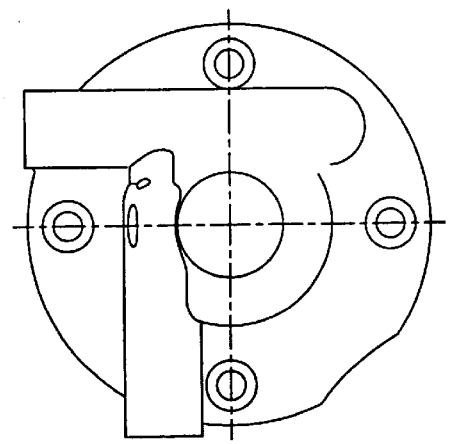
FIGS. 28–33 are various views of the make-up pump housing shown in FIG. 3.
Figure 32:
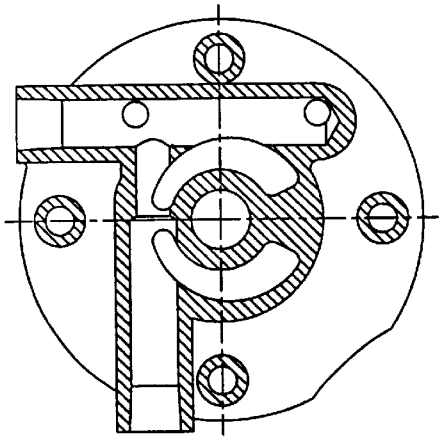
Figure 31:
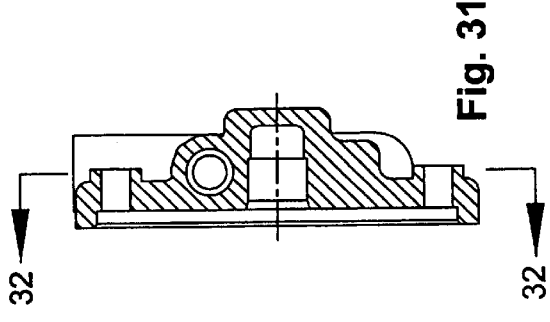
Figure 28:
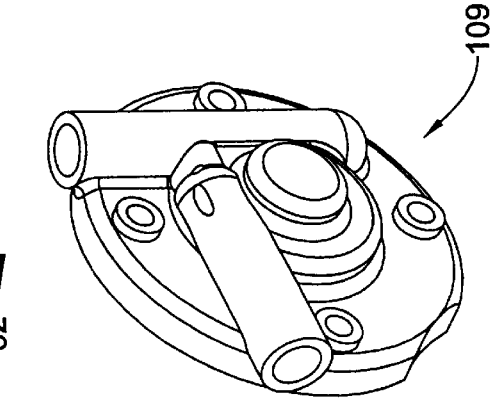
Figure 30:
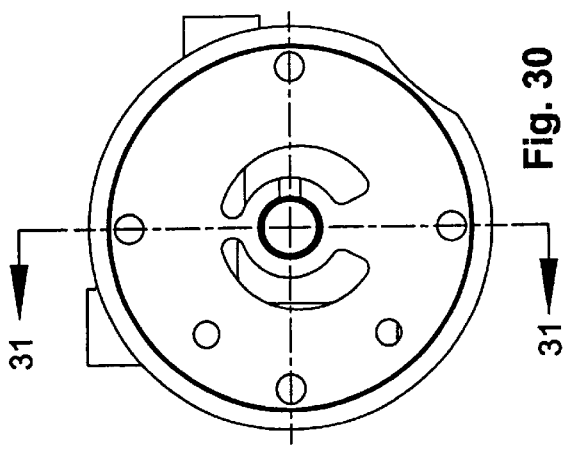
Figure 29:
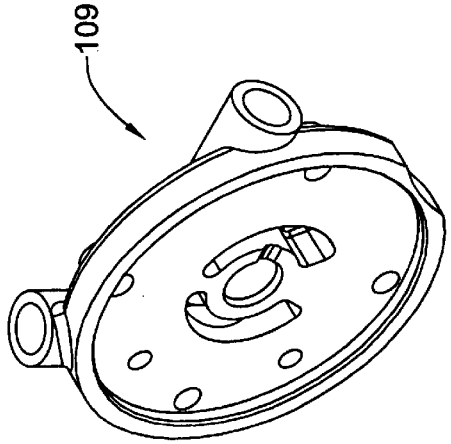
Figure 54:
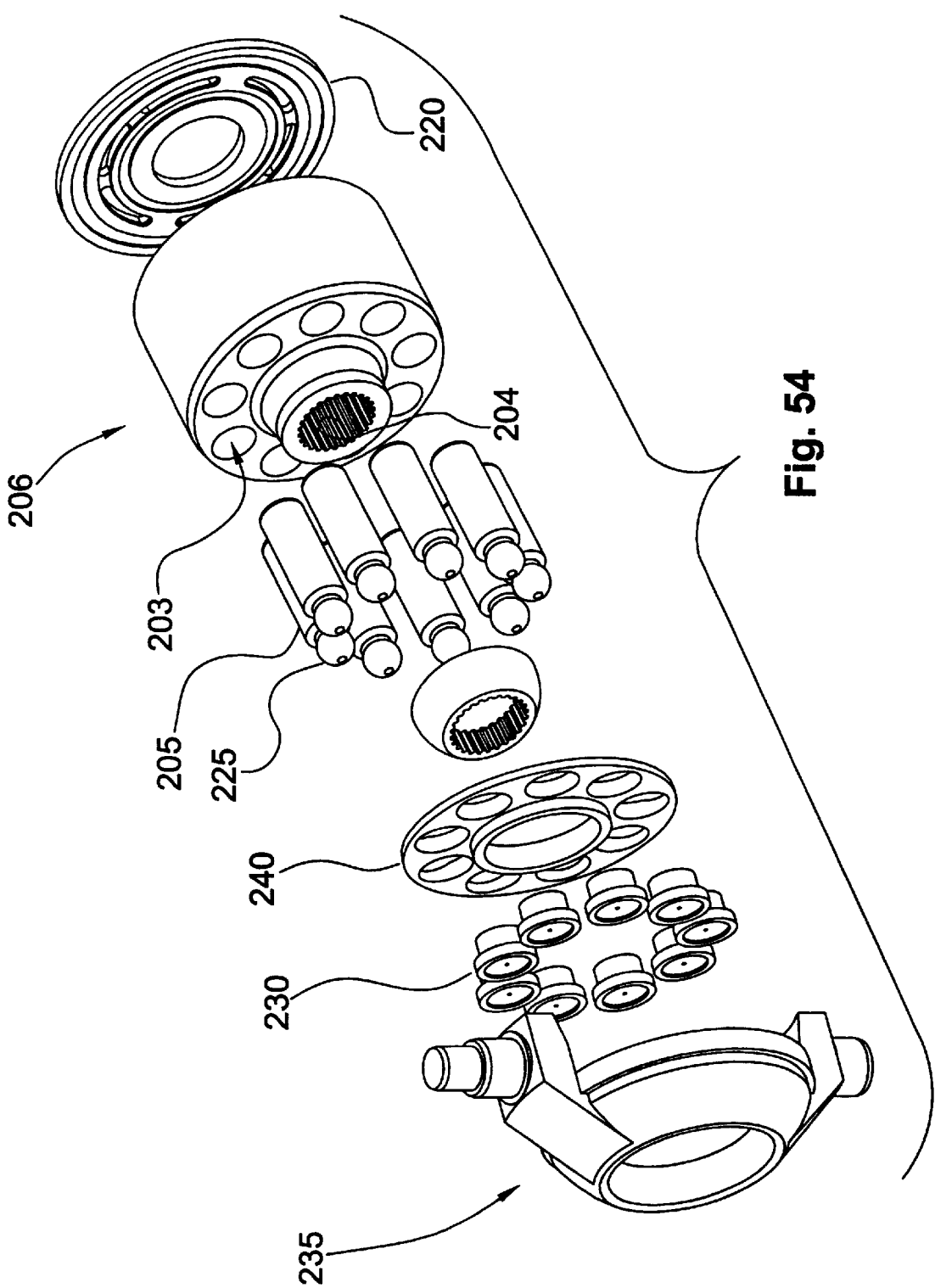
FIG. 54 is an exploded perspective view of the pump and the motor shown in FIG. 6, both pump and motor being identical.
Figure 55:
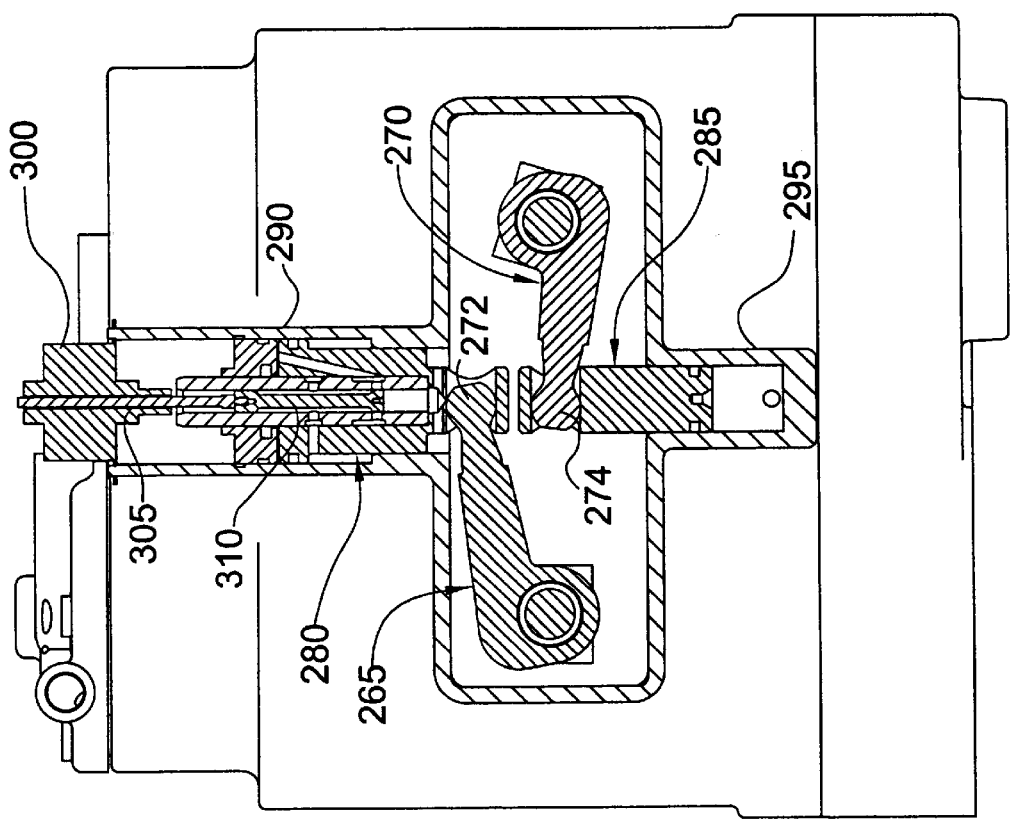
FIGS. 55–58 are plan views of the pump and motor displacement control unit shown in FIGS. 1, 5, 10 and 11.
Figure 56:
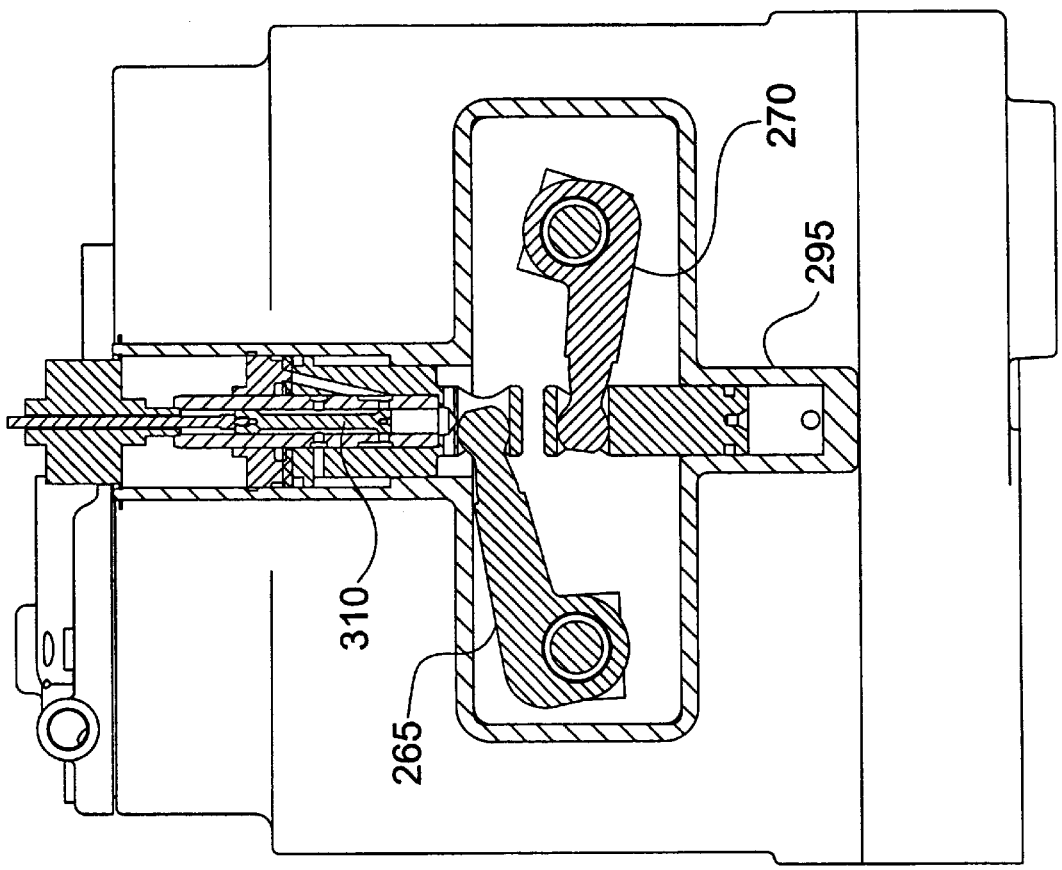
Figure 57:
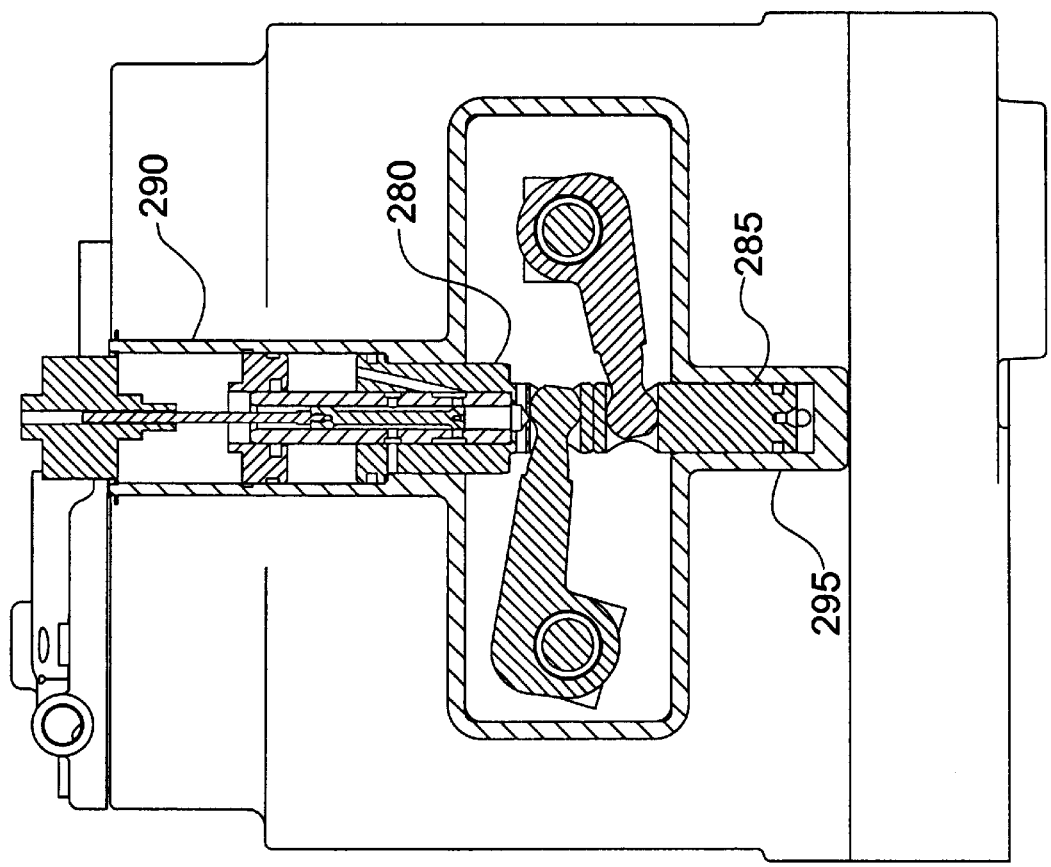
Figure 58:
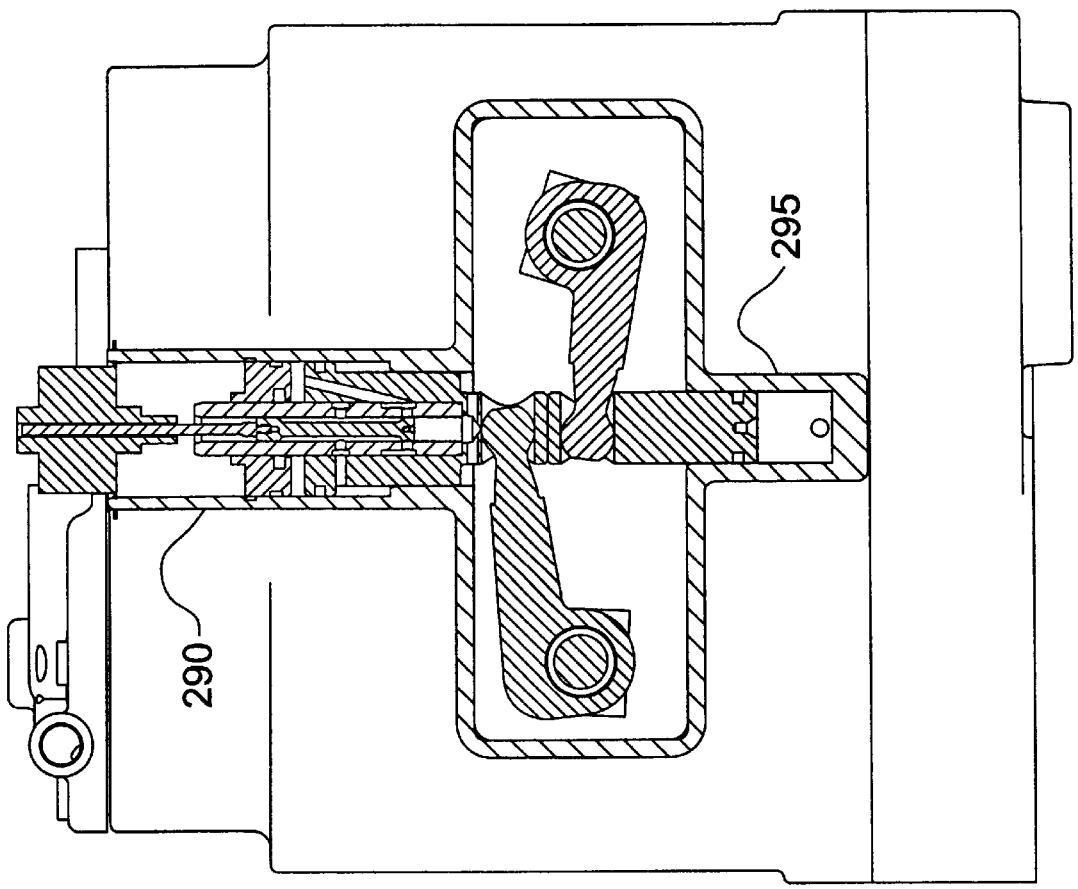
Figure 59:
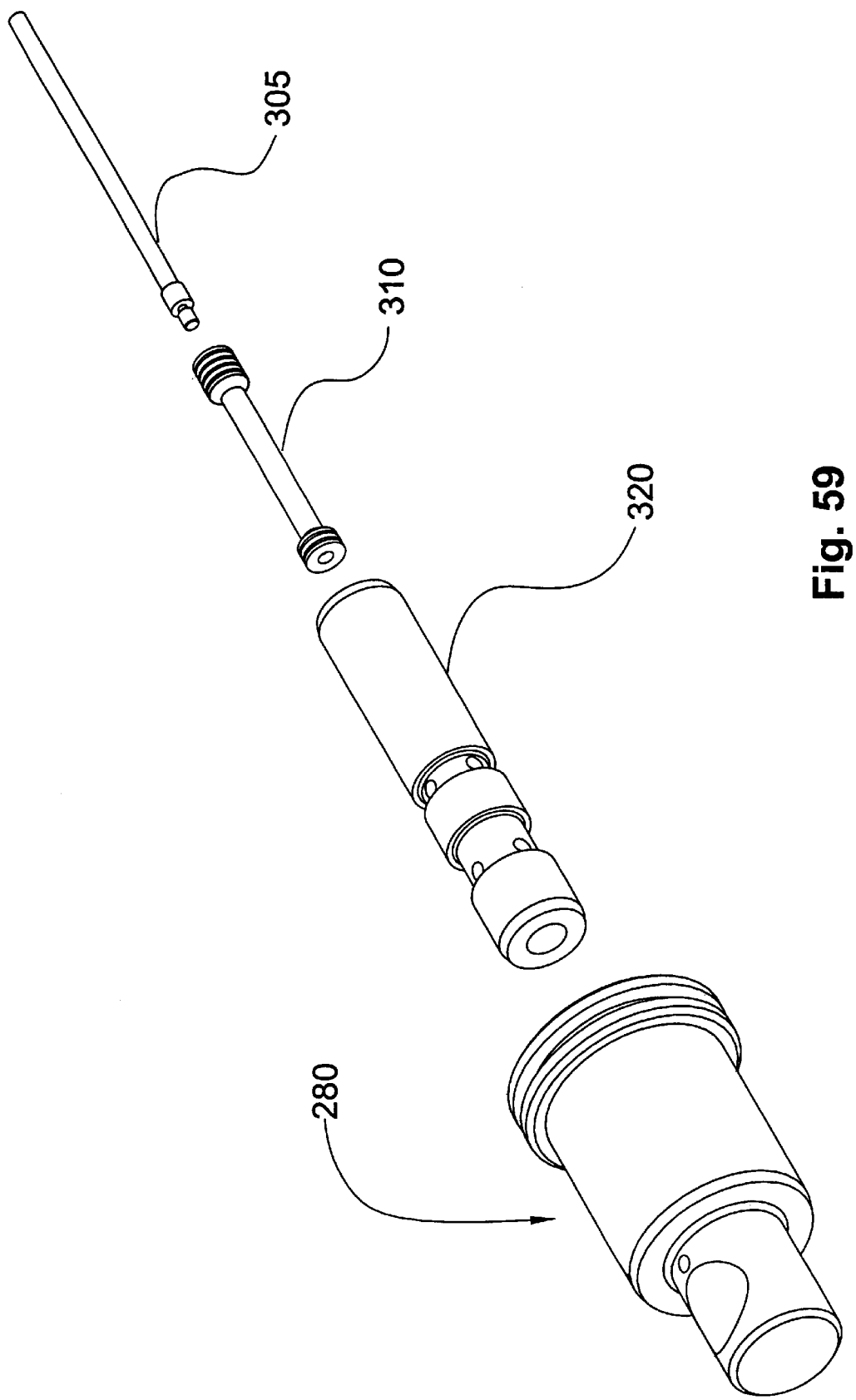
FIG. 59 is an exploded perspective view of the control unit shown in FIGS. 55–58.

Fluid pressurized in the pump 50 is conveyed through passages in the manifold 70 to the motor 60 where it is converted to output motor torque and conveyed to a motor output shaft 200 by way of a spline 202 on the motor output shaft 200 engaged with a splined bore 204 in the motor cylinder block 206, shown in FIGS. 6 and 54. The motor output shaft 200 is journaled in a bearing 208 in the manifold block 70 and a front bearing 210 in a bearing recess 212 within a bearing boss 214 in the input end housing 107, as seen in FIGS. 2, 6 and 20. The motor output torque is conveyed through the motor output shaft 200 and through an integral gear 216 in meshing engage with the output spur gear 160 to add the torque, conveyed from the motor 60 through the motor output shaft 200 to the output shaft, to the torque conveyed from the carrier spur gear 150, so that the total output torque to the output shaft is the mechanical portion conveyed from the carrier spur gear and the hydraulic portion conveyed from the motor 60 through the motor output shaft 200.

Figure 7:
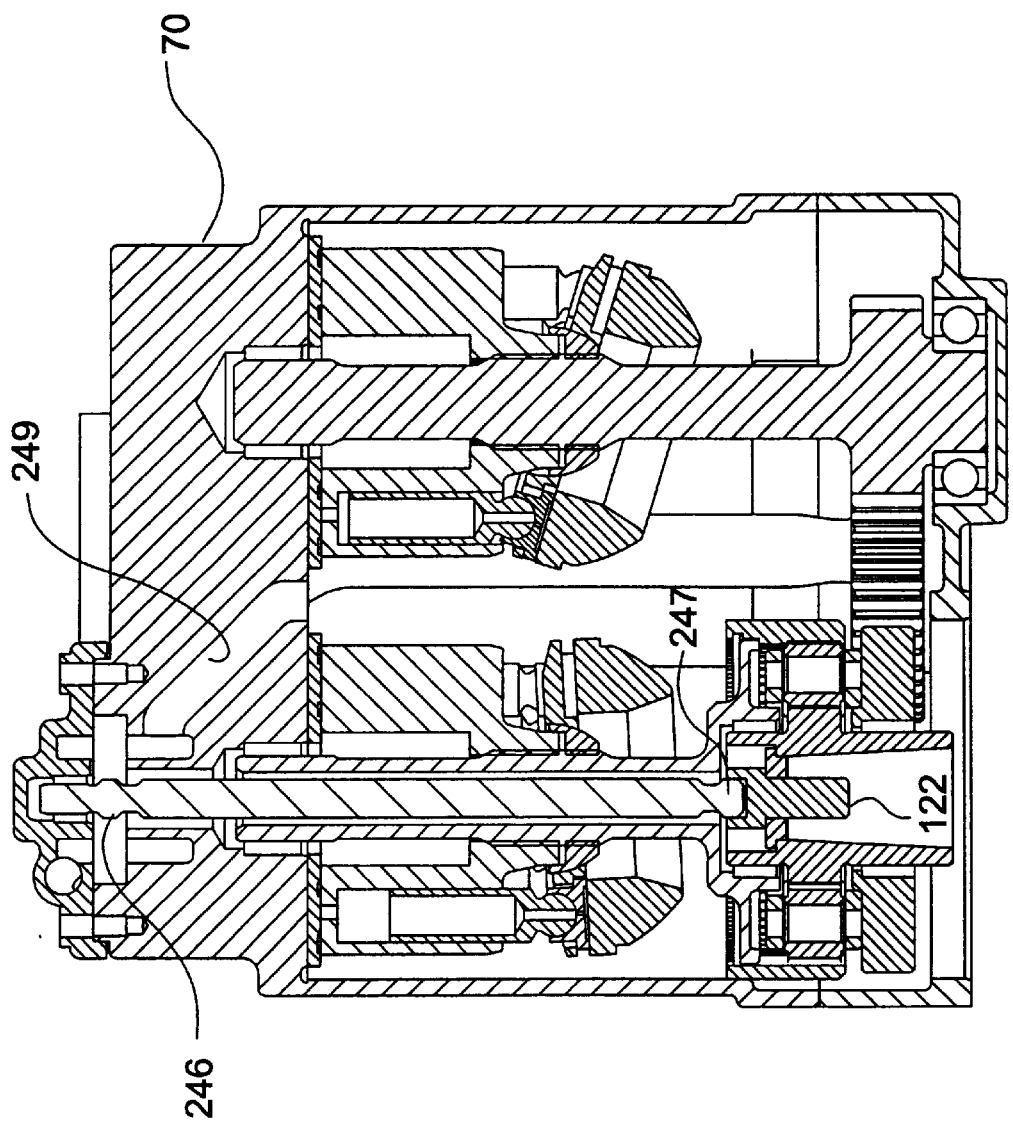

The hydraulic torque from the motor 60 is generated by the action of fluid pressurized in the pump 50, shown in FIGS. 7–9. Rotation of the pump cylinder block 206P is by spline engagement of the splined section 145 of the pump drive shaft 140 to rotate the pump cylinder block 206P against a valve plate 220P which commutates the fluid displaced from cylinders 203P in the pump cylinder block 206P into pressure passages in the manifold 70 opposite the "descending" slope of the swashplate surface, and suction passages opposite the "ascending" slope of the swashplate. Pump pistons 205P in the pump cylinders 203P have piston heads 225P which swivel in slippers 230P held against the flat surface of a swashplate 235P by a hold-down plate 240P. The structure shown in FIG. 54 is conventional and is commercially available, e.g. from Sundstrand Hydrogear.

The pressurized fluid commutated by the pump valve plate 220P to a pressure channel in the manifold block 70 is conveyed directly to a pressure port in the manifold 70 where it is distributed by the pressure slot in the motor valve plate 220M to the cylinders 203M on the "ascending" side of the motor cylinder block 206M. The fluid pressure acting against the motor pistons 205M to drive them axially outward against the motor swashplate 235M. The action of the axially acting pistons against the tilted surface of the motor swashplate 235M is resolved into a circumferential force which drives the motor cylinder block "downhill" relative to the tilt angle of the surface of the motor swashplate 235M. Continued rotation of the motor cylinder block 206M forces the motor pistons 205M back into the cylinders 203M to displace fluid in the cylinders 203M back through the suction passages in the manifold and thence into the pump cylinders 203P on their suction stroke.

The make-up pump 52 is provided to make up any fluid lost in the system by leakage, and also to pressurize the displacement control system, as described below. The make-up pump 52 is a conventional commercially available pump such as a gerotor type available from a number of sources. It is located in a cavity 243 in the manifold block 70 and is driven by a hexagonal section 246 of a quill shaft 245 having a hex head 247 engaged in the hex recess of the bolt 122 shown in FIG. 5A. The make-up pump 52 draws fluid from the housing through a suction passage 249 and the fluid pressurized in the pump is conveyed through an external fluid line through a filter 250 and thence through a one-way valve 252 to the pressure channel in the manifold block 70. Pressure is limited to a predetermined value, e.g. 100 psi, by a pressure relief valve 254.

The displacement control system 90 shown in FIGS. 1, 5, 10–12 and 55–59 is designed to control the tilt angle of the pump and motor swashplates 235P and 235M. The two shashplates 235P and 235M each have top and bottom trunnions 258 and 260, respectively. The top trunnions 258 are mounted in sockets 262P and 262M in the lid of the control housing 108. The drawings of these sockets 262P and 262M are erroneous since they do not show the top trunnions 258P and 258M supported in the sockets 262P and 262M as intended. That error is easily remedied by repositioning the sockets 258P and 258M on the control housing 108 to align with the position of the trunnions 258. Likewise, bottom sockets are to be provided for the bottom trunnions 260P and 260M, and FIG. 12 does not reflect the presence of these sockets in the floor of the main housing. This is an omission easily corrected.

A pump control bell-crank 265 is mounted on the top pump swashplate trunnion 258P and a motor control bell-crank 270 is mounted on the top motor swashplate trunnion 258M for controlling the tilt angle of the pump and motor swashplates, and thereby controlling the pump and motor displacements. As shown in FIGS. 55–58, the bell-cranks have ball-ends 272 and 274 engaged in the ends of pump and motor control pistons 280 and 285 in cylinders 290 and 295 projecting from the control housing 108 as shown in FIG. 2. The stepper motor 300 moves a control rod 305, shown in FIG. 59, attached to a control spool 310 inside a spool valve 320. The spool valve is driven by fluid pressure to position itself at the same position on the control spool 310 and the pump control cylinder 280 follows the spool valve 320 to position the pump control cylinder 280 at the desired location determined by the position of the control spool 310. The motor control piston 285 is stopped at the maximum displacement position shown in FIGS. 55 and 56 by an internal stop and is biased to that position by system pressure in the cylinder 295. The position of the motor control bell crank 270 away from the maximum displacement position is controlled by the pump control piston engaging and pushing the motor control piston 285 against the system pressure in the cylinder 285 by virtue of the greater area of the cylinder 290.

In operation, input from the engine is connected to the sun gear (Sp) 125 of the planet set 85 and then on to the make-up pump housed in the manifold. The ring gear (Rp) 135 of the planet set 85 is connected drivingly to the cylinder block of the pump 50. The planet carrier 132 of the planet set 85 is connected to the spur gear (Sg3) 150 which drives the output spur gear 160 connected to the output shaft (Sg1) 180. The cylinder block of the motor is connected to a spur gear (Sg2) which also drives the spur gear connected to the output shaft (Sg1).

When the transmission is at neutral, the output shaft is stationary, hence the motor and planet carrier are also stationary. The sun gear rotates at input speed and therefore the ring gear (and hence the pump) rotates at input speed multiplied by the ratio of the numbers of teeth in the sun gear and ring rear (Sp/Rp), in the opposite direction to the input. In the preferred embodiment, the ratio is (43/77)=0.558 times input speed. Since the pump is at zero displacement, there is no pumping; therefore, no reaction torque can be generated at the pump. Hence, the pump rotates freely and there is no transmission of output torque to the output shaft.

A 'dump valve' may be opened to 'short circuit' the high and low pressures of the pump and motor, so if there were to be some small displacement of the pump, there would still be no pressure, and hence, no torque would be generated with the dump valve open. The dump valve is closed electronically only when the operator selects the 'drive' or 'reverse' mode on the mode selector switch. The controller closes the dump valve only after ensuring, via a sensor, that the pump is at zero displacement.

Due to the planet set configuration, the input torque is split into two parallel paths. One is a direct mechanical path fed continually to the output shaft at the ratio of input torque multiplied by (1+(Rp/Sp)). The other is a hydraulic path fed continually to the pump at the ratio of input torque multiplied by (Rp/Sp).

As the pump is stroked to give a small displacement and is rotating at input speed multiplied by (Sp/Rp), it pumps fluid which flows directly through the manifold and drives the motor in the same direction to give output torque. Due to the fact that the pump is at a small displacement, a small amount of torque to the pump results in a high pressure and low flow rate. Since the motor is at a large displacement, the low flow rate from the pump at high pressure results in a high output torque and low output speed. This high 'hydraulic' output torque is multiplied by the gear ratio (Sg1/Sg2) and is then added directly to the mechanical output torque as described above. Therefore the total output torque can be expressed as:

$$\text{Output Torque} = \text{Input Torque} \times [(1+(Rp/Sp))+(Rp/Sp) \times \text{motor disp/pump disp} \times (Sg1/Sg2)]$$

It can therefore be seen that there is a total output torque comprising a fixed mechanical torque portion plus a variable hydraulic torque portion. As the ratio of motor displacement to pump displacement decreases, the amount of hydraulic torque decreases. When the motor displacement has been reduced to zero, the hydraulic torque portion reduces to zero and the only output torque is the fixed mechanical torque portion.

As the pump displacement increases, flow rate from the pump increases, and this increased flow causes the motor and hence the output shaft to increase in speed. As the output shaft increases in speed, the planet carrier increases in speed relative to the input shaft and hence sun gear speed, this causes the ring gear speed to decrease, which causes the pump speed to decrease. This has the effect of reducing the total system hydraulic fluid flow rate, when compared to a conventional hydrostatic transmission of the same capacity, to approximately $\frac{1}{3}$ to $\frac{1}{4}$ depending on planet set ratios used. This reduces the flow losses and noise levels normally associated with hydrostatic machines.

As the motor displacement approaches zero and the pump displacement approaches its maximum, the pump speed approaches zero and motor speed approaches its maximum. When the motor reaches zero displacement it can no longer accept fluid flow so the pump can no longer displace fluid and therefore stops rotating, causing the ring gear (Rn) to stop rotating. The pump now acts as a reaction unit for the ring gear. In this case all the input torque is now transferred through the planet set, via the planet carrier and spur gears Sg3 and Sg3, to the output shaft. Due to the ratio of the sun gear to ring gear, the output speed is decreased and the output torque increased, by a factor of 2.79: 1 in the disclosed preferred embodiment. Naturally, the ratio would be different in designs with different size gears. As the pump has been stroked to its full displacement, hydraulic pressure required to react the input torque has been reduced to a minimum, thus reducing hydraulic leakage losses and hydraulic loading of bearings to a minimum.

As all the power is now transferred through the planet set and spur gears Sg3 and Sg1, and the hydraulics are acting only as a reaction unit to hold the ring gear, the efficiency is very high (95+%). The only losses are the normal gearset losses (approx. 2%), slippage on the pump due to leakage, and windage losses on the motor due to the fact it is spinning at output speed×(Sg1/Sg2) with the unit at some pressure. To further increase the efficiency at this point a brake could be applied to the pump. This will help in two ways: first it will stop the input unit from slipping due to hydraulic leakage and second it will reduce the hydraulic system pressure to makeup pressure therefore reducing the load and hence windage loss of the motor. The brake could be actuated by makeup pressure or by electromechanical means.

To drive the vehicle in reverse, the transmission is first placed in neutral, with the motor at maximum displacement and the pump at zero displacement. The selector switch is moved to "reverse" which causes the controller to stroke the pump displacement control in the opposite direction (i.e. a negative angle) causing fluid flow to go in the opposite direction. This causes the motor and hence the output shaft to rotate in the reverse direction. Due to the planet set gear configuration, the mechanical torque, as described above, still acts in the forward direction. Therefore the total output torque, in reverse, can be expressed as:

$$\text{Output Torque} = \text{Input Torque} \times [(1+(Rp/Sp)) - (Rp/Sp) \times \text{motor disp}/\text{pump disp} \times (Sg1/Sg2)]$$

Due to the fact that the pump and motor rotate in the same direction, both swashplates are stroked in opposite directions, i.e. when the transmission is viewed from the top the pump swashplate is rotated clockwise as the motor swashplate is rotated counter clockwise, for forward ratios. The pump swashplate is rotated counter clockwise as the motor swashplate is held stationary for reverse ratios. The pump swashplate is connected to the pump control arm, which is connected to the pump control piston in such a way as to allow the pump control arm to pivot and slide relative to the pump control piston. As the pump control piston moves axially in its bore, the pump control arm and pump swashplate rotate about the pump swashplate axis. Similarly, the motor swashplate is connected to the motor control arm, which is connected to the motor control piston in such a way as to allow the motor control arm to pivot and slide relative to the pump control piston. As the motor control piston moves axially in its bore the motor control arm and motor swashplate rotate about the pump swashplate axis.

System pressure is tapped off from the manifold via a shuttle valve and is fed continually to the back of the motor control piston 285. The area of this piston is equal to 1A. The pressure acting on this area biases the motor toward maximum displacement. System pressure is tapped off from the manifold via the same shuttle valve and is fed continually to the small annular area of the pump control piston 280. The area of this annulus is also equal to 1A. The pressure acting on this annular area biases the pump toward its maximum displacement in reverse. System pressure is tapped off from the manifold and is fed thru a modulating valve to the large annular area of the pump control piston 280 which is three times greater than the back of the motor control piston, or 3A. When system pressure acts on this large annular area the force generated overcomes the force generated on the small annular side by a factor of 3 due its larger area. This causes the pump to stroke towards its maximum displacement in the forward direction.

At a predetermined angle of pump displacement, the pump control piston 280 contacts the motor control piston 285 (which is being forced to the motor maximum displacement position as described above). When the pump control piston 280 contacts the motor control piston 285, the force acting on the front of the pump control piston 280 overcomes the force acting on the annular side of the pump control piston 280 plus the force acting on the motor control piston 285, by a factor of 1.5, and forces the motor 60 to stroke toward zero displacement whilst stroking the pump 50 toward its maximum displacement. The built-in lag in stroke angle between pump control piston contacting the motor control piston, allows the motor to stay at its maximum displacement whilst some displacement is achieved by the pump. Therefore, the pressure generated by the pump is allowed to act on the largest possible displacement of the motor, and hence generate the maximum amount of output torque possible. The amount of lag in stroke angle between pump control piston contacting the motor control piston, is equal to the minimum pump angle at which the pump can react full input torque whilst not exceeding the maximum allowable system pressure.

As the modulating valve releases pressure from the large annular area of the pump control piston, the force acting on the motor control piston and the force acting on the small annular area of the pump control piston causes the motor to stroke toward its maximum displacement and the pump toward zero displacement. This will continue to happen until the motor eventually reaches its maximum displacement, when it can stroke no further. The pump will then continue stroking toward zero displacement until it reaches neutral. If the modulating valve further releases pressure from the large annular area of the pump control piston, the pump will continue to stroke into a reverse angle. By keeping the motor at its maximum displacement and stroking only the pump in reverse, the maximum possible torque is obtained from the motor but a limited speed capability, which is desirable.

As stated above system pressure is tapped off from the manifold via a shuttle valve to control the pump and motor, but similarly, make-up pressure could be used to the same effect. This would however require larger piston diameters to generate enough force to smoothly and accurately control the pump and motor, and may therefore require a larger package.

The modulating valve as mentioned above can be of several types, including a classic 'leader-follower' type spool valve actuated by a stepper motor or servomotor, or a solenoid operated spool valve etc.

An advantage of this type of control regime is that it enables just one modulating valve (and associated control hardware, such as computer controls etc.), to control both the pump and motor from neutral thru final drive and into reverse. A simple, reliable and low cost control system is the result.

Due to the fact the motor to pump displacement ratio can be infinitely large, at or around the neutral zone in forward and reverse, it is therefore theoretically possible to generate infinitely high pressures and output torque, and practically possible to generate pressure and output torque which exceeds the capability of the materials to contain them. Obviously these have to be limited to reasonable values, as determined by the structural limitations of the transmission. Torque limitation is achieved by use of a pressure relief valve mounted in the manifold, limiting the maximum pressure the pump can generate, and hence the maximum output torque. Since the pump will be at relatively small displacements when the pressure is at such high levels, the flow rate thru the relief valve will be at acceptable levels.

Alternatively, the system can be inherently torque limited by designing the pump and motor to have a leakage rate that, at a specified pressure, is equal to the pump discharge. The leakage functions as a pressure relief and prevents the pump from generating any more pressure than that specified pressure. The transmission will then reach a 'stall' torque. A certain leakage rate is necessary for hydrostatic bearing interface cooling and lubrication anyway, so designing a leakage rate which also provides a torque limiting function, would have the advantage of doing both functions without need for a separate relief valve.

There is a minimum pump angle at which the pump can react full input torque without exceeding the maximum allowable system pressure, and hence maximum output torque. At pump angles less than these, the output torque will not increase as the maximum pressure is limited as described above, but the input to output speed ratio will continue to decrease and will approach infinity as the pump angle becomes infinitely small.

Figure 60:
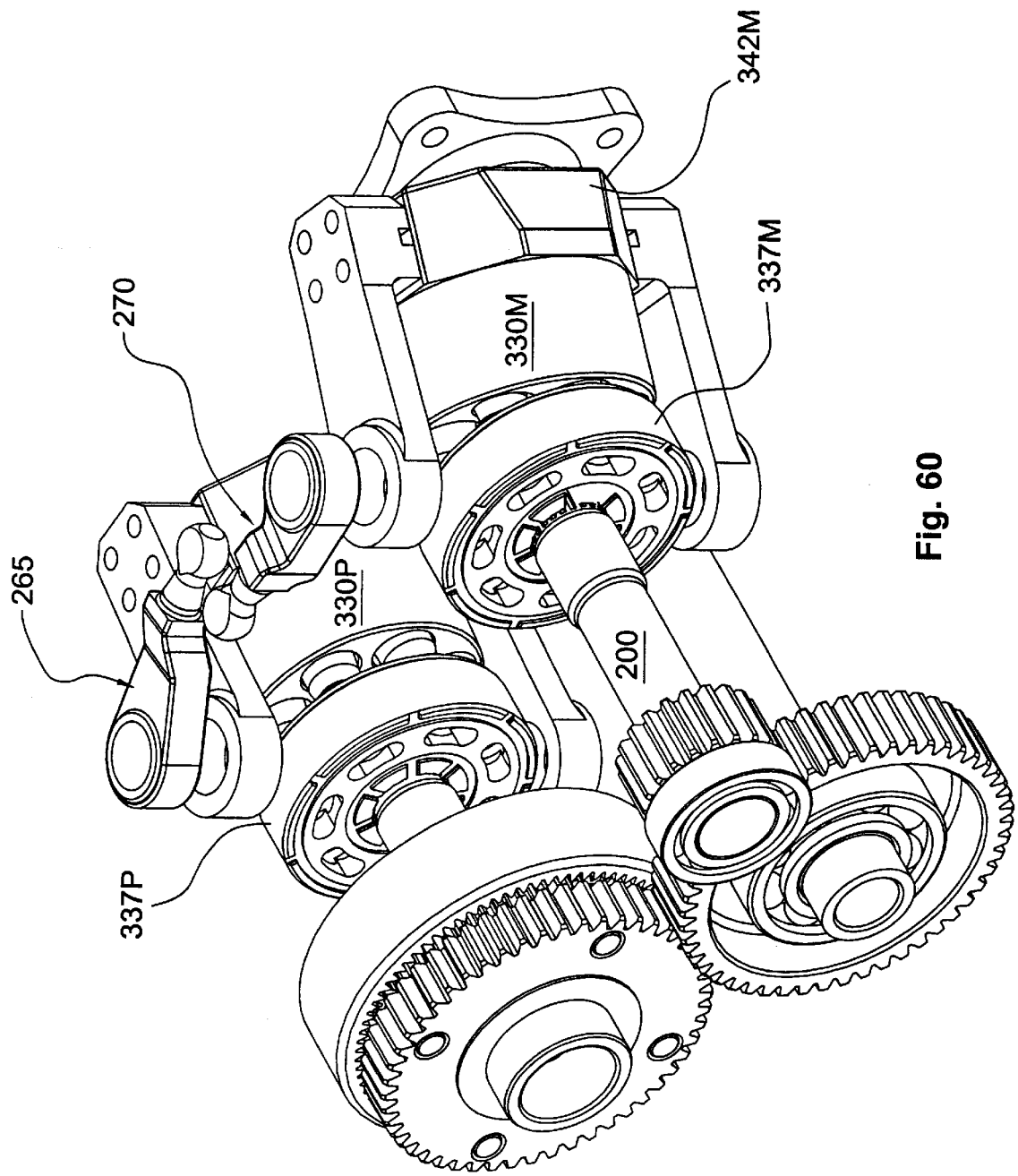
FIG. 60 is a perspective view of the internal components of a bent-axis embodiment of a transmission according to this invention viewed from the input end, corresponding to FIG. 5 of the first embodiment.
Figure 61:
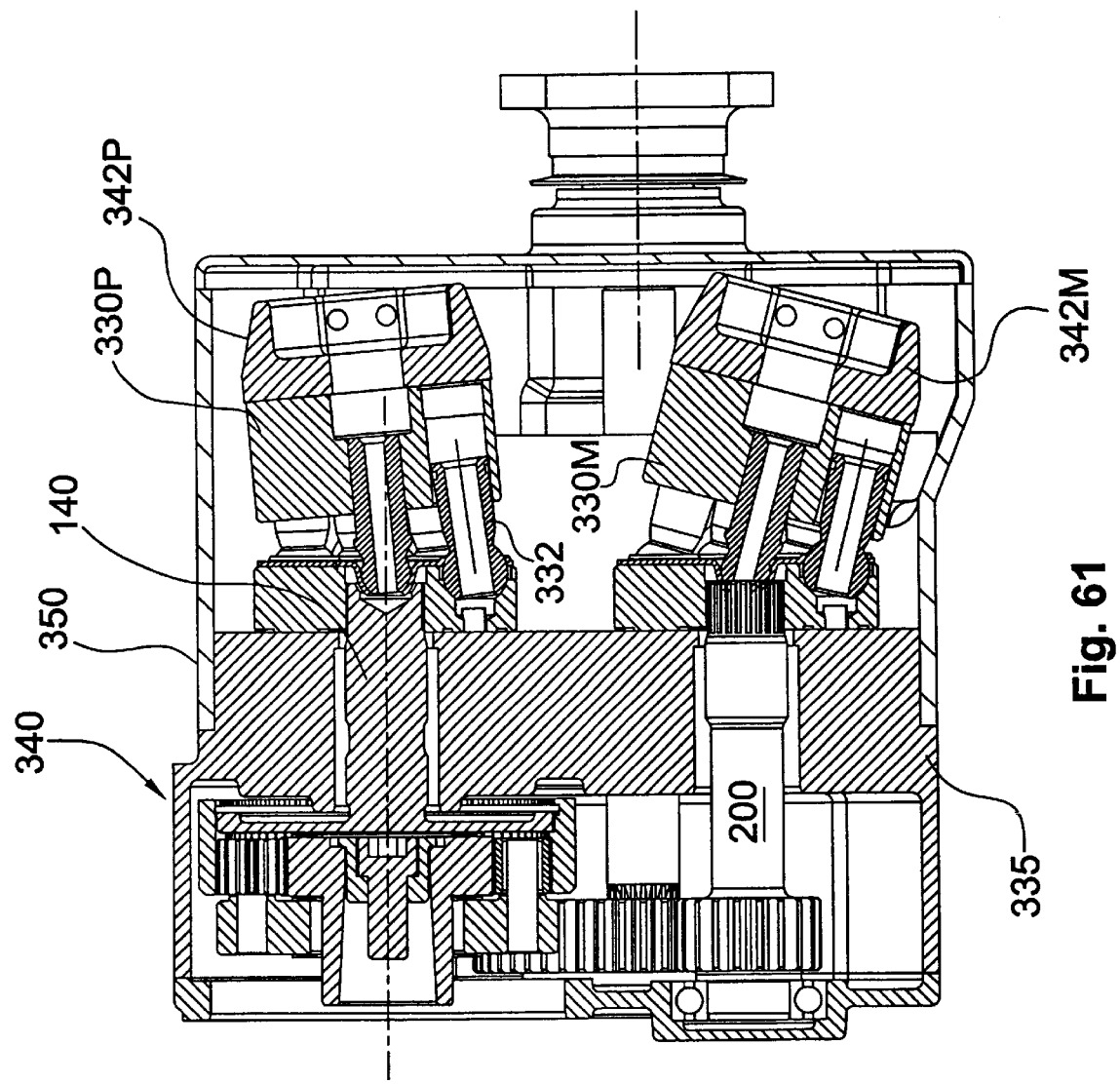
FIG. 61 is a sectional plan view through the axis of the pump and motor of the transmission shown in FIG. 60.
Figure 62:
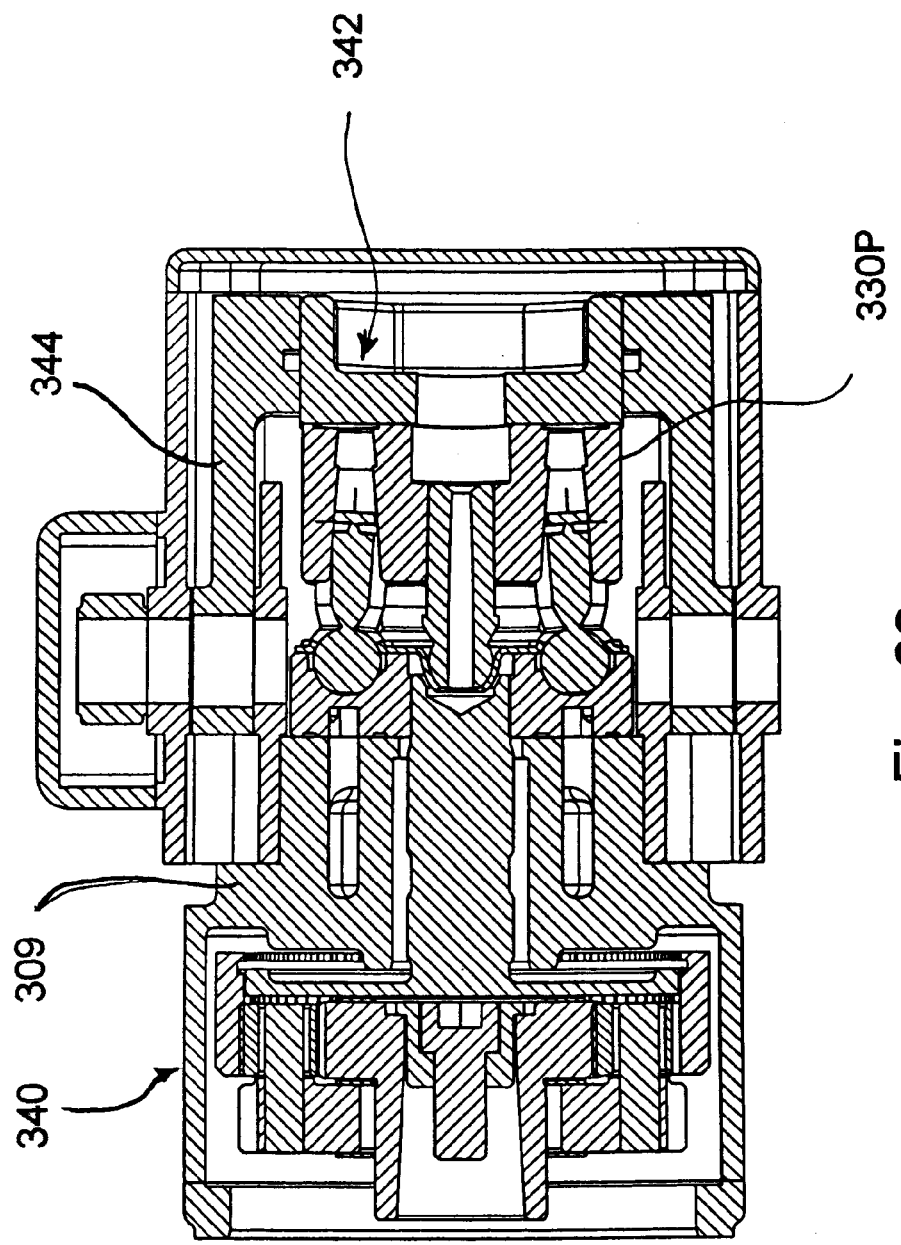
FIG. 62 is a sectional elevation on a vertical plane in FIG. 60 along the pump axis and the yoke hinge axis.
Figure 65:
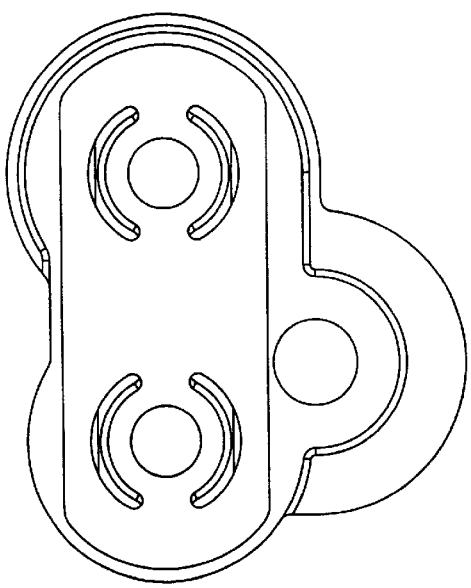
FIG. 65 is an end elevation of the front housing shown in FIG. 64, showing the slots for fluid flow to underlying pressure and suction passages for fluid flow between the pump and motor.
Figure 64:
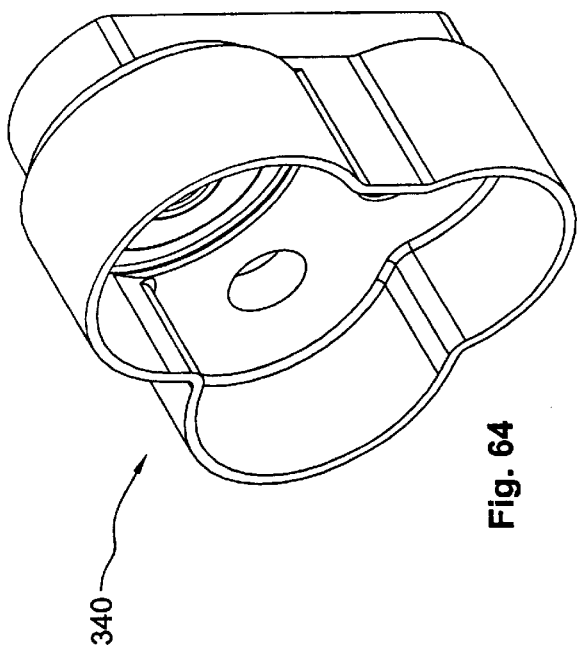
FIG. 64 is a perspective view of the front housing for the transmission shown in FIG. 60, showing the interior end wall containing the manifold.
Figure 68:
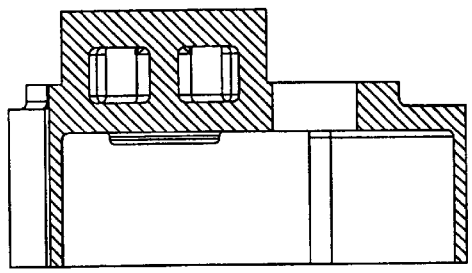
FIG. 68 is a sectional elevation along lines 68—68 in FIG. 66.
Figure 66:
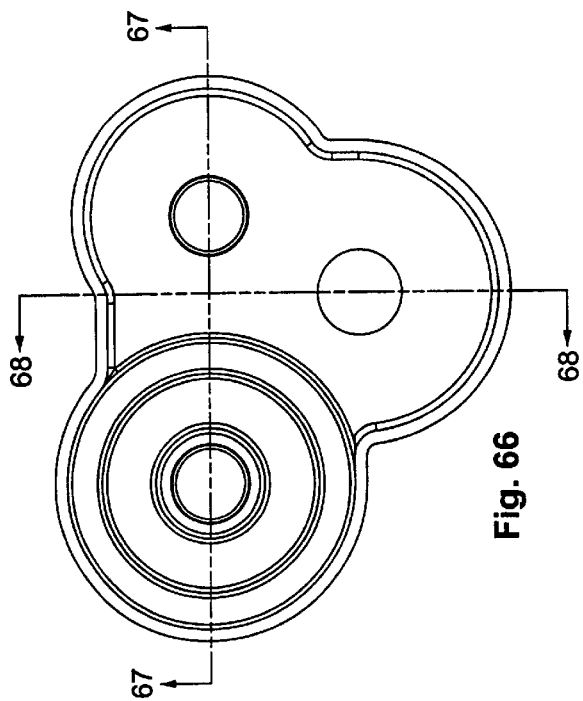
FIG. 66 is an end elevation of the front housing shown in FIG. 64 from the front end.
Figure 67:
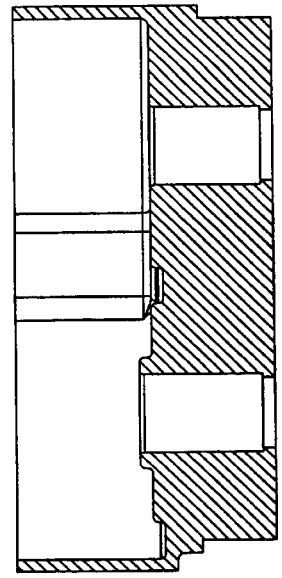
FIG. 67 is a sectional plan view along lines 67—67 in FIG. 66.
Figure 69:
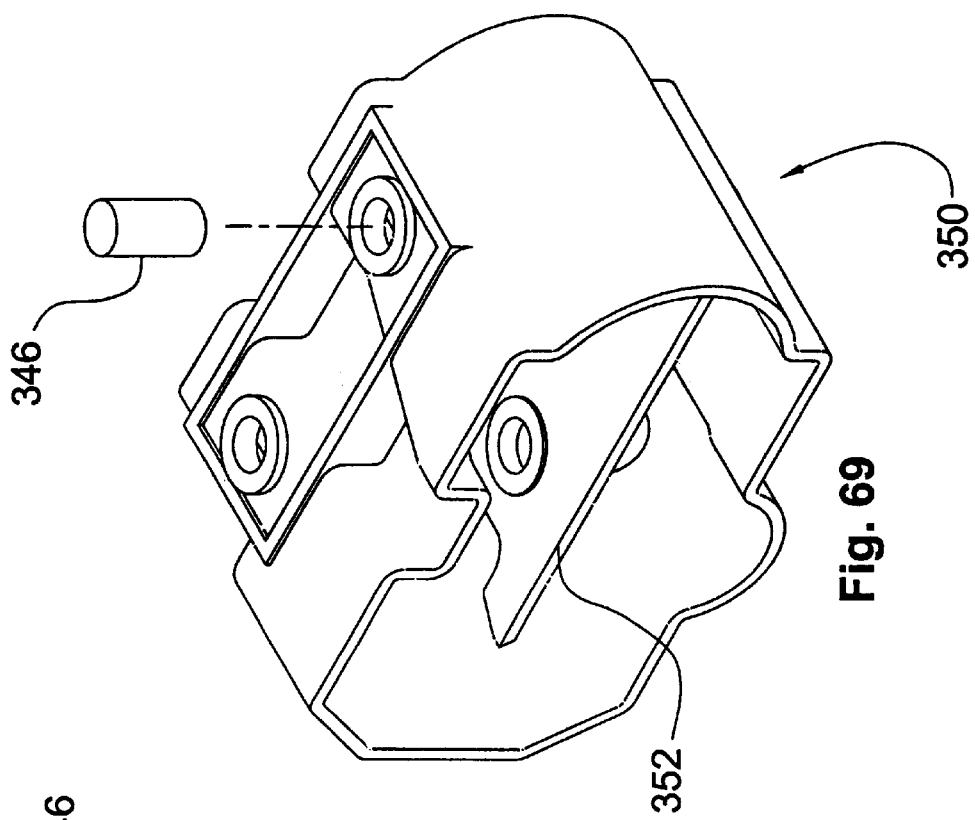
FIG. 69 is a perspective view of the middle housing for the transmission shown in FIG. 60.
Figure 70:
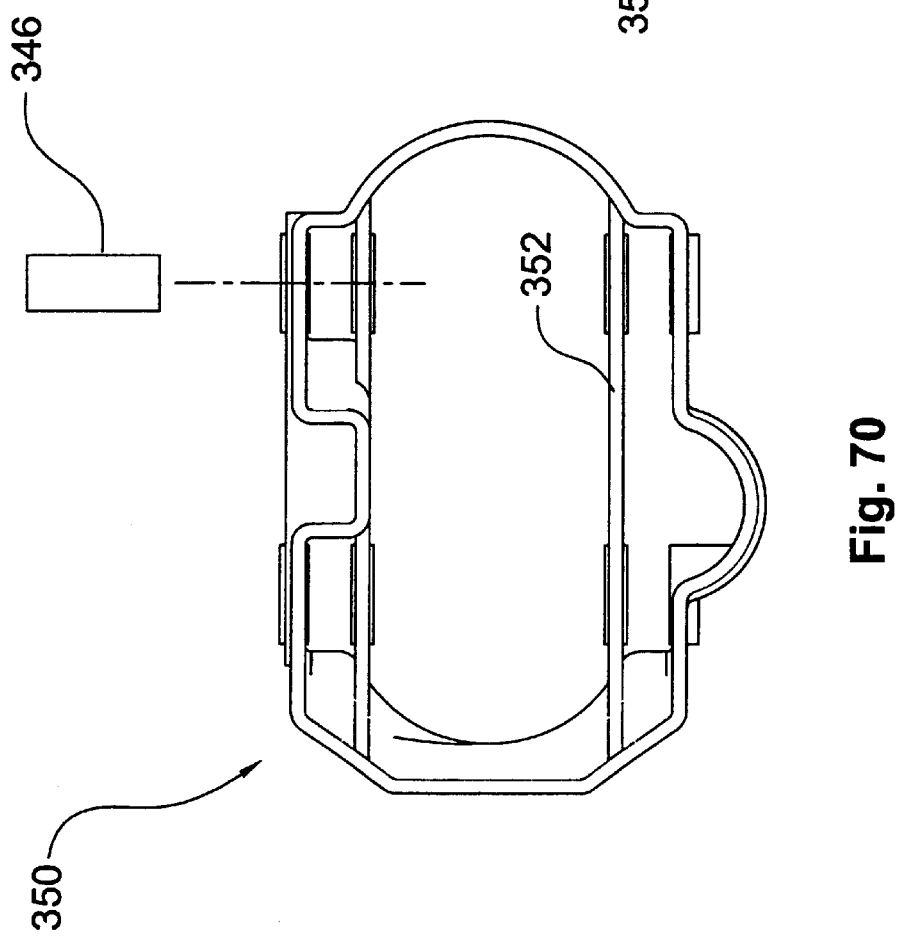
FIG. 70 is an end elevation looking into the middle housing shown in FIG. 70.
Figure 71:
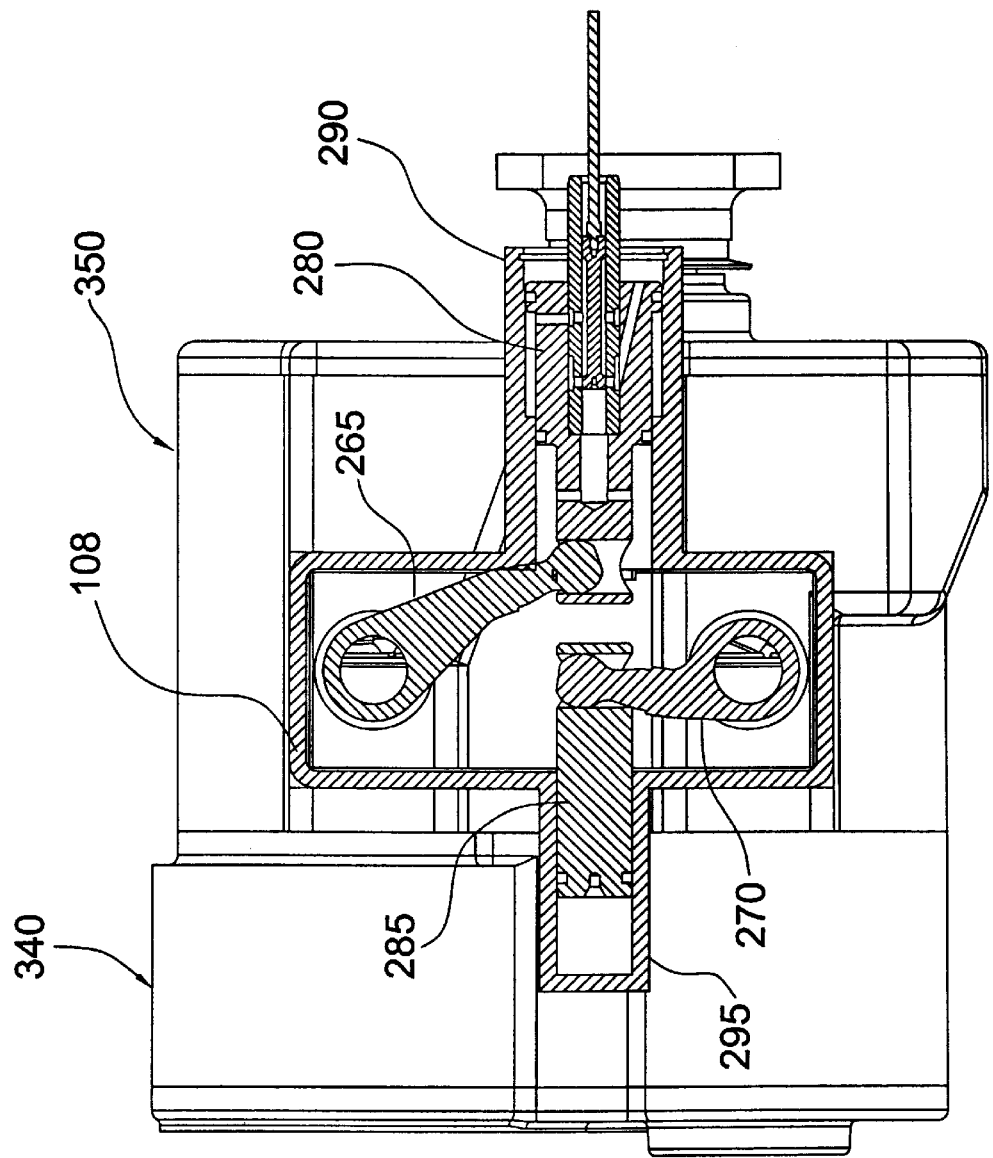
FIG. 71 is a plan view of the control valve and control levers for the transmission shown in FIG. 60.

The stated and other benefits of the invention are also achieved in a bent axis design shown in FIGS. 60–71. The gearing 85 and input/output arrangement of this embodiment is similar all significant respects to the embodiment of FIGS. 1–59. The only significant difference is that pump and motor cylinder blocks 330P and 330M in this bent axis embodiment, as best shown in FIGS. 60–63, are turned around with pistons 332 facing a manifold 335 and engaged in pump and motor torque rings 337P and 337M running against the manifold 335, as in Applicant's International Patent Application PCT/US98/24053 entitled "Hydraulic Machine", the disclosure of which is incorporated herein by reference. In this embodiment, as shown in FIGS. 61 and 62, the manifold 335 is in an interior end wall of a front housing 340, shown in FIGS. 64–68, which also supports bearings for the pump and motor shafts 140 and 200. The pump and motor cylinder blocks 330P and 330M in this design rotate against non-rotating tilting yoke seats 342P and 342M. Torque is input and output to this bent axis unit through splined engagement of the pump and motor shafts 140 and 200 with the torque rings 337P and 337M.

As shown in FIGS. 60, 62 and 63, the back face of the pump and motor cylinders 330P and 330M each bear against a flat face of the yoke seat 342. Two arms 344 are attached to the yoke seat 342, one on each side, and extend forward to gudgeons 345 which are fixed on trunnions 346 pivotally supported in a rear housing 350, shown in FIGS. 69 and 70. The outer ends of the trunnions 346 are supported in bosses in the exterior of the rear housing 350, and the inner ends of the trunnions 346 are supported in bosses in internal webs 352 in the housing 350. The trunnions at the top of the housing 350 protrude beyond the housing and are fixed to the proximal ends of two control crank arms 265 and 270, of distal ends of which extend inwardly toward each other and are engaged in the ends of control pistons 280 and 285.

This bent axis embodiment is advantageous because it has greater efficiency and power density, can result in a reduction in size, weight complexity and cost, and has the ability to run faster than a same size swashplate unit. It is thus possible to use gear ratios that make the bent axis unit spin faster, thereby increasing its torque and power output. The greater power throughput makes it possible to design the unit with smaller hydrostatic units (to achieve the same torque at the same pressure) or run it at a lower pressure and hence use smaller and lighter supporting structures since the loads will be less, or the unit can be made available at the same size with higher torque capacity.

Figure 72:
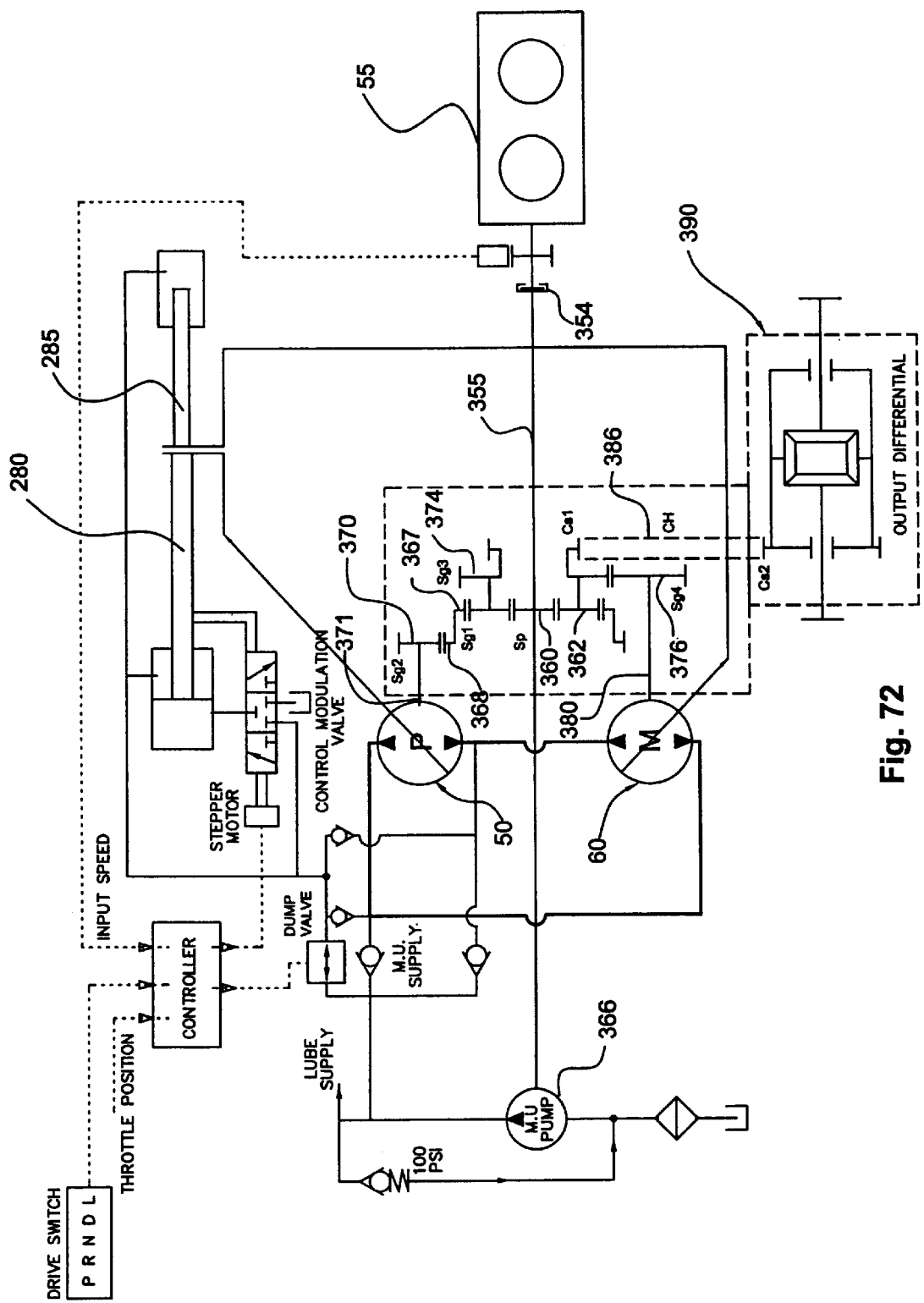
FIG. 72 is a schematic diagram of a front wheel drive transaxle vehicle transmission.
Figure 73:
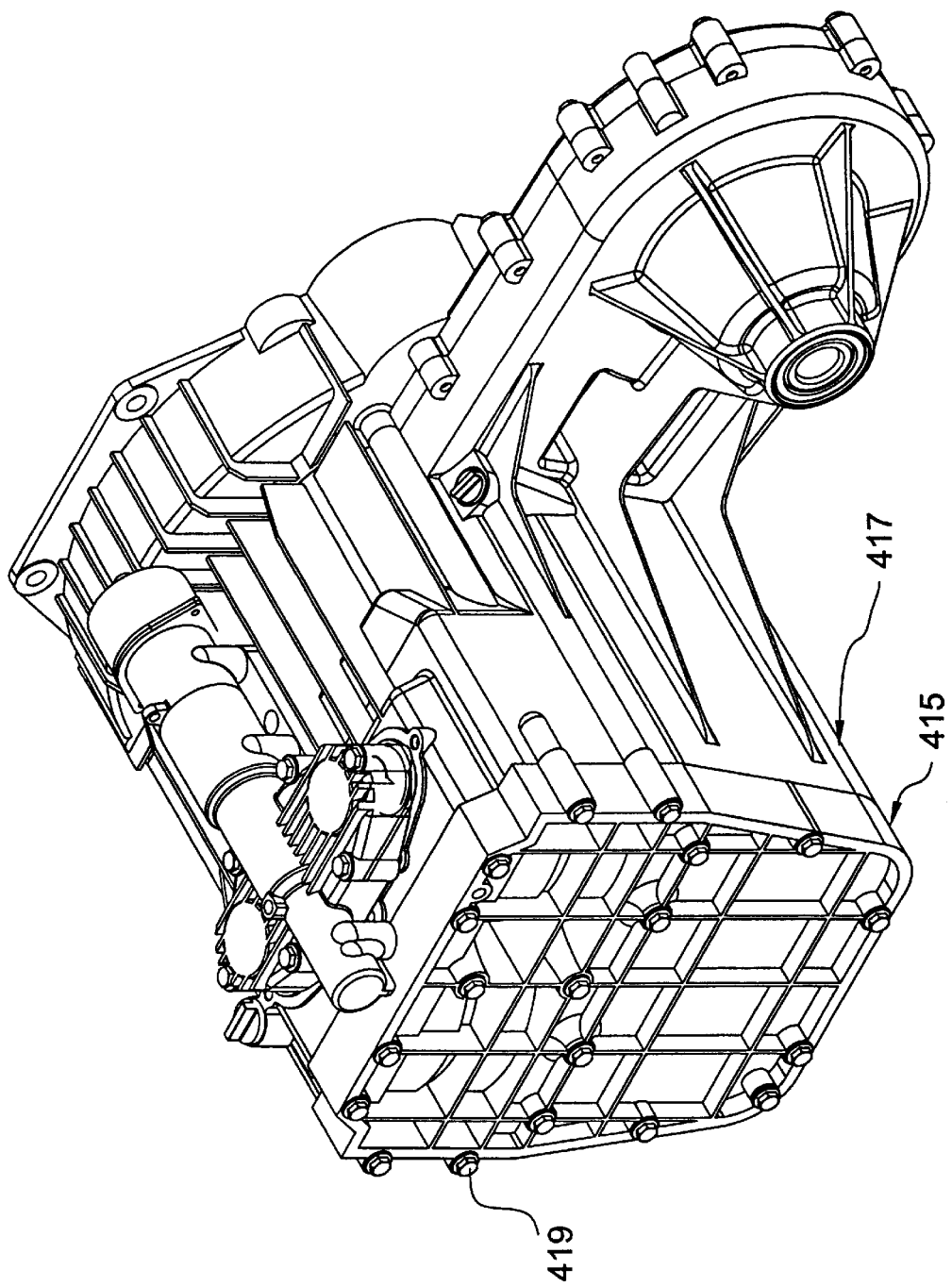
FIG. 73 is a perspective view of a transmission incorporating the elements of the schematic of FIG. 72.
Figure 74:
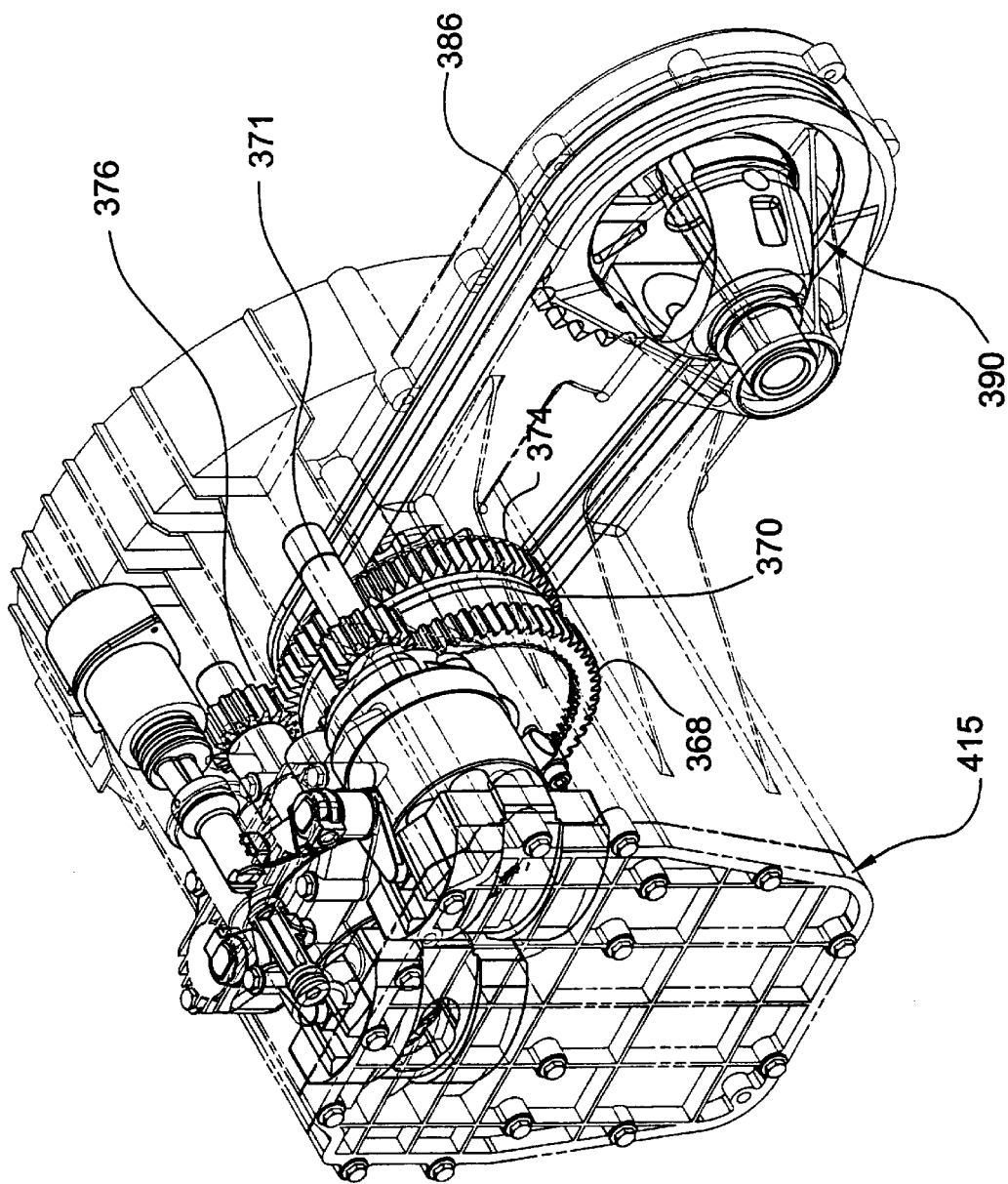
FIG. 74 is a perspective view of the transmission shown in FIG. 73 from the same angle, showing the interior structure.
Figure 75:
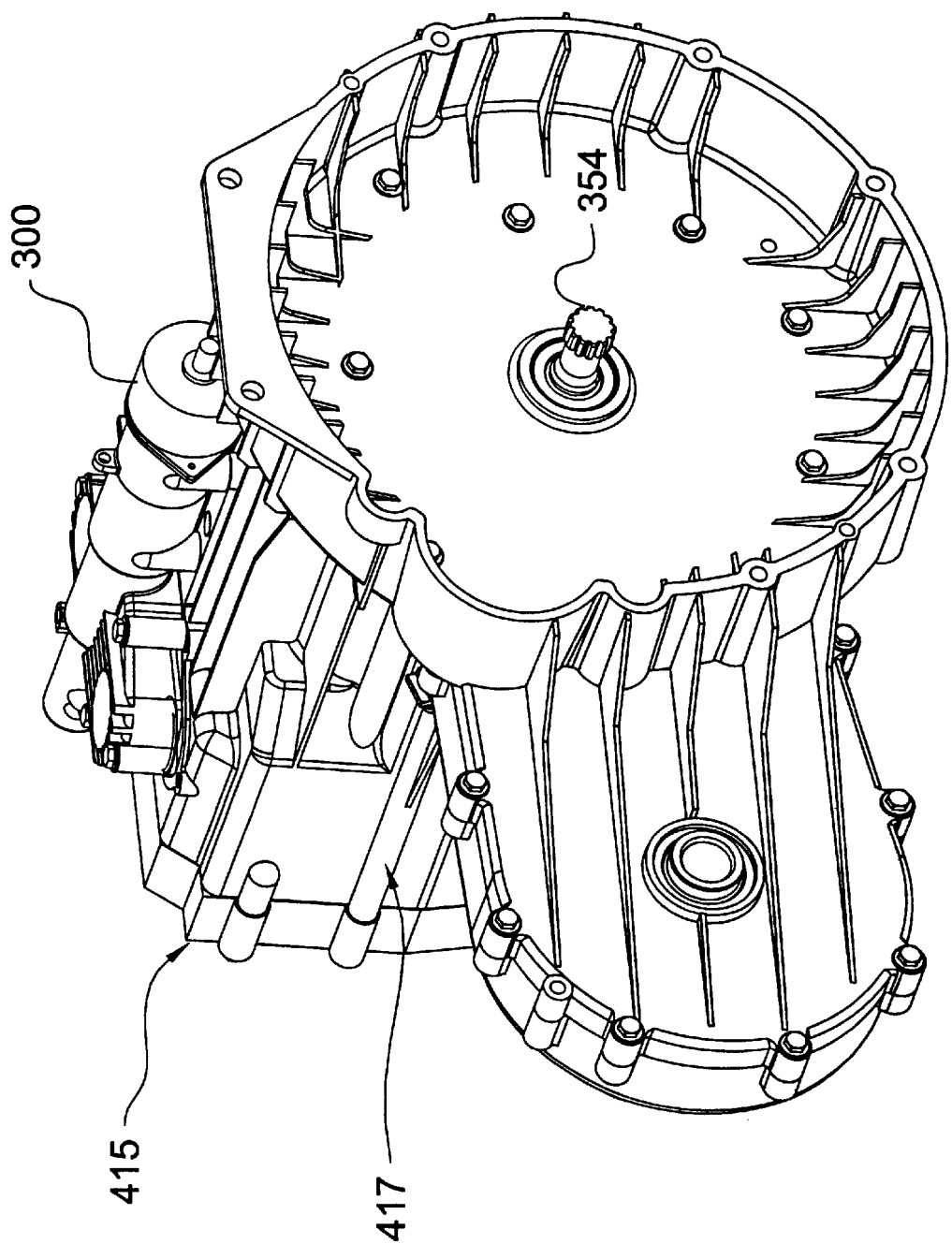
FIG. 75 is a perspective view of the transmission shown in FIG. 73 from the front.

Turning now to FIG. 72, a schematic diagram of a third embodiment of the invention is shown particularly for use in a front wheel drive transaxle arrangement having a substantial offset between the prime mover output shaft and the output differential by which the front axle is driven. This particular design was made light weight and inexpensive for a European microcar, but could also be adapted for small automobile applications as noted below.

The transmission is shown in FIG. 72 in neutral, with the pump 50 set at zero displacement and the motor 60 at maximum displacement. Both the pump 50 and motor 60 are simultaneously controlled in this case, although they could be independently controlled.

As shown in FIG. 72, and also in FIGS. 74, 76 and 79–81, the input from the prime mover 55 is connected through an input spline coupling 354 to an input shaft 355. The input shaft 355 extends through a drive tube 357, shown in detail in FIGS. 82A and 82B, and has an intermediate spline 356 adjacent its inner end that engages and drives an interior spline 358 at the inner end of the drive tube 357. This input shaft 355 is used to accommodate mis-alignments and eccentricities between the engine and transmission whilst being a torsionally rigid coupling. Since the two splines are relatively far apart, a small amount of clearance in the splines will accommodate these mis-alignments and eccentricities.

Figure 76:
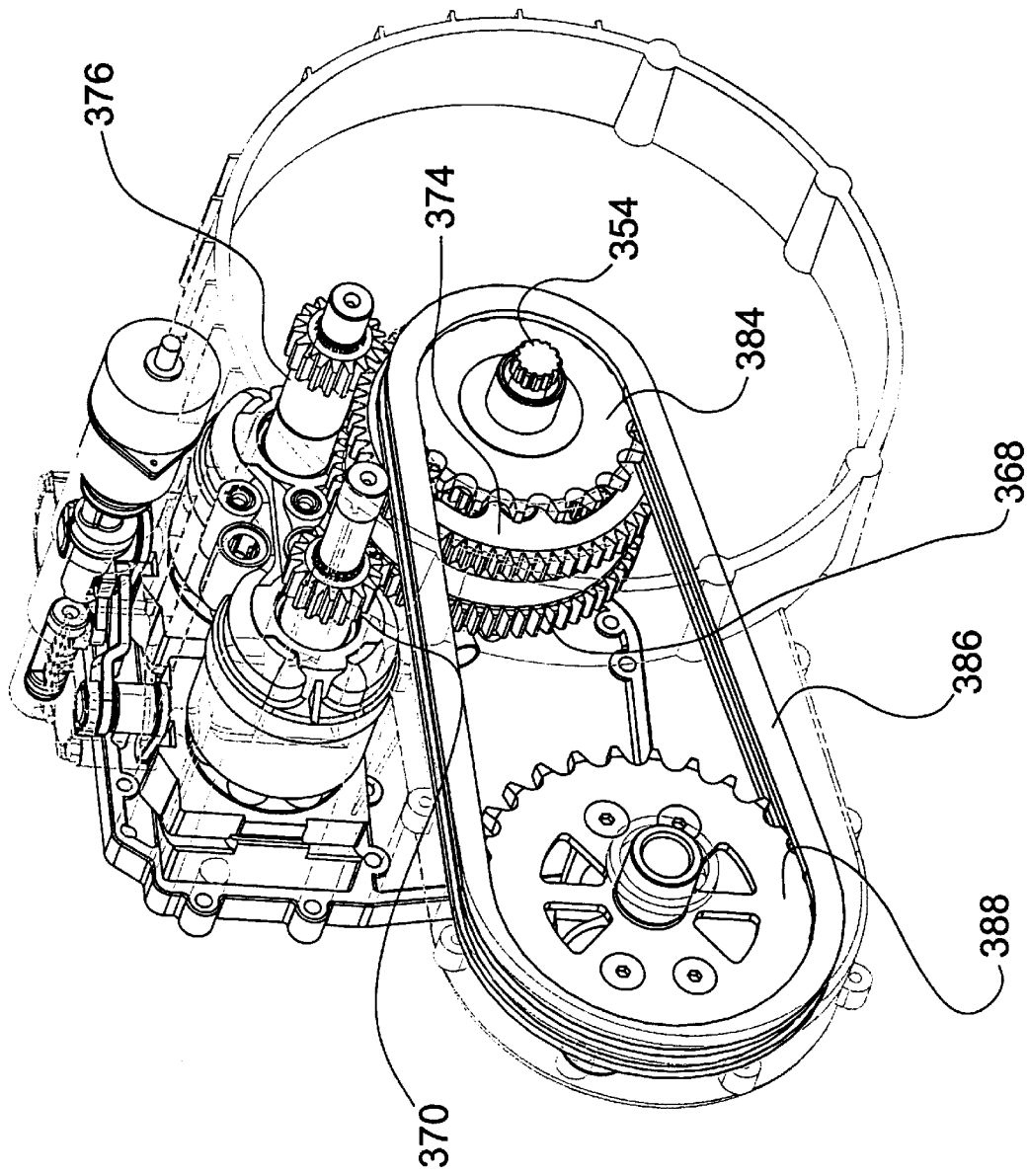
FIG. 76 is a perspective view of the transmission shown in FIG. 75 from the same angle, showing the interior structure.
Figure 77:
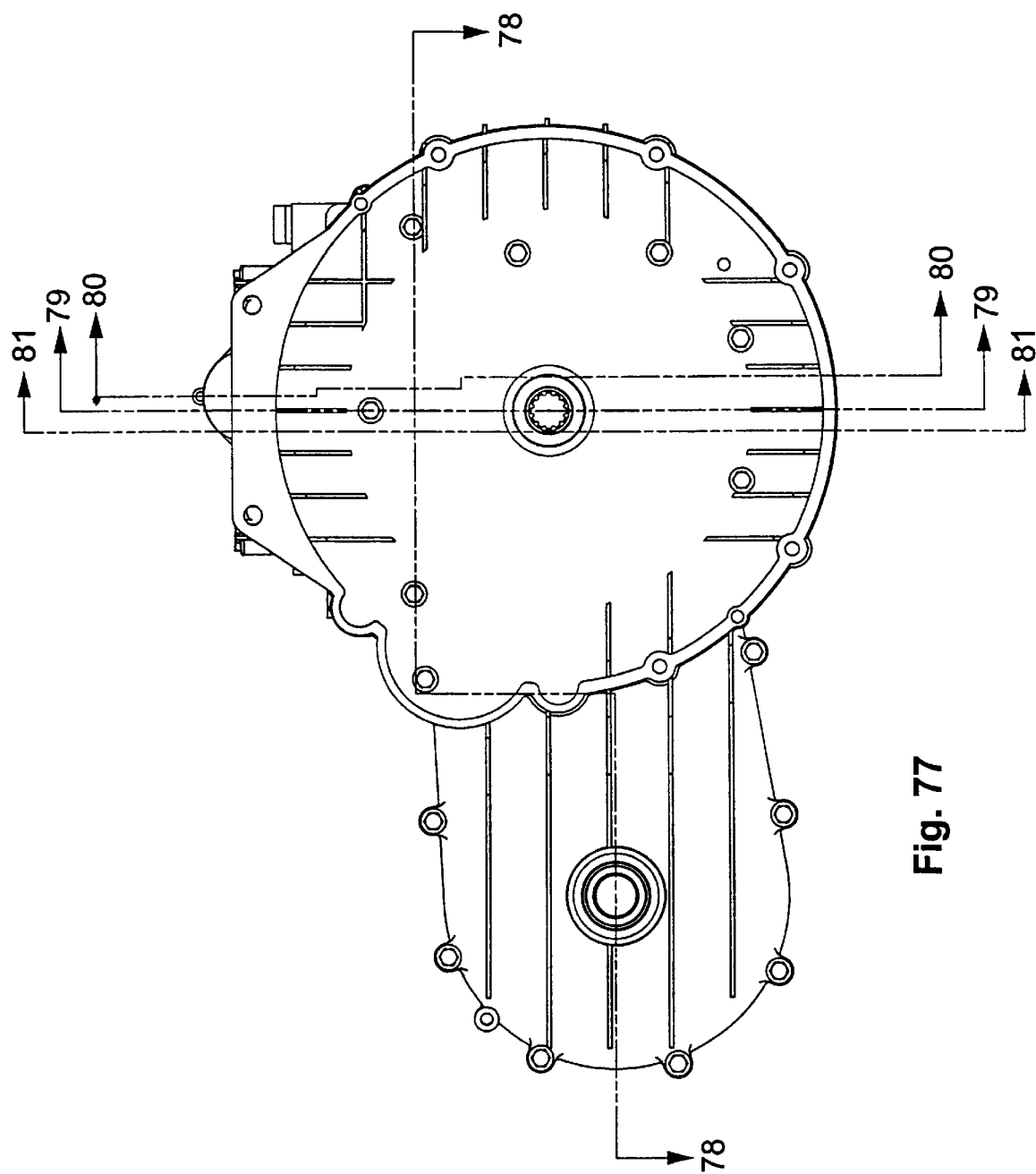
FIG. 77 is an elevation of the front end of the transmission shown in FIG. 75.
Figure 78:
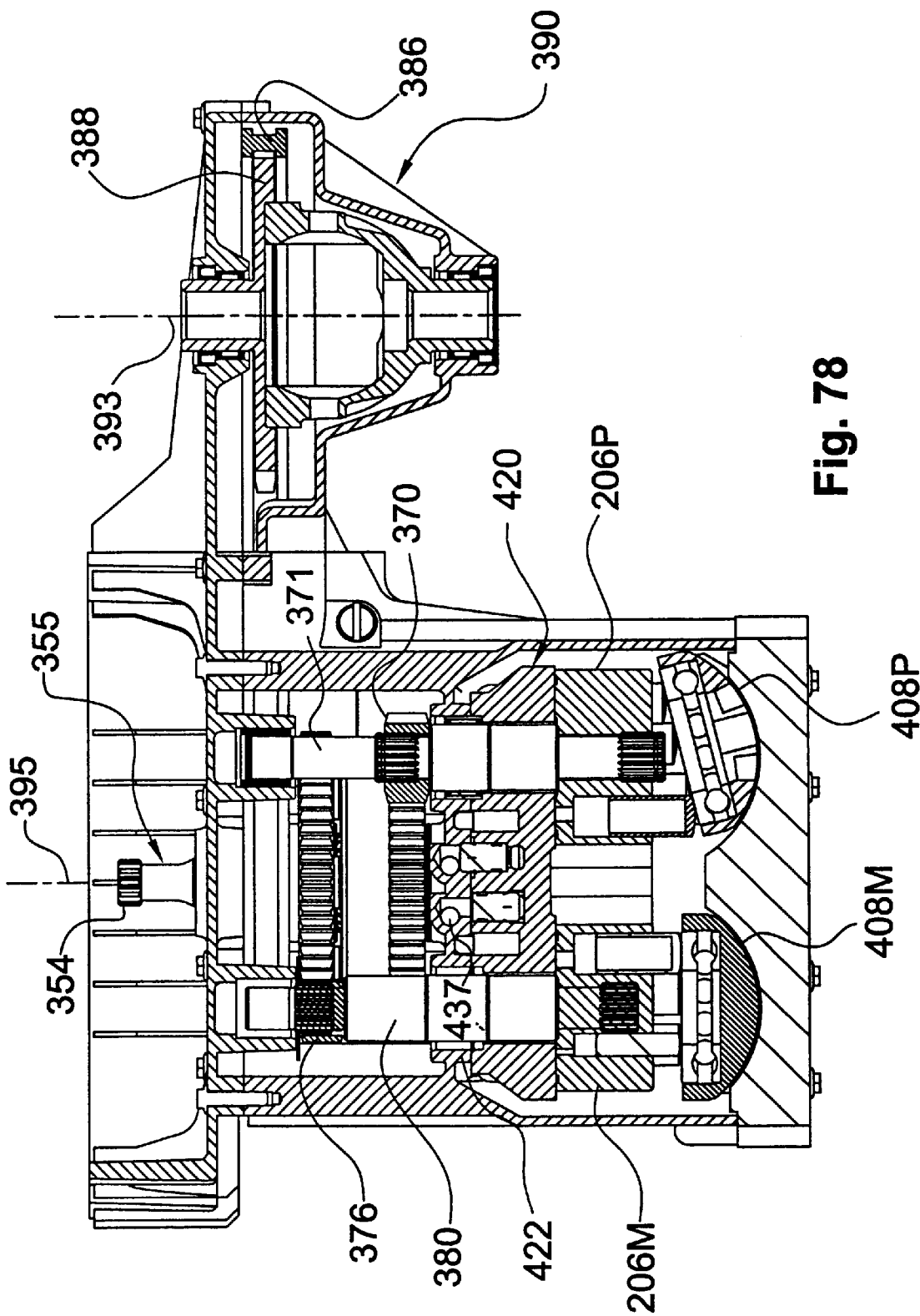
FIG. 78 is sectional plan view along lines 78—78 in FIG. 77.
Figure 79:
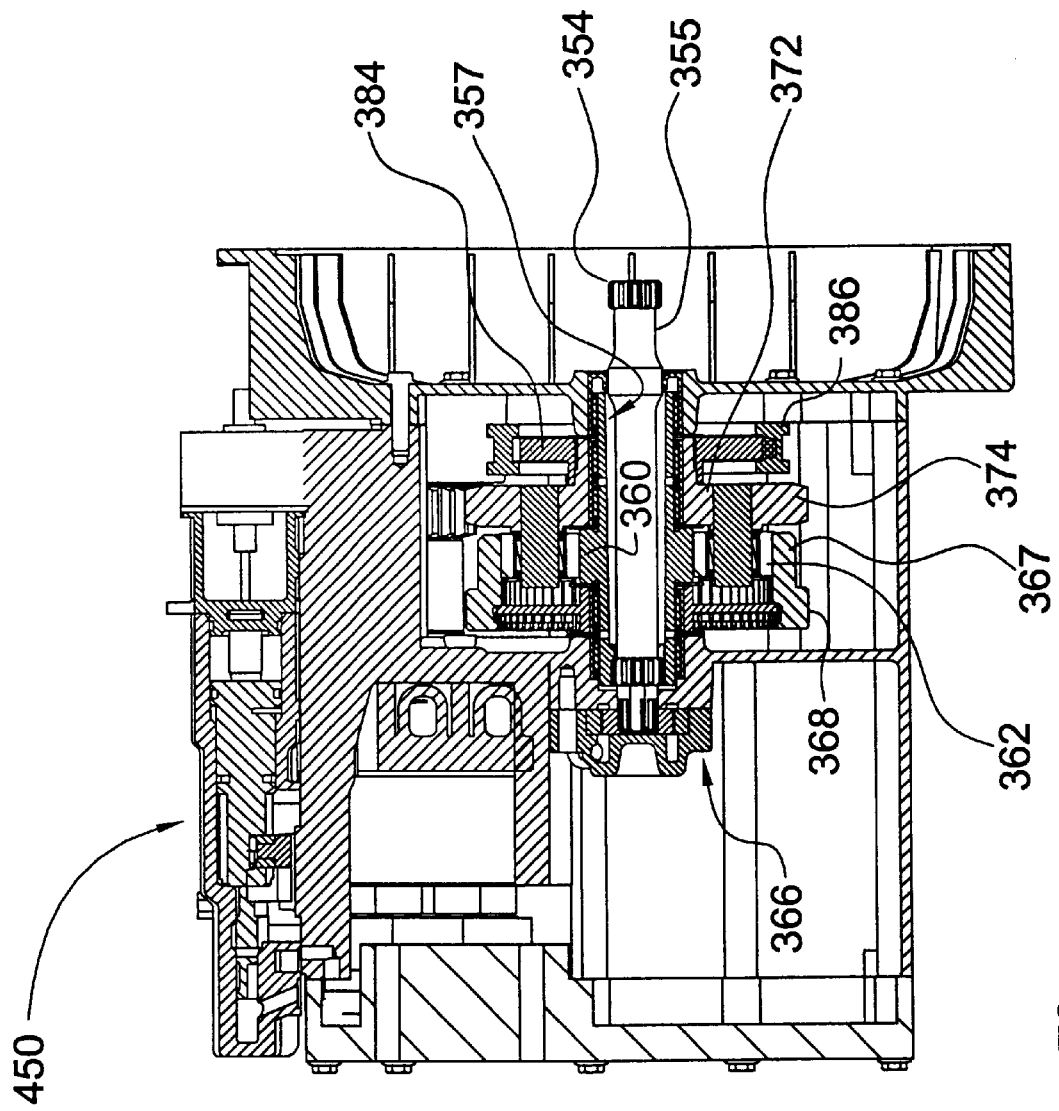
FIG. 79 is a sectional elevation along lines 79—79 in FIG. 77.
Figure 81:
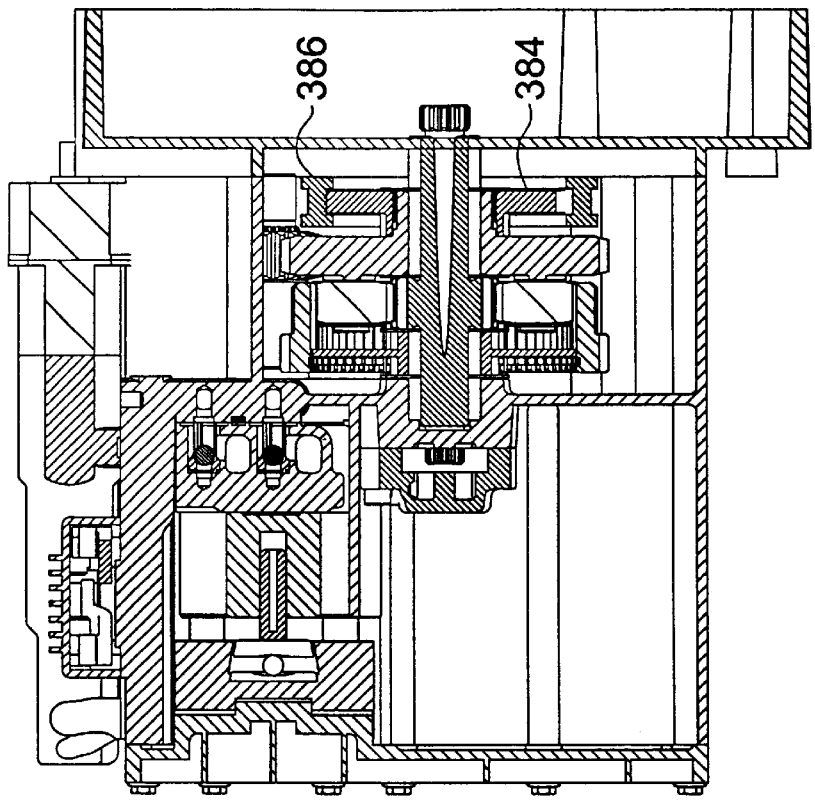
FIG. 81 is a sectional elevation along lines 81—81 in FIG. 77.
Figure 80:
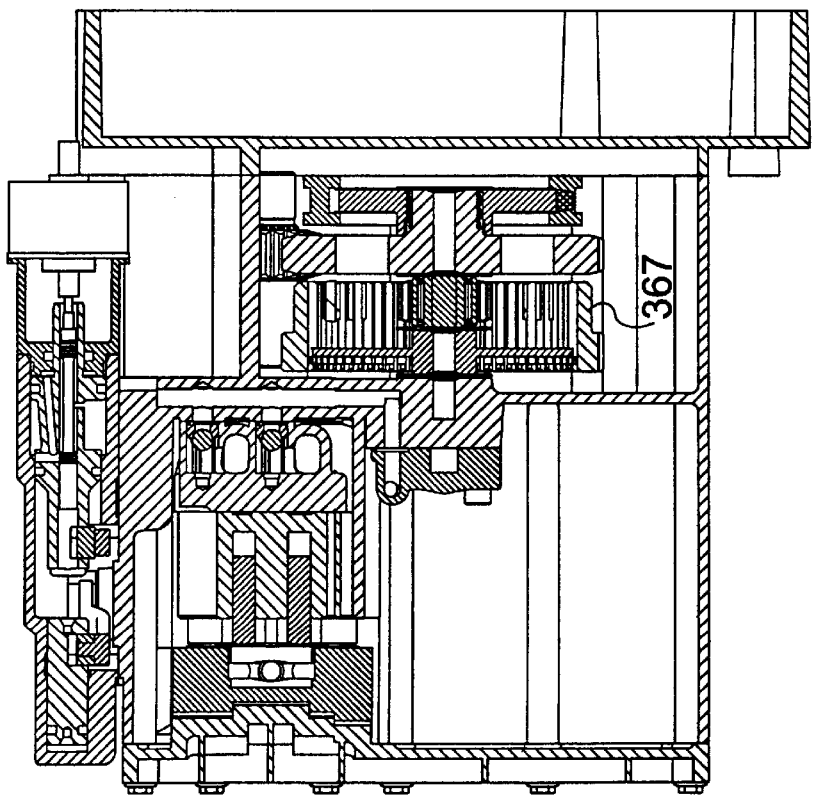
FIG. 80 is a sectional elevation along lines 80—80 in FIG. 77.
Figure 82A:
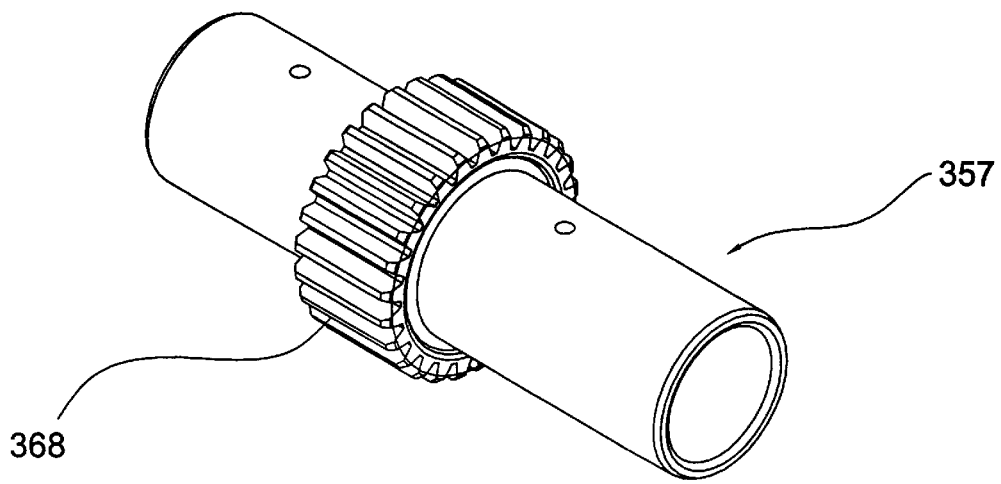
FIG. 82A is a perspective view of the drive shown in FIG. 79.
Figure 82B:
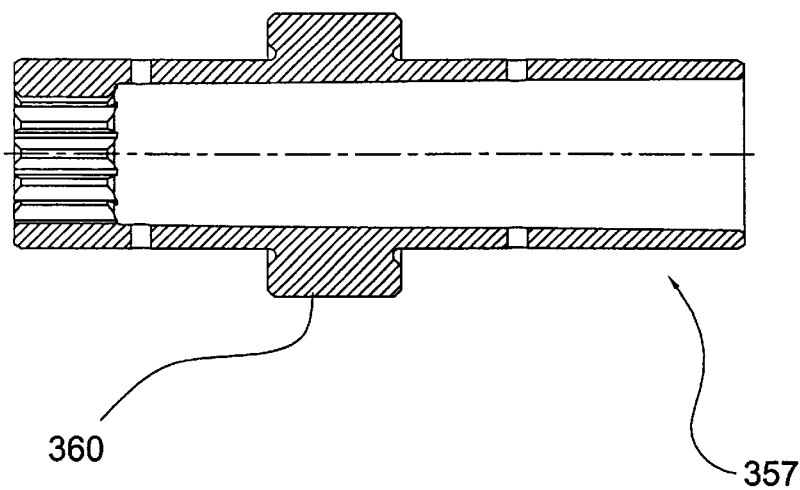
FIG. 82B is a sectional elevation of the drive tube shown in FIG. 82A.
Figure 85:
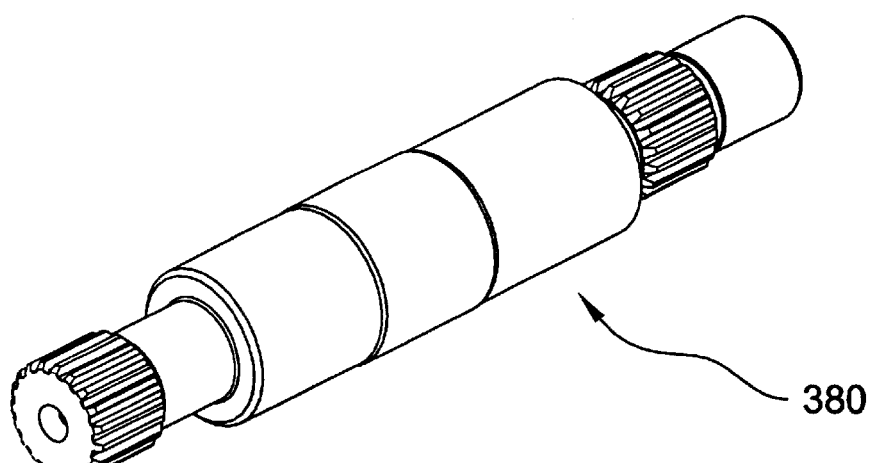
FIG. 85 is a perspective view of the motor shaft shown in FIG. 78.
Figure 84:
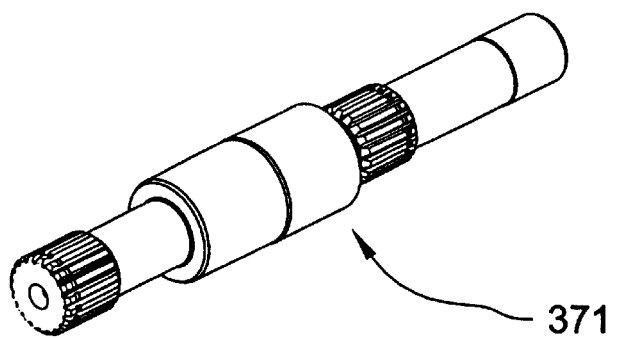
FIG. 84 is a perspective view of the pump shaft shown in FIG. 78.
Figure 83:
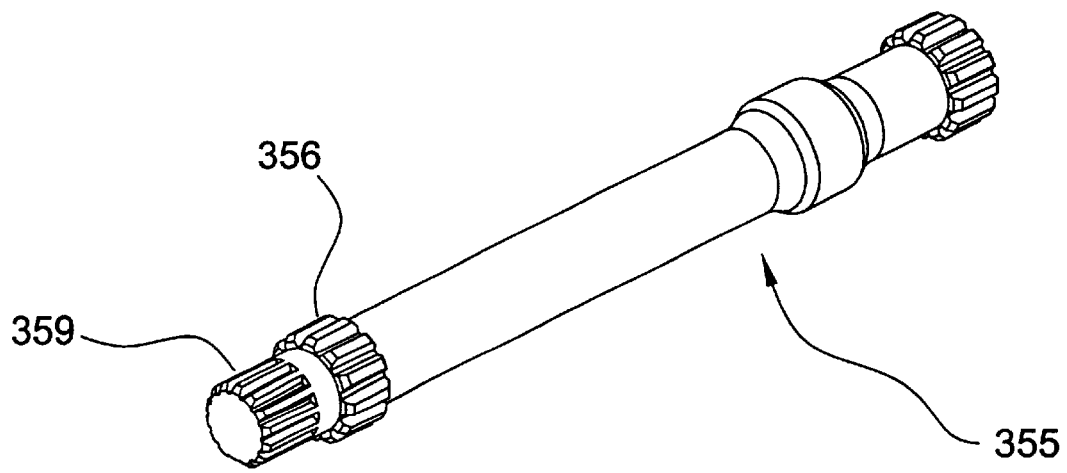
FIG. 83 is a perspective view of the input shaft shown in FIG. 79.
Figure 93:
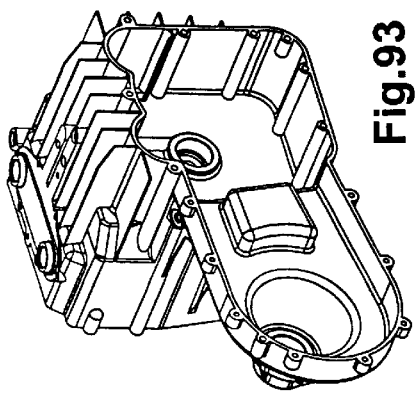
FIGS. 92–96 are various views of the middle housing shown in FIG. 73.
Figure 92:
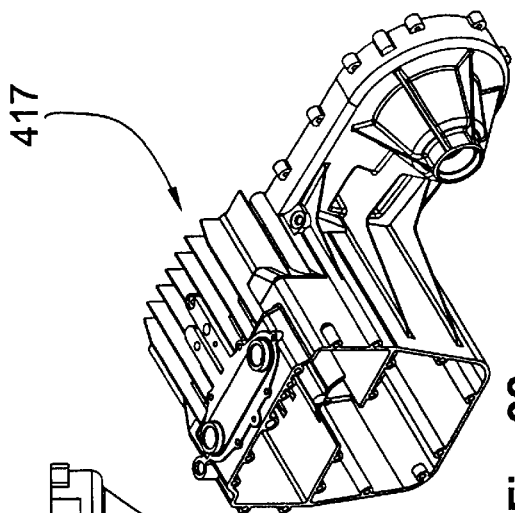
Figure 94:
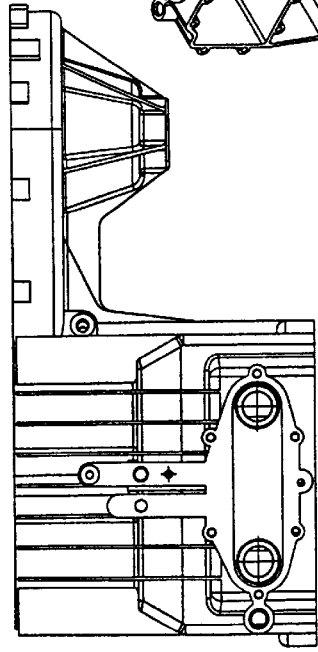
Figure 96:
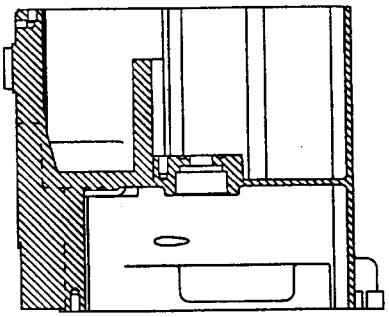

The input shaft 355, shown in detail in FIG. 83 has an end spline 359 that engages and drives a make-up pump 366, as shown in FIGS. 79–81. The drive tube 357 has an integral sun gear 360 of a planet set 365 driving a series of planet gears 362 engaged with an encircling ring gear 367 of the planet set 365. As shown in FIG. 78, the ring gear 367 has an integral spur gear 368 which drives a spur gear 370 connected to the pump cylinder block shaft 371, shown in detail in FIG. 84. The planet gears 362 are mounted in a planet carrier 372 of the planet set 365 which is machined in its outer periphery as a spur gear 374. The spur gear 374 is driven by a spur gear 376 splined to the motor output shaft 380, shown in detail in FIG. 85, which is driven by a spline connection with the motor cylinder block 206M. The planet carrier 372 is also splined to a transmission chain sprocket 384, as shown in FIGS. 79–81, which is coupled via a drive chain 386 to a differential chain sprocket 388 connected to the output differential 390, as shown in FIG. 76.

One advantage of driving the pump by way of spur gears 368 and 370 is that the ratio between these spur gears can be selected to spin the pump faster than the ring gear speed. In the first embodiment shown in FIGS. 1 and 11, the input is connected to the sun gear and the pump is driven directly from the ring gear, so the pump will spin at a slower speed and with a higher torque than the input shaft. This can be disadvantageous for the pump as it will generate a higher pressure to react the input torque, thus giving greater leakage and higher bearing loads. It also means that the maximum pump speed will be lower than its design maximum speed, so the full potential horse power of the unit will not be produced. By using a ratio between the spur gears 368 and 370, it is now possible to spin the pump at it's maximum design speed. Therefore the maximum potential horse power can be extracted from the unit and the system pressure will be lower at any given input torque.

The chain 386 is used to drive the output differential 390 to facilitate spacing the front wheel drive shafts on a centerline 393 far from the engine centerline 395 to accommodate an existing installation, without using a series of gears to achieve the same center distance. Naturally, a series of gears could be used and a different centerline spacing could be used to provide closer coupling between the transmission/engine drive centerline and differential 390.

Figure 95:
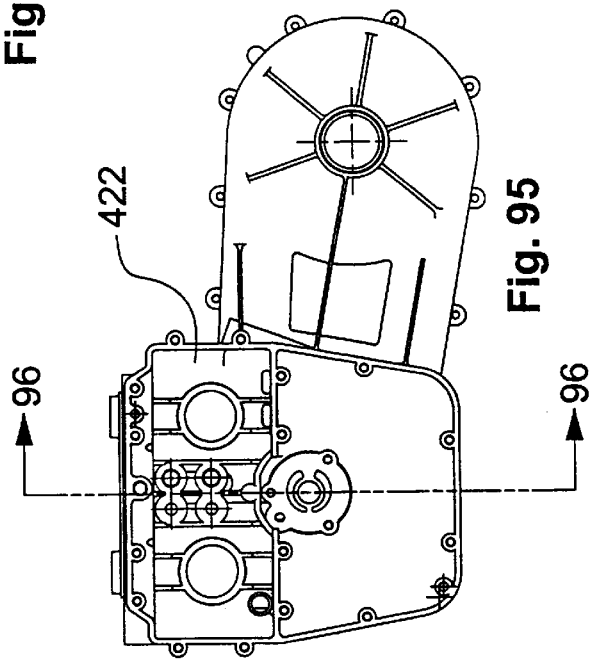

The pump and motor cylinder blocks 206P and 206M lie on parallel axes coincident with the axes of their shafts 371 and 380, as shown in FIG. 78. Pistons 400 in the cylinders of each cylinder block engage a thrust ring which rotates with the cylinder block and is mounted by way of a thrust bearing 404 on a non-rotating, tilting swash plate 408. The displacement of the pump 50 and motor 60 can be varied by adjusting the tilt angle of the swashplate 408 by a crank arrangement. The swashplate 408 is supported in a cradle bearing 410 on the rear housing 415 of the transmission, shown in FIGS. 86–91. The cradle bearing is preferably provided with a low friction polymer surface such as PTFE or the like. The rear housing is connected to a middle housing 417, shown in FIGS. 92–96 by multiple machine screws 419 to provide a reaction path for the axial forces exerted by the pump 50 and motor 60 through the housing and back to a manifold 420 supported by an internal transverse bulkhead 422 inside the middle housing, as shown in FIG. 95.

The manifold 420, shown in FIGS. 97–103, is held against the bulkhead 422 by compression coil springs (not shown) inside the hollow pistons in the pump and motor cylinder blocks 206 which also maintains sealing contact of the cylinder blocks 206 with the manifold to enable system pressure to develop when the transmission is started. During operation, the axial forces exerted by the pump 50 and motor 60 maintain the manifold forcefully engaged with the bulkhead 422.

The manifold 420 has two flat round faces 425P and 425M in contact with the flat faces of the pump and motor cylinder blocks 206P and 206M. Each face 425P and 425M has a pair of opposed curved slots 428 and 430 for conveying high pressure fluid on the pressure stroke from the pump cylinder block 206P to the motor cylinder block 206M, and for conveying spend low pressure fluid displaced from the motor cylinder block 206M back for recharging the pump cylinder block 206P on suction stroke. Four bosses 435 on the manifold 420 hold check valves for passing make-up fluid from the make-up pump 366 through passages 437 in the bulkhead 422, and for passing high pressure fluid to the control unit 450 through a passage 438 in the bulkhead 422. Four valves are needed instead of just two because the high and low pressure sides switch when the transmission is back driven through the vehicle wheels during downhill or decelerating travel when engine braking is used. The hydraulic operation of the pump and motor 60 in this transmission is the same as that described in the first embodiment.

The control unit 450 operates basically like the control units in the first and second embodiments. Due to the fact that the pump 50 and motor 60 rotate in opposite directions, both swashplates 408 are stroked in the same direction for forward ratios. When the transmission is viewed from the top, as in FIGS. 105 and 107, the pump swashplate 408P is rotated counter-clockwise as the motor swashplate 408M is rotated counter-clockwise. The pump swashplate 408P is rotated clockwise as the motor swashplate 408M is held stationary for reverse ratios.

Figure 104:
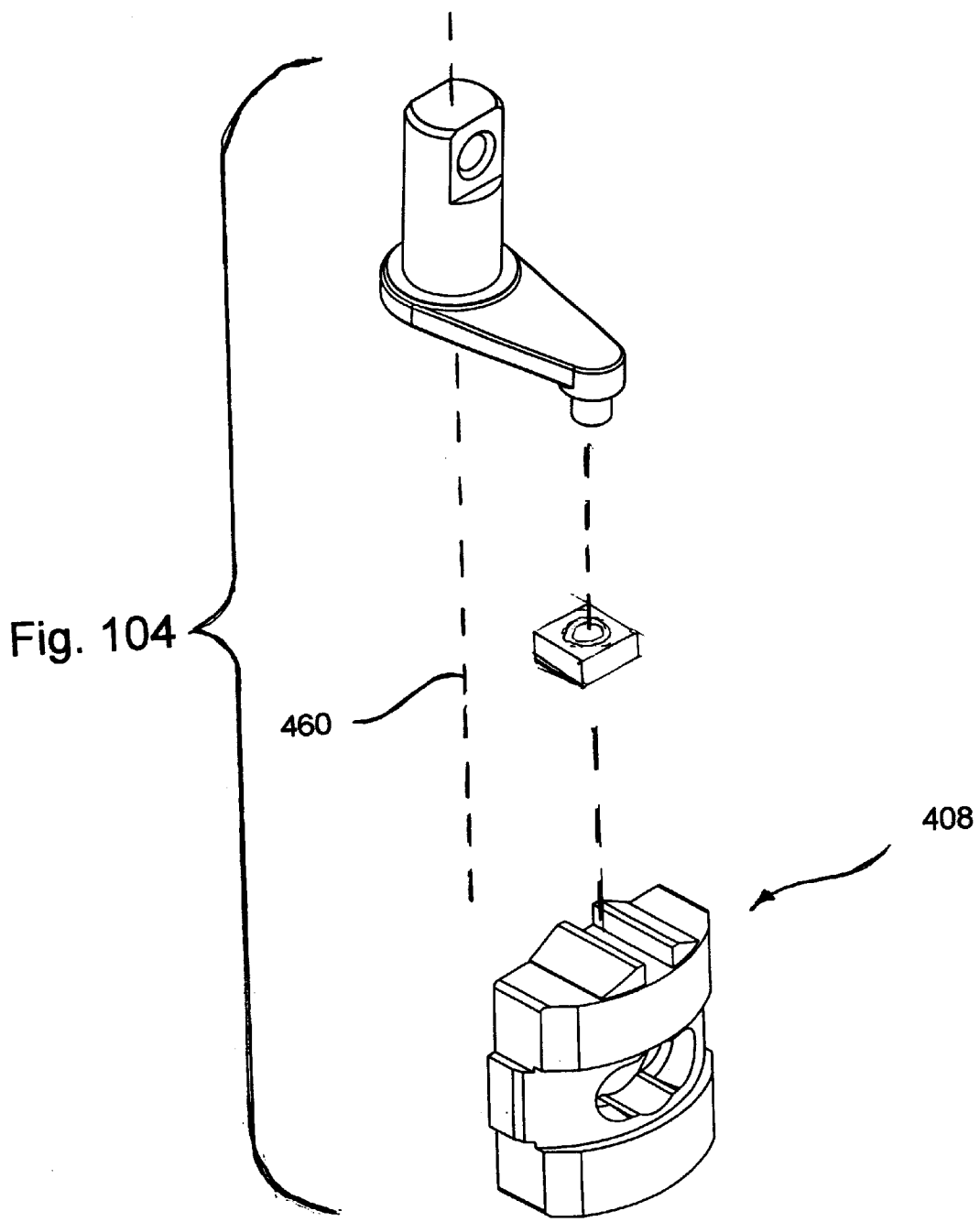
FIG. 104 is an exploded view of the swashplate and the control crank shown in FIG. 74.

The pump swashplate 408P is connected to a pump control arm 454 which is connected to a pump control piston 458 in such a way as to allow the pump control arm 454 to pivot and slide relative to the pump control piston 458. As shown in FIG. 104, the pivot axis 460 of the pump control arm 454 coincides with the axis of rotation of the pump swashplate. As the pump control piston 458 moves axially in its bore 464, the pump control arm 454 and pump swashplate 408P rotate about the pump swashplate axis. The motor swashplate 408P is connected to a motor control arm 466 which is connected to a motor control 468 piston in such a way as to allow the motor control arm 466 to pivot and slide relative to the pump control piston 468. As. the motor control piston 468 moves axially in its bore 470 the motor control arm 466 and motor swashplate 408M rotate about their common axis.

Figure 105:
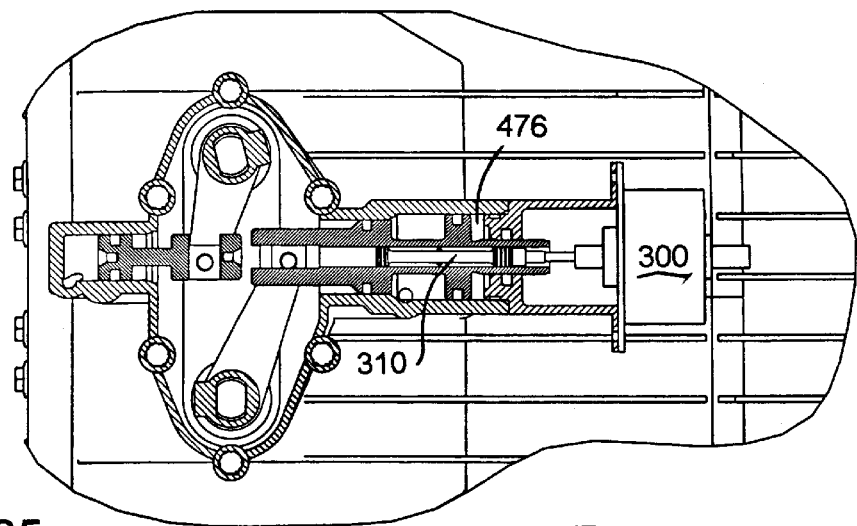
FIGS. 105–107 are plan, elevation, and plan views respectively of the control mechanism and swashplates of the transmission shown in FIG. 74 in the neutral position.
Figure 106:
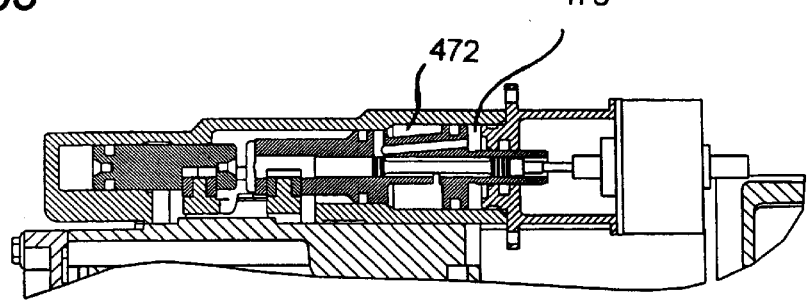
Figure 107:
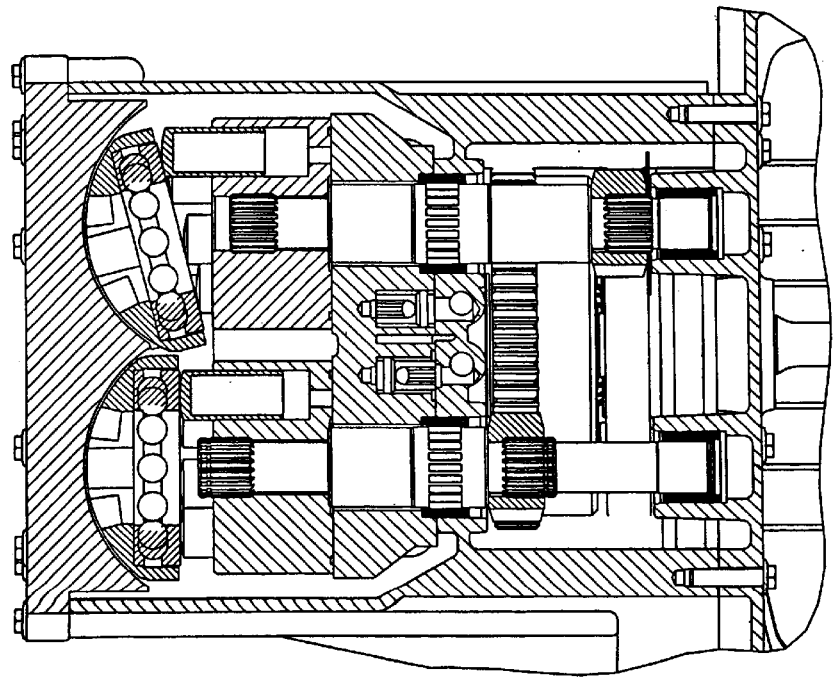

System pressure is tapped off from the manifold through one of the check valves in the manifold and is fed continually to the motor control cylinder 470 behind the motor control piston 468. The area of the face of the motor control piston 468 is about one third of the area of the face of the piston control piston 458. The pressure acting on this area biases the motor continually toward its maximum displacement. System pressure is tapped off from the manifold via the same check valve and is fed continually to the small annular area 472 of the pump control piston. The area of this annulus is equal to the area of the motor control piston 468, and the pressure acting on this area biases the pump continually toward its maximum displacement in reverse (i.e. to rotate the pump swashplate 408P clockwise) as shown in FIGS. 105–107.

System pressure is tapped off from the manifold and is fed thru the modulating valve 474 to the large annular area 476 of the pump control piston 458. The area of this large annular face 476 of the pump control piston is equal to three times the area of the face of the motor control piston 468, so when system pressure acts on this annulus 476, the force generated overcomes the force generated on the small annular side by a factor of 3 due its larger area. This strokes the pump towards its maximum displacement in the forward direction.

Figure 108:
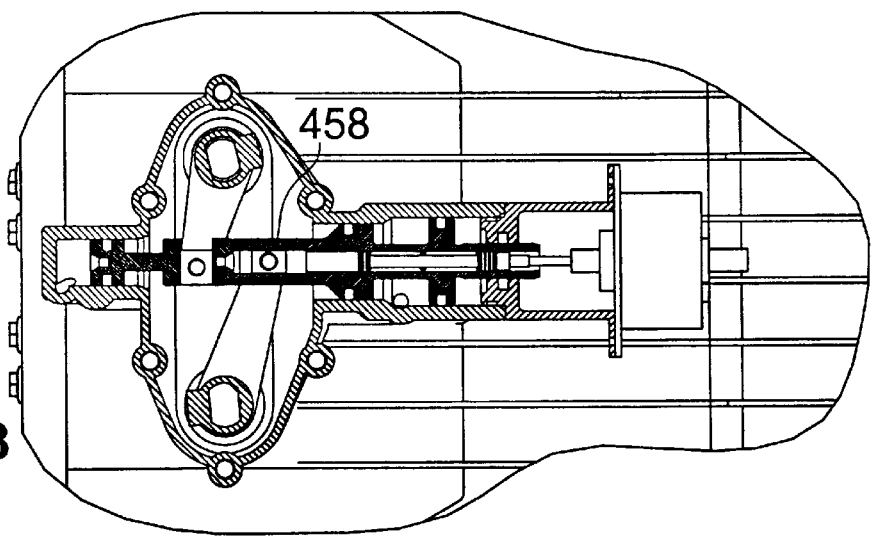
FIGS. 108–110 are plan, elevation, and plan views respectively of the control mechanism and swashplates of the transmission shown in FIG. 74 in the maximum torque position.
Figure 109:
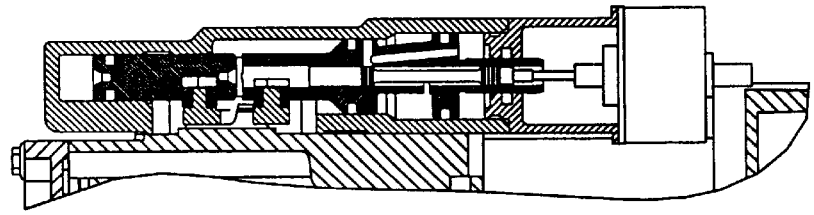
Figure 110:
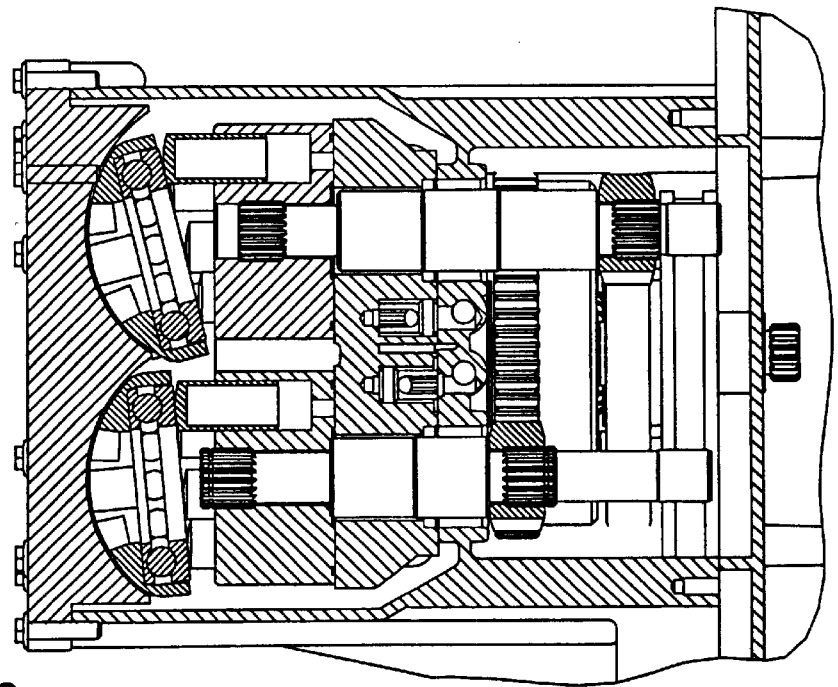
Figure 111:
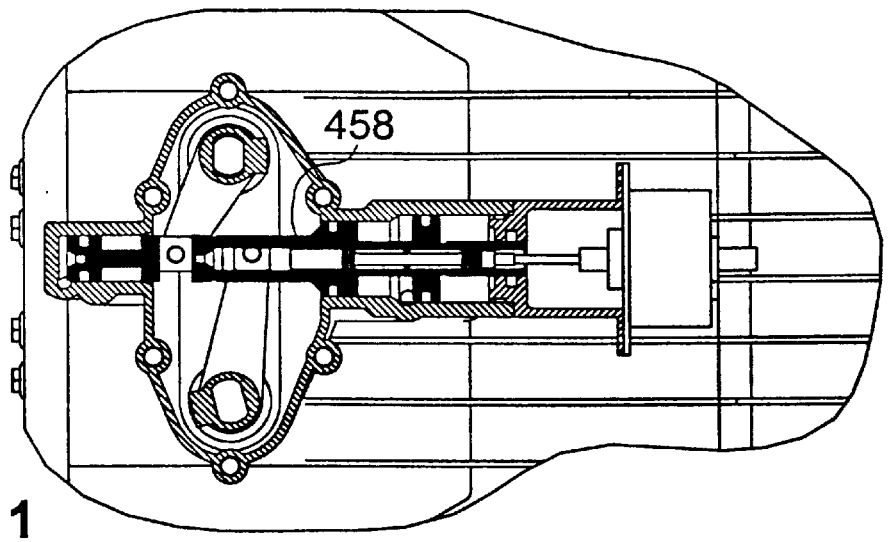
FIGS. 111–113 are plan, elevation, and plan views respectively of the control mechanism and swashplates of the transmission shown in FIG. 74 in the maximum forward speed position.
Figure 112:
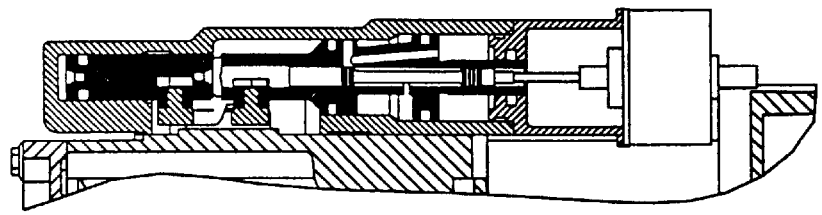
Figure 113:
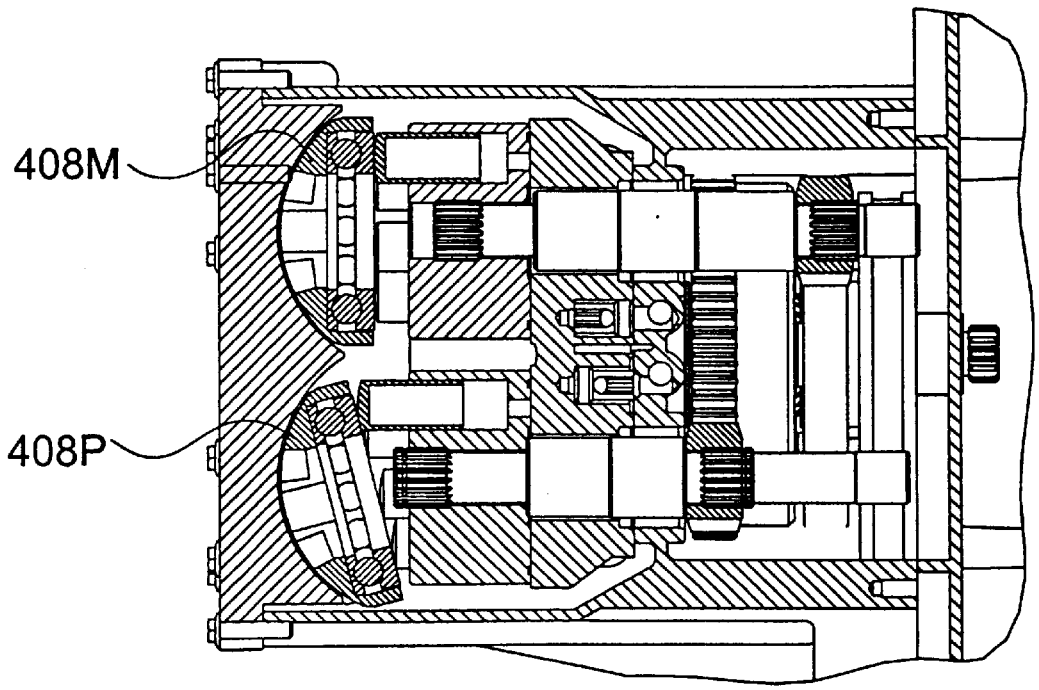
Figure 114:
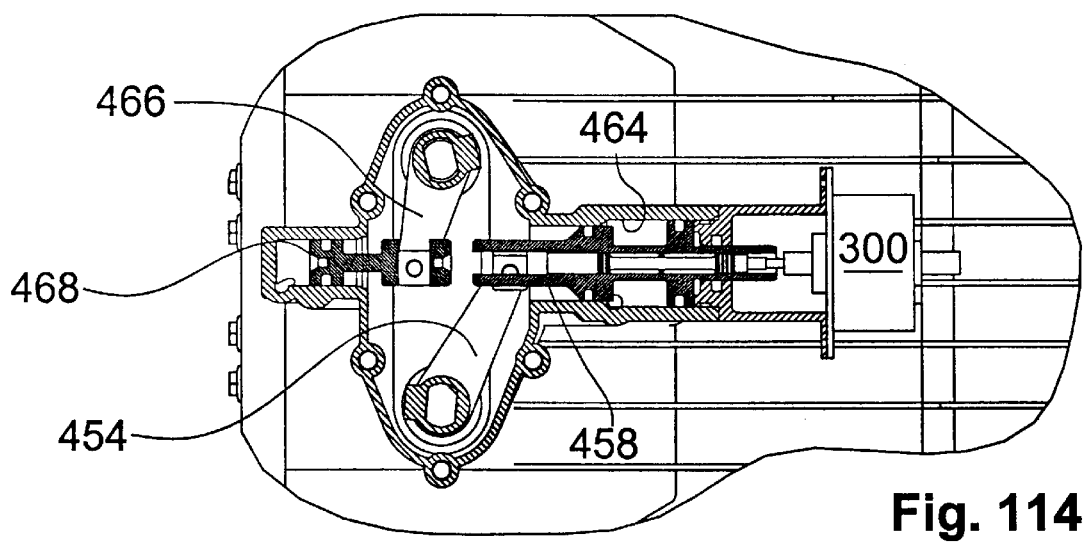
FIGS. 114–116 are plan, elevation, and plan views respectively of the control mechanism and swashplates of the transmission shown in FIG. 74 in the maximum reverse speed position.
Figure 115:
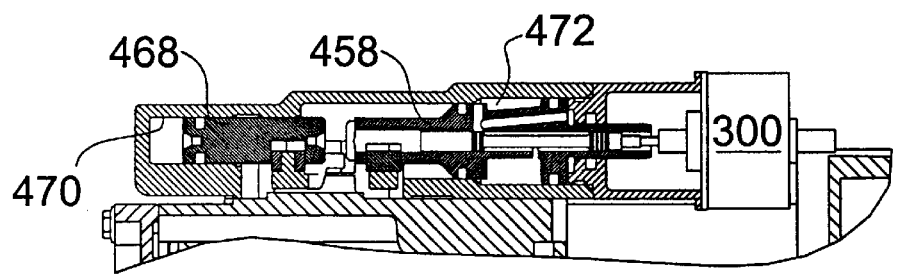
Figure 116:
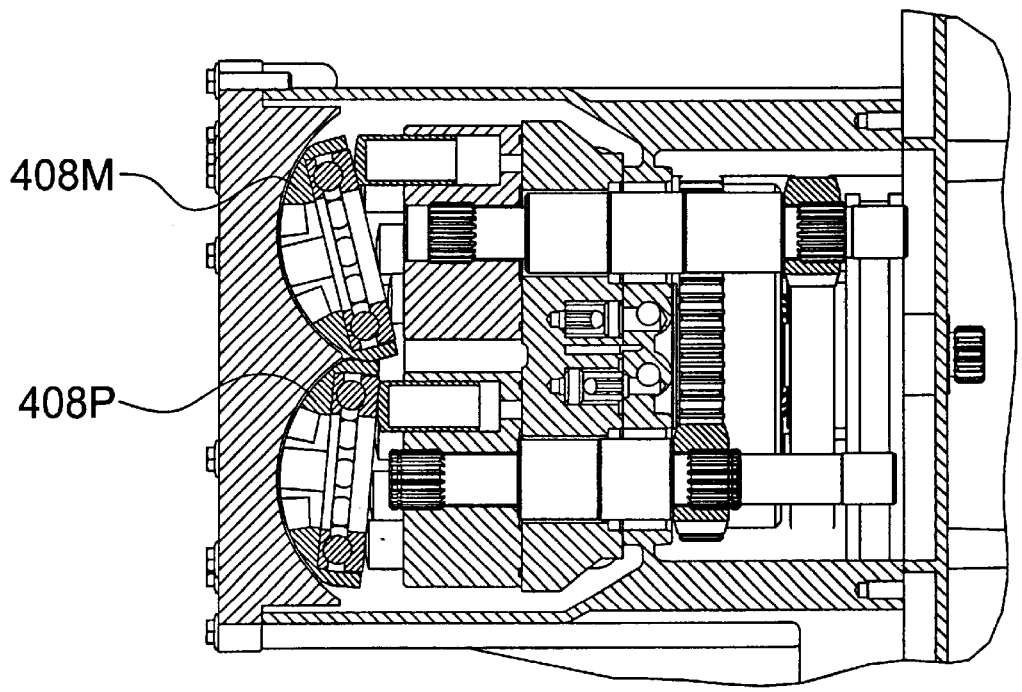

As shown in FIGS. 108–110, at a predetermined angle of pump displacement, the pump control piston 458 contacts the motor control piston 468 (which is being forced to the motor maximum displacement position as described above). When the pump control piston 458 contacts the motor control piston 468, the force acting on the front of the pump control piston overcomes the force acting on the annular side of the pump control piston and the force acting on the motor control piston, by a factor of 1.5, and strokes the motor toward zero displacement whilst stroking the pump toward its maximum displacement. The built in lag in stroke angle between pump control piston 458 contacting the motor control piston 468 allows the motor 60 to stay at its maximum displacement whilst some displacement is achieved by the pump 50, thereby allowing the pressure generated by the pump to act on the largest possible displacement of the motor, and hence generating the maximum amount of output torque possible. The amount of lag in stroke angle between pump control piston contacting the motor control piston is equal to the minimum pump angle at which the pump can react full input torque whilst not exceeding the maximum allowable system pressure. Continued movement of the pump control piston 458 to the fully extended position shown in FIGS. 111–113 shifts the pump swashplate 408P to maximum displacement position and the motor swashplate to its zero displacement position, resulting in hydraulic lock-up and full mechanical drive through the transmission.

As pressure is released from the large annular area of the pump control piston, by the modulating valve, the force acting on the motor control piston and the force acting on the small annular area of the pump control piston causes the motor to stroke toward its maximum displacement and the pump toward zero displacement. This will continue to happen until the motor eventually reaches its maximum displacement, when it can no longer stroke. The pump will then continue stroking toward zero displacement until it reaches neutral, shown in FIGS. 105–107. If the modulating valve further releases pressure from the large annular area of the pump control piston, the pump will continue to stroke into a reverse angle, as shown in Figs. By keeping the motor at its maximum displacement and stroking only the pump in reverse, the maximum possible torque from the motor is attained but with a limited speed capability, which is desirable.

As stated above system pressure is tapped off from the manifold via a shuttle valve to control the pump and motor, but similarly make-up pressure could be used to the same effect. This would however require larger piston diameters to generate enough force to smoothly and accurately control the pump and motor, and may therefore pose some packaging problems.

The modulating valve as mentioned above can be of several types, including a classic leader-follower type spool valve actuated by a stepper motor, or a solenoid operated spool valve etc.

The advantage of this type of control regime is that it enables just one modulating valve (and associated control hardware, such as computer controls etc.), to control both the pump and motor from neutral thru final drive and into reverse. Thus reducing cost and complexity of the control system. It also has the advantage of mechanically linking the pump and motor swashplate displacements together eliminating possible control errors that may occur if each swashplate is individually controlled.

The use of the front wheel drive transaxle shown in this third embodiment could be readily be modified to incorporate the yoke support for the swashplate as shown in the first embodiment of FIG. 5, or the yoke supported bent axis arrangement of the pump and motor as shown in the second embodiment shown in FIG. 60. Obviously, numerous other modifications, combinations and variations of the preferred embodiments described above are possible and will become apparent to those skilled in the art in light of this specification. For example, many functions and advantages are described for the three preferred embodiments, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all these embodiments, species, modifications and variations, and the equivalents thereof, are to be considered within the spirit and scope of the invention as defined in the following claims, wherein we claim:

1. A hydromechanical transmission for providing a continuously variable speed/torque driving connection between a prime mover and ground engaging members of a vehicle, comprising:

a housing having a make-up pump and internal cavities for holding operating assemblies of said transmission;

an axial piston pump having a rotating element and a non-rotating element, said rotating element having a center of mass and an axis of pump rotation that passes through said center of mass;

a first journal in said housing in which said non-rotating pump element is mounted for tilting about a first journal tilting axis, said first tilting axis lying transverse to said axis of pump rotation;

an axial piston motor having a rotating motor element and a non-rotating motor element, said rotating motor element having a center of mass and an axis of rotation that passes through said rotating motor element center of mass;

a second journal in said housing in which said non-rotating motor element is mounted for tilting about a second journal tilting axis, said second tilting axis lying transverse to said axis of rotation;

said pump and said motor disposed side-by-side in said housing with said axes of rotation approximately parallel to each other;

a stationary manifold fixed to said housing, having one surface in contact with said rotating pump element and having fluid passages opening in said one surface in fluid communication with said pump cylinders through a pump/manifold interface;

said stationary manifold having a second surface in contact with said rotating motor element and having fluid passages opening in said second surface in fluid communication with said motor cylinders through a motor/manifold interface;

said stationary manifold having internal fluid passages for conveying fluid pressurized in said pump directly to said motor, and for conveying spent fluid displaced from said motor back to said pump;

a tilt control coupled to apparatus attached to said non-rotating pump element and to said non-rotating motor element is mounted in said housing for tilting said non-rotating elements about said first and second tilting axes;

an epicyclic gear set having a sun gear coupled to an input shaft of said transmission, a ring gear coupled to said rotating element of said pump, and a planet carrier carrying a plurality of planet gears engaged with and between said sun gear and said ring gear, said planet carrier having a connected spur gear that is coupled to said rotating element of said motor and to an output shaft for driving said ground engaging members of said vehicle;

whereby reaction torque from said pump is summed with torque from said motor in said output spur gear for output through said output shaft.

2. A process of converting input rotary power from a vehicle prime mover, at a particular torque and speed produced by said prime mover, to output rotary power to drive members of said vehicle at a continuously variable combination of torque and speed, comprising:

driving a sun gear of an epicyclic gear set with an output shaft of said prime mover;

driving a plurality of planet gears mounted in a planet carrier with said sun gear;

driving a ring gear with said planet gears and driving a pump with said ring gear to pressurize a working fluid;

conducting reaction torque from said pump back through said planet gears and planet carrier to a spur gear attached to said carrier and thence to an output spur gear in geared engagement with said carrier spur gear and attached to an output shaft;

conveying said working fluid pressurized in said pump through passages in a stationary manifold to cylinders in a rotating motor cylinder block, and converting fluid pressure in said motor cylinders to axial work of pistons against a non-rotating motor element to forcibly rotate said motor cylinder block;

conducting torque from said rotating motor cylinder block through a motor drive shaft to said output spur gear;

whereby said reaction torque from said pump is summed with said torque from said motor cylinder block in said output spur gear for output through said output shaft.

3. A continuously variable transmission, comprising:

an operating assembly including a pump unit and a parallel motor unit arranged side-by-side hydraulically related to each other through a stationary manifold and mechanically related through a planetary gear set;

an input shaft driving a planet carrier in which are mounted planet gears engaged with a sun gear and a ring gear of said planet gear set;

an output shaft driven by said ring gear;

said pump having a pump cylinder block operatively driven in rotation by said sun gear of said planetary gear set;

a housing enclosing said operating assembly; and a stationary actuator fixed to said housing and linked to at least one of said pump and motor units for adjusting the displacement of said one of said pump and motor units.

* * * * *